(12) United States Patent
Hosokawa et al.

(10) Patent No.: US 8,233,865 B2
(45) Date of Patent: Jul. 31, 2012

(54) RECEPTION DEVICE AND RECEPTION METHOD

(75) Inventors: Shuya Hosokawa, Osaka (JP); Kenji Miyanaga, Osaka (JP); Naganori Shirakata, Osaka (JP); Koji Imamura, Osaka (JP); Koichiro Tanaka, Hyogo (JP)

(73) Assignee: Panasonic Corporation, Osaka (JP)

( * ) Notice: Subject to any disclaimer, the term of this patent is extended or adjusted under 35 U.S.C. 154(b) by 813 days.

(21) Appl. No.: 12/376,387

(22) PCT Filed: Jan. 9, 2008

(86) PCT No.: PCT/JP2008/050107
§ 371 (c)(1),
(2), (4) Date: Mar. 10, 2009

(87) PCT Pub. No.: WO2008/084800
PCT Pub. Date: Jul. 17, 2008

(65) Prior Publication Data
US 2010/0197262 A1 Aug. 5, 2010

(30) Foreign Application Priority Data

Jan. 12, 2007 (JP) ................... 2007-004151
Apr. 27, 2007 (JP) ................... 2007-118666
Apr. 27, 2007 (JP) ................... 2007-118667

(51) Int. Cl.
*H04B 1/00* (2006.01)

(52) U.S. Cl. .............. 455/226.1; 455/296; 375/346

(58) Field of Classification Search ........... 455/130, 455/226.1, 226.2, 226.3, 234.1, 234.2, 254, 455/266, 296, 304, 305, 306; 375/343, 345, 375/346, 348, 349; 381/94.1, 94.2
See application file for complete search history.

(56) References Cited

U.S. PATENT DOCUMENTS

2004/0088610 A1 5/2004 Kobayakawa
(Continued)

FOREIGN PATENT DOCUMENTS

JP 2003-101449 4/2003
(Continued)

OTHER PUBLICATIONS

International Search Report issued Apr. 15, 2008 in the International (PCT) Application PCT/JP/2008/050107 of which the present application is the U.S. National Stage.

*Primary Examiner* — Thanh Le
(74) *Attorney, Agent, or Firm* — Wenderoth, Lind & Ponack, L.L.P.

(57) ABSTRACT

The noise amount information storage unit 161 stores noise amount information which indicates relationships between gain value of the variable gain amplification units 121 and 125 and the amount of noise included in BB signals output from the down converters 131 and 135. The AGC unit 140 controls the gain value of the variable gain amplification units 121 and 125 so that the power of BB signals output from the down converters 131 and 135 becomes constant. The noise amount estimation unit 162 estimates noise amount of noise corresponding to the controlled gain value of the variable gain amplification units 121 and 125 by referring to the noise amount information stored in the noise amount information storage unit 161. The weight generation unit 170 generates weight matrix based on results of estimations performed by the channel characteristic estimation unit 150 and the noise estimation unit 162.

16 Claims, 26 Drawing Sheets

U.S. PATENT DOCUMENTS

| | | |
|---|---|---|
| 2004/0209585 A1* | 10/2004 | Wang et al. ............... 455/226.1 |
| 2005/0259721 A1 | 11/2005 | Kawamoto et al. |
| 2007/0259623 A1 | 11/2007 | Tanaka et al. |
| 2008/0253432 A1 | 10/2008 | Kawamoto et al. |
| 2009/0022217 A1* | 1/2009 | Kimata ........................ 375/346 |
| 2009/0196434 A1* | 8/2009 | Sugiyama et al. ........... 381/94.2 |

FOREIGN PATENT DOCUMENTS

| | | |
|---|---|---|
| JP | 2003-143045 | 5/2003 |
| JP | 2003-258758 | 9/2003 |
| JP | 2004-080191 | 3/2004 |
| JP | 2005-328311 | 11/2005 |
| JP | 2006-011706 | 1/2006 |
| JP | 2006-186421 | 7/2006 |
| JP | 2006-345500 | 12/2006 |
| WO | 2006/003776 | 1/2006 |

* cited by examiner

RECEPTION DEVICE AND RECEPTION METHOD

TECHNICAL FIELD

The present invention relates to a receiver and a reception method for estimating transmission signals by performing a weighting calculation onto reception signals received by a plurality of antennas.

BACKGROUND ART

Technologies regarding a radio system provided with a plurality of antennas and a high-frequency unit (hereinafter, such system is referred to as "multi-antenna radio system") are currently studied and developed eagerly because the multi-antenna radio system is regarded as means for achieving current and future large-capacity, high-speed communications.

In the technological field of the wireless LAN (Local Area Network), the methods especially attracting attention are the Maximum Ratio Combining (MRC) method for improving the reception performance by controlling the directionality of the multi-antenna radio system, and the Multiple Input Multiple Output (MIMO) method for increasing the communication capacity.

The Minimum Mean Square Error (MMSE) method is known as a high-accuracy channel equalizing means in the multi-antenna wireless system, and as a high-accuracy signal separating/combining means in the MIMO method.

The following describes an outline of operations by the MMSE method for generating a weight matrix for use in the weighting calculation performed onto reception signals, and performing the weighting calculation onto the reception signals using the generated weight matrix.

First, in the MIMO method, the radio communication device estimates the channel characteristic for each channel in accordance with pilot signals included in the reception signals, and estimates the noise power included in the reception signals. Then, the radio communication device generates a weight matrix $W_C$ by performing a calculation of the following Equation (1) using a channel matrix $H_C$ whose matrix elements are estimation values of channel characteristics of each channel obtained by the estimation, and using an estimation value $\sigma_C^2$ of the noise power of noise included in each reception signal obtained by the estimation. Note that the weight matrix $W_C$ is a matrix whose matrix elements are weighting coefficients for the signals corresponding to the provided antennas.

[Equation 1]

$$W_C = (H_C^H H_C + \sigma_C^2 I)^{-1} H_C^H \quad (1)$$

In Equation (1), "I" represents a unit matrix, "[ ]$^H$" represents a complex conjugate transposed Matrix of a matrix [ ], and "[ ]$^{-1}$" represents an inverse matrix of a matrix [ ].

Note that Equation (1) is a calculation equation for obtaining the weight matrix $W_C$ by a general MMSE method.

Next, the radio communication device estimates a transmission signal with a maximized ratio of signal power to noise power by performing a calculation of the following Equation (2) using the weight matrix $W_C$ obtained by the calculation of Equation (1) above, and using a reception signal matrix $r_C$ whose matrix elements are reception signals. Note that in the following Equation (2), "$s_C$" represents a transmission signal or a transmission signal matrix whose matrix elements are transmission signals.

[Equation 2]

$$s_C = W_C r_C \quad (2)$$

It is understood from the Equations (1) and (2) that, to achieve a high-accuracy estimation of a transmission signal, it is necessary to generate the weight matrix $W_C$ accurately, and that, to generate the weight matrix $W_C$ accurately, it is necessary to estimate the channel characteristic and noise power of each channel accurately.

In the future radio communications with large-capacity, high-speed transmissions, it will be necessary to estimate the noise power more accurately than now and before. However, as the case now stands, development of technologies for estimating the noise power accurately is inactive.

In these circumstances, there are some documents that disclose methods of estimating the noise power with the MMSE method. The following describes an outline of the technology disclosed in Patent Document 1 identified below, as one example of such documents.

A noise power estimation device disclosed in Patent Document 1 calculates a correlation between a reception signal and a pilot signal, and obtains a reception power for each channel. The noise power estimation device then, with use of a predetermined power ratio between the pilot signal and a data signal, obtains a corrected reception power of the pilot signal for each channel by removing a multipath interference component from the reception power of the pilot signal for each channel.

The noise power estimation device estimates a noise power by estimating a total power of the pilot signal and data signal included in the reception signal based on the corrected reception power of a plurality of channels and the predetermined power ratio, and subtracting the estimated total power from the total power of the reception signal.

Also, Patent Document 2 identified below is one example of documents disclosing a method for preliminarily measuring a plurality of characteristic amounts with respect to interference and noise of unnecessary signals before a desired signal arrives, and when a desired signal arrives, maximizing a ratio of the power of desired signal to the power of unnecessary signals by the MMSE method, using the characteristic amounts of unnecessary signals having been measured preliminarily.

FIG. 26 shows the structure of a radio communication device disclosed in Patent Document 2.

In a radio communication device 1000, antennas 1011 and 1015 receive reception signals, variable gain amplification units 1021 and 1025 amplify the reception signals, and then down converters 1031 and 1035 convert them into reception signals in the baseband. An AGC unit 1040 controls the gain of the variable gain amplification units 1021 and 1025 so that the amplitude level or the power level of the output signal of the down converters 1031 and 1035 becomes constant.

When the characteristic amounts of unnecessary signals are measured (hereinafter referred to as "during measuring of the interference"), an interference noise estimation unit 1060 estimates a plurality of characteristic amounts of unnecessary signals, based on the reception signal in the baseband. The interference noise estimation unit 1060 then generates a covariance matrix $R_{UUC}$ whose matrix elements are estimation values of the characteristic amounts obtained by the estimation, and holds the generated covariance matrix $R_{UUC}$. Note that the covariance matrix $R_{UUC}$ is a covariance matrix of unnecessary signal matrix $U_C$ whose matrix elements are unnecessary signals corresponding to the provided antennas.

Also, during measuring of the interference, the gain value (hereinafter referred to as "interference gain value") of the variable gain amplification units 1021 and 1025 controlled by the AGC unit 1040 is held by an interference measuring time gain holding unit 1071 provided in an amplitude correction unit 1070.

During reception of a desired signal, a channel characteristic estimation unit 1050 estimates the channel characteristic for each channel based on the pilot signal included in the reception signal in the baseband, and generates a channel matrix $H_C$ whose matrix elements are the estimation values of each channel characteristic obtained by the estimation.

Also, during reception of a desired signal, a gain ratio calculation unit 1072 determines a gain value (hereinafter referred to as "desired gain value") of the variable gain amplification units 1021 and 1025 controlled by the AGC unit 1040, and calculates a gain ratio $\Delta g_C$ that is a ratio of the desired gain value to the interference gain value held by the interference measuring time gain holding unit 1071. A multiplication unit 1073 then obtains a matrix $\Delta g_C R_{UUC}$ by multiplying the gain ratio $\Delta g_C$ by the covariance matrix $R_{UUC}$ held by the interference noise estimation unit 1060, and outputs the obtained matrix $\Delta g_C R_{UUC}$ to a weight generation unit 1080.

The weight generation unit 1080 generates a weight matrix $W_C$ by performing a calculation of the following Equation (3) using the channel matrix $H_C$ and the matrix $\Delta g_C R_{UUC}$.

[Equation 3]

$$W_C = H_C^H (H_C H_C^H + \Delta g_C R_{UUC})^{-1} \qquad (3)$$

A weighting calculation unit 1090 estimates a transmission signal by multiplying the weight matrix $W_C$ by a reception signal matrix $r_C$ whose matrix elements are reception signals in the baseband, and a demodulation unit 1100 demodulates an estimated transmission signal.

Patent Document 1: Japanese Patent Application Publication No. 2005-328311

Patent Document 2: International Publication Pamphlet No. 2006/003776

DISCLOSURE OF THE INVENTION

The Problems the Invention Is Going to Solve

However, the noise power estimation device disclosed in Patent Document 1 requires a correlation circuit for calculating a correlation between a reception signal and a pilot signal. In general, circuit scale of the correlation circuit is large. It is feared therefore that provision of a correlation circuit would increase the circuit scale.

In addition, it is considered that an estimated noise power includes an error compared with an original noise power since the received pilot signal includes a noise component. As described above, to generate the weight matrix $W_C$ accurately, it is necessary to estimate the noise power accurately. Accordingly, the noise power estimation device disclosed in Patent Document 1 cannot generate the weight matrix $W_C$ accurately, and cannot estimate the transmission signal accurately.

The radio communication device 1000 disclosed in Patent Document 2, during measuring of the interference, estimates a plurality of characteristic amounts of unnecessary signals using the reception signal in the baseband that is actually received. As a result, the noise power of noise in the estimation values (matrix elements of the covariance matrix $R_{UUC}$) of the plurality of characteristic amounts estimated during measuring of the interference matches the noise power of noise included in the reception signal in the baseband which are actually received.

The radio communication device, during reception of a desired signal, corrects the amplitude of the estimation value of each characteristic amount based on the gain ratio $\Delta g_C$, where the estimation value has been obtained by the estimation during measuring of the interference.

However, there is noise that occurs in the high-frequency unit (including the variable gain amplification units 1021 and 1025 and the down converters 1031 and 1035), and the noise power of the noise does not vary linearly with the gain value of the variable gain amplification units 1021 and 1025. Accordingly, among the amplitude correction characteristic amounts that are obtained by correcting the amplitude of each estimation value obtained by the estimation of the plurality of characteristic amounts, the noise power of noise has an error compared with the noise power of noise that is actually included in the reception signal in the baseband during reception of the desired signal.

The following further discusses about the fact that the noise power of noise among the amplitude correction characteristic amounts has an error.

During measuring of interference, when an interference signal has arrived at the radio communication device 1000, the AGC unit 1040 is activated based on the arrival power of the interference signal, and when an interference signal has not arrived at the radio communication device 1000, the AGC unit 1040 is activated so that the gain of the variable gain amplification units 1021 and 1025 becomes the maximum gain. Here, among the estimation values (matrix elements of covariance matrix $R_{UUC}$) of the characteristic amounts obtained by the estimation during measuring of interference, the noise power of noise that occurs in the high-frequency unit matches the noise power of noise that actually occurs in the high-frequency unit, regardless of whether or not an interference signal has arrived.

During reception of a desired signal, the AGC unit 1040 is activated based on the arrival power of the desired signal, and the amplitude correction unit 1070 corrects the amplitude of the estimation value of each of the plurality of characteristic amounts based on the gain ratio $\Delta g_C$, where the estimation value has been obtained by the estimation during measuring of the interference.

Here, however, the amplitude of the noise power of noise that occurs in the high-frequency unit is also corrected based on the gain ratio $\Delta g_C$, although the noise power of noise that occurs in the high-frequency unit is not amplified by the variable gain amplification units 1021 and 1025.

As a result, among the amplitude correction characteristic amounts, the noise power of noise that occurs in the high-frequency unit includes an error compared with the noise power of noise that occurs in the high-frequency unit during reception of the desired signal.

Further, that the noise power of noise among the amplitude correction characteristic amounts includes an error will be explained using equations.

The covariance matrix $R_{UUC}$ during measuring of interference is represented by the following Equation (4), using a covariance matrix $R_{HC}$ whose matrix elements are components regarding thermal noise of an interference signal and the antennas 1011 and 1015, and an average noise power $n_C$ of noise that occurs in the high-frequency unit.

[Equation 4]

$$R_{UUC} = R_{HC} + n_C I \qquad (4)$$

The following Equation (5) is obtained when the Equation (4) is substituted into the Equation (3) above.

[Equation 5]

$$W_C = H_C^H (H_C H_C^H + \Delta g_C R_{HC} + \Delta g_C n_C I)^{-1} \qquad (5)$$

In the actuality, a noise power $n_C$ of noise that occurs in the high-frequency unit is not amplified by the variable gain amplification units 1021 and 1025. However, according to the weight matrix $W_C$ represented by the Equation (5) shown above, the amplitude of noise power $n_C$ of noise is corrected based on the gain ratio $\Delta g_C$. It is understood from this that the noise power $n_C$ of noise that occurs in the high-frequency unit causes an error to occur in the weight matrix $W_C$.

Note that the following Equation (6) represents an optimum weight matrix $W_C$ by the MMSE method.

[Equation 6]

$$W_C = H_C^H (H_C H_C^H + \Delta g_C R_{HC} + n_C I)^{-1} \qquad (6)$$

As described above, the radio communication device 1000 cannot perform a high-accuracy estimation of a transmission signal since the weight matrix $W_C$ includes an error.

Also, in Equation (5), when the value of the gain ratio $\Delta g_C$ is small enough to exceed the actual range of limited accuracy, the gain ratio $\Delta g_C$ is treated as zero. When this happens, each matrix element of the matrix $\Delta g_C R_{HC} + \Delta g_C n_C I$ becomes zero. In the MMSE method, when a component of unnecessary signals is zero, a calculation of, for example, the weight matrix $W_C$ fails.

As understood from these, in the radio communication device 1000, when there is a great difference in the power level between the desired signal and the unnecessary signals, the MMSE calculation fails.

It is therefore an object of the present invention to provide receiver and a reception method with a simple structure for improving the estimation accuracy in estimating the noise amount of noise which is used for generating weights to be used in a weighting calculation on the reception signal. It is another object of the present invention to provide a receiver and a reception method for improving the correction accuracy in correcting the noise amount of noise among the characteristic amounts of unnecessary signals used for generating the weight matrix.

Means to Solve the Problems

The above object is fulfilled by a receiver comprising: a plurality of antennas; a high-frequency unit operable to perform a predetermined process including amplification of reception signals received by the plurality of antennas; a gain control unit operable to control a gain of the high-frequency unit so that a plurality of reception process signals output from the high-frequency unit satisfy a predetermined condition; a channel characteristic estimation unit operable to estimate a channel characteristic for each channel, in accordance with pilot signals included in the plurality of reception process signals output from the high-frequency unit; a noise estimation unit operable to estimate a noise amount of noise included in each of the plurality of reception process signals output from the high-frequency unit, in accordance with a control gain value which is a gain value of the high-frequency unit obtained by the control performed by the gain control unit ; a weight generation unit operable to generate weights for use in a weighting calculation on the plurality of reception process signals output from the high-frequency unit, in accordance with a result of the estimation performed by the channel characteristic estimation unit and a result of the correction performed by the noise amount correction unit; and a weighting calculation unit operable to perform the weighting calculation on the plurality of reception process signals output from the high-frequency unit, in accordance with the weights generated by the weight generation unit.

The above object is also fulfilled by a reception method for use in a receiver that includes a plurality of antennas, a high-frequency unit operable to perform a predetermined process including amplification of reception signals received by the plurality of antennas, and a gain control unit operable to control a gain of the high-frequency unit so that a plurality of reception process signals output from the high-frequency unit satisfy a predetermined condition, the reception method performing, in the receiver, a weighting calculation onto the plurality of reception process signals output from the high-frequency unit, in accordance with weights, the reception method comprising the steps of: estimating a channel characteristic for each channel, in accordance with pilot signals included in the plurality of reception process signals output from the high-frequency unit; estimating a noise amount of noise included in each of the plurality of reception process signals output from the high-frequency unit, in accordance with a control gain value which is a gain value of the high-frequency unit obtained by the control performed by the gain control unit; generating weights for use in a weighting calculation on the plurality of reception process signals output from the high-frequency unit, in accordance with results of the estimations performed by the channel characteristic estimation step and the noise estimation step; and performing the weighting calculation on the plurality of reception process signals output from the high-frequency unit, in accordance with the weights generated by the weight generation step.

Effects of the Invention

With the above-described structure of either the receiver or the reception method, the noise amount of noise included in the plurality of reception process signals output from the high-frequency unit is estimated in accordance with the gain value of the high-frequency unit. It is thus possible to estimate accurately, with a simple structure, the noise amount of noise included in the reception process signals that varies depending on the gain value of the high-frequency unit. This enables the weights, which are used in the weighting calculation performed on the reception process signals, to be generated accurately, thus improving, with a simple structure, the estimation accuracy of transmission signals.

In the above-stated receiver, the noise estimation unit may include: a noise amount information storage unit storing noise amount information which indicates relationships between the gain value of the high-frequency unit and the noise amount of noise included in the reception process signals output from the high-frequency unit; and a noise amount estimation unit operable to estimate a noise amount of noise included in each of the reception process signals output from the high-frequency unit, in accordance with the control gain value by referring to the noise amount information stored in the noise amount, information storage unit.

With the above-described structure, the noise amount of noise is estimated using the noise amount information which indicates relationships between the gain value of the high-frequency unit and the noise amount of noise included in the reception process signals output from the high-frequency unit. This makes it possible to estimate the noise amount of noise with high accuracy and a simple structure.

In the above-stated receiver, the weight generation unit may generate, as the weights, a phase weight for performing a phase weighting calculation with respect to phase in the weighting calculation, and an amplitude correction value for performing a calculation with respect to amplitude in the weighting calculation, and the weighting calculation unit includes: a bit detection unit operable to detect a most significant bit in a code sequence representing the amplitude correction value generated by the weight generation unit; an amplitude correction value bit shift unit operable to, in accordance with the most significant bit detected by the bit detection unit, shifts bits of the amplitude correction value generated by the weight generation unit; a phase weighting calculation unit operable to perform a phase weighting calculation with respect to phase in the reception process signals output from the high-frequency unit, in accordance with the phase weight generated by the weight generation unit; a phase weighting signal bit shift unit operable to shift bits of a phase weighting signal, which is obtained by the phase weighting calculation performed by the phase weighting calculation unit, in accordance with the most significant bit detected by the bit detection unit; and a signal amplitude correction unit operable to correct an effective phase weighting signal, which is obtained by the bit shift performed by the phase weighting signal bit shift unit, in accordance with an effective amplitude correction value obtained by the bit shift performed by the amplitude correction value bit shift unit.

The effective amplitude correction value is obtained by extracting an effective number of the amplitude correction value by shifting bits of the amplitude correction value. And the effective phase weighting signal is obtained by extracting an effective number of the phase weighting signal by shifting bits of the phase weighting signal.

The effective amplitude correction value has the same information as the amplitude correction value, but has a smaller number of digits for calculation than the amplitude correction value. Also, the effective phase weighting signal has the same information as the phase weighting signal, but has a smaller number of digits for calculation than the phase weighting signal.

In the above-described receiver, the effective phase weighting signal and the effective amplitude correction value are used in the weighting calculation performed onto the plurality of reception process signals output from the high-frequency unit. Accordingly, the number of calculations, especially, the number of multiplications and divisions, performed in the weighting calculation is reduced.

In the above-stated receiver, the weight generation unit may generate, as the weights, a phase weight for performing a phase weighting calculation with respect to phase in the weighting calculation, and an amplitude correction value for performing a calculation with respect to amplitude in the weighting calculation, and the weighting calculation unit includes: a bit detection unit operable to detect a most significant bit in a code sequence representing the amplitude correction value generated by the weight generation unit; a phase weight bit shift unit operable to, in accordance with the most significant bit detected by the bit detection unit, shifts bits of the phase weight generated by the weight generation unit; an amplitude correction value bit shift unit operable to, in accordance with the most significant bit detected by the bit detection unit, shifts bits of the amplitude correction value generated by the weight generation unit; a weight amplitude correction unit operable to correct an effective phase weight, which is obtained by the bit shift performed by the phase weight bit shift unit, in accordance with an effective amplitude correction value which is obtained by the bit shift performed by the amplitude correction value bit shift unit; and an effective weighting calculation unit operable to perform a weighting calculation onto a plurality of reception process signals output from the high-frequency unit, in accordance with an effective weight which is obtained by the correction performed by the weight amplitude correction unit.

The effective amplitude correction value is obtained by extracting an effective number for the amplitude correction value by shifting bits of the amplitude correction value. And the effective phase weight is obtained by extracting an effective number for the phase weight by shifting bits of the phase weight.

The effective amplitude correction value has the same information as the amplitude correction value, but has a smaller number of digits for calculation than the amplitude correction value. Also, the effective phase weight has the same information as the phase weight, but has a smaller number of digits for calculation than the phase weight.

In the above-described receiver, the effective phase weight and the effective amplitude correction value are used in the weighting calculation performed onto the plurality of reception process signals output from the high-frequency unit. Accordingly, the number of calculations, especially, the number of multiplications and divisions, performed in the weighting calculation is reduced.

The above object is also fulfilled by a receiver comprising: a plurality of antennas; a high-frequency unit operable to perform a predetermined process including amplification of reception signals received by the plurality of antennas; a gain control unit operable to control a gain of the high-frequency unit so that a plurality of reception process signals output from the high-frequency unit satisfy a predetermined condition; a channel characteristic estimation unit operable to estimate a channel characteristic for each channel, in accordance with pilot signals included in the plurality of reception process signals output from the high-frequency unit; an interference noise estimation unit operable to estimate interference and noise amounts of a plurality of unnecessary signals with respect to interference and noise included in the plurality of reception process signals output from the high-frequency unit, in accordance with the plurality of reception process signals; an amplitude correction unit operable to correct each of estimation values of interference and noise amounts of the unnecessary signals obtained by the estimation performed by the interference noise estimation unit, in accordance with a gain ratio that is a ratio of a second control gain value to a first control gain value, wherein the first control gain value is a gain value of the high-frequency unit during the estimation of interference and noise amounts of the unnecessary signals, and the second control gain value is a gain value of the high-frequency unit during reception of a desired signal; a noise amount correction unit operable to correct noise amount with respect to noise among each amplitude correction interference and noise amount obtained by the correction performed by the amplitude correction unit, in accordance with the second control gain value; a weight generation unit operable to generate weights for use in a weighting calculation to be performed on the plurality of reception process signals output from the high-frequency unit, in accordance with a result of the estimation performed by the channel characteristic estimation unit and a result of the correction performed by the noise amount correction unit; and a weighting calculation unit operable to perform a weighting calculation onto the plurality of reception process signals output from the high-frequency unit, in accordance with the weights generated by the weight generation unit.

The above object is also fulfilled by a reception method for use in a receiver that includes a plurality of antennas, a high-frequency unit operable to perform a predetermined process including amplification of reception signals received by the plurality of antennas, and a gain control unit operable to control a gain of the high-frequency unit so that a plurality of reception process signals output from the high-frequency unit satisfy a predetermined condition, the reception method performing, in the receiver, a weighting calculation onto the plurality of reception process signals output from the high-frequency unit, in accordance with weights, the reception method comprising the steps of: estimating a channel characteristic for each channel, in accordance with pilot signals included in the plurality of reception process signals output from the high-frequency unit; estimating interference and noise amounts of a plurality of unnecessary signals with respect to interference and noise included in the plurality of reception process signals output from the high-frequency unit, in accordance with the plurality of reception process signals; correcting each of estimation values of interference and noise amounts of the unnecessary signals obtained by the estimation performed by the interference noise estimation step, in accordance with a gain ratio that is a ratio of a second control gain value to a first control gain value, wherein the first control gain value is a gain value of the high-frequency unit during the estimation of interference and noise amounts of the unnecessary signals, and the second control gain value is a gain value of the high-frequency unit during reception of a desired signal; correcting noise amount with respect to noise among each amplitude correction interference and noise amount obtained by the correction performed by the amplitude correction step, in accordance with the second control gain value; generating weights for use in a weighting calculation to be performed on the plurality of reception process signals output from the high-frequency unit, in accordance with a result of the estimation performed by the channel characteristic estimation step and a result of the correction performed by the noise amount correction step; and performing a weighting calculation onto the plurality of reception process signals output from the high-frequency unit, in accordance with the weights generated by the weight generation step.

With the above-described structure of either the receiver or the reception method, the estimation values of interference and noise amounts of the unnecessary signals are corrected in accordance with the gain ratio that is a ratio of the second control gain value to the first control gain value, and then the noise amount with respect to noise among each amplitude correction interference and noise amount obtained by the correction is corrected in accordance with the second control gain value of during reception of the desired signal. Therefore, with the above-described structure of either the receiver or the reception method, it is possible to correct accurately, with a simple structure, the interference and noise amounts of unnecessary signals that are used in generating the weights, which are used in the weighting calculation performed on the reception process signals. As a result, with the above-described structure of either the receiver or the reception method, it is possible to generate the weights accurately and improve the estimation accuracy of transmission signals.

In the above-stated receiver, the noise amount correction unit may include: a noise amount information storage unit storing noise amount information which indicates relationships between the gain value of the high-frequency unit and the noise amount of noise included in the reception process signals output from the high-frequency unit; a noise amount estimation unit operable to estimate a noise amount of noise included in each of the reception process signals output from the high-frequency unit, in accordance with the second control gain value by referring to the noise amount information stored in the noise amount information storage unit; and an addition unit operable to add an estimation value of noise amount obtained by the estimation performed by the noise amount estimation unit, to each amplitude correction interference and noise amount obtained by the correction performed by the amplitude correction unit.

With the above-described structure, the amplitude correction interference and noise amounts are corrected using the noise amount information which indicates relationships between the gain value of the high-frequency unit and the noise amount of noise included in the reception process signals output from the high-frequency unit. This makes it possible to correct accurately, with a simple structure, the noise amount of noise among the amplitude correction interference and noise amounts.

In the above-stated receiver, the noise amount correction unit, in accordance with the first control gain value and the second control gain value, may suppress noise amount of noise among each amplitude correction interference and noise amount obtained by the correction performed by the amplitude correction unit, and adds a noise amount of noise determined by a predetermined method.

With the above-described structure, the noise amount of noise among the amplitude correction interference and noise amounts is corrected by suppressing the noise amount of noise among each amplitude correction interference and adding a noise amount of noise determined by a predetermined method. This makes it possible to correct accurately the noise amount of noise among the amplitude correction interference and noise amounts.

In the above-stated receiver, the noise amount correction unit may add the noise amount of noise determined by the predetermined method to each amplitude correction interference and noise amount, and subtracts therefrom a value that is obtained by multiplying the gain ratio by the noise amount of noise.

In the above-stated receiver, the noise amount correction unit may include: a subtraction unit operable to subtract the gain ratio from constant 1; a multiplication unit operable to multiply the noise amount of noise determined by the predetermined method, by a value obtained by the subtraction performed by the subtraction unit; and an addition unit operable to add a multiplication value obtained by the multiplication performed by the multiplication unit, to each amplitude correction interference and noise amount obtained by the correction performed by the amplitude correction unit.

In the above-stated receiver, the noise amount of noise determined by the predetermined method may be an average noise amount of noise that occurs in the high-frequency unit.

With the above-described structures, it is possible to correct accurately the noise amount of noise among the amplitude correction interference and noise amounts, and it is possible to prevent the MMSE calculation from failing since components of the unnecessary signals to be used in generating the weights do not become zero.

In the above-stated receiver, the noise amount correction unit may include: a noise amount information storage unit storing noise amount information which indicates relationships between the gain value of the high-frequency unit and the noise amount of noise included in the reception process signals output from the high-frequency unit; a first correction unit operable to estimate a noise amount of noise included in each of the reception process signals output from the high-frequency unit during the estimation of interference and noise amounts of the unnecessary signals, in accordance with the first control gain value by referring to the noise amount information stored in the noise amount information storage unit, and correct an estimation value of noise amount obtained by the estimation in accordance with the gain ratio; an estimation unit operable to estimate a noise amount of noise included in each of the reception process signals output from the high-frequency unit during reception of the desired signal, in accordance with the second control gain value by referring to the noise amount information stored in the noise amount information storage unit; and a second correction unit operable to subtract a correction noise amount obtained by the correction performed by the first correction unit, from each amplitude correction interference and noise amount obtained by the correction performed by the amplitude correction unit, and add an estimation value of noise amount obtained by the estimation performed by the estimation unit.

With the above-described structure, the amplitude correction interference and noise amounts are corrected using the noise amount information which indicates relationships between the gain value of the high-frequency unit and the noise amount of noise included in the reception process signals output from the high-frequency unit. This makes it possible to correct accurately, with a simple structure, the noise amount of noise among the amplitude correction interference and noise amounts.

In the above-stated receiver, the interference noise estimation unit, in addition to estimating the interference and noise amounts of the unnecessary signals included in the plurality of reception process signals output from the high-frequency unit, may estimate a correlation amount between each of the plurality of reception process signals and each of other reception process signals among the plurality of reception process signals, the amplitude correction unit, in addition to correcting the estimation values of interference and noise amounts in accordance with the gain ratio, corrects each of estimation correlation amounts which are obtained by the estimation performed by the interference noise estimation unit, in accordance with the gain ratio, the receiver further includes an error judgment unit operable to judge whether or not (i) interference and noise amounts and correlation amounts which are obtained by the estimation performed by the interference noise estimation unit, or (ii) amplitude correction correlation amounts that are obtained by the correction of correlation amounts performed by the amplitude correction unit and noise correction interference and noise amount that is obtained by the correction performed by the noise amount correction unit, satisfy a predetermined error allowance condition, the weight generation unit generates the weights when the error judgment unit judges affirmatively, the weight generation unit generates other weights in accordance with a result of the estimation of the channel characteristic performed by the channel characteristic estimation unit, by a method that is different from a method for generating the weights, when the error judgment unit judges negatively, and the weighting calculation unit performs the weighting calculation on the plurality of reception process signals output from the high-frequency unit, in accordance with the weights or the other weights generated by the weight generation unit.

In the above-stated receiver, the error judgment unit may perform the judgment in accordance with a determinant of a first matrix whose diagonal component is the interference and noise amount and whose non-diagonal component is the correlation amount, or in accordance with a determinant of a second matrix whose diagonal component is the noise correction interference and noise amount and whose non-diagonal component is the amplitude correction correlation amount.

In the above-stated receiver, the error allowance condition may be that a value of the determinant of the first matrix or the second matrix is 0 or more.

With the above-described structure, when there may be a deterioration in the accuracy of estimation of transmission signals that is obtained by performing the weighting calculation onto the plurality of reception process signals in accordance with the weights, the transmission signals are estimated by performing the weighting calculation in accordance with other weights. It is therefore possible to prevent the estimation accuracy of transmission signals from deteriorating.

The above-described receiver may further comprise a sub band separation unit operable to separate each of the plurality of reception process signals output from the high-frequency unit into a plurality of frequency bands.

With the above-described structure provided with the sub-band separation unit that separates each of the plurality of reception process signals output from the high-frequency unit into a plurality of frequency bands (subbands), the present invention can be applied to the multi-carrier method such as the OFDM (Orthogonal Frequency Division Multiplexing) method.

In the above-stated receiver, the weight generation unit may generate, as the weights, a phase weight for performing a phase weighting calculation with respect to phase in the weighting calculation, and an amplitude correction value for performing a calculation with respect to amplitude in the weighting calculation, and the weighting calculation unit includes: a bit detection unit operable to detect a most significant bit in a code sequence representing the amplitude correction value generated by the weight generation unit; an amplitude correction value bit shift unit operable to, in accordance with the most significant bit detected by the bit detection unit, shifts bits of the amplitude correction value generated by the weight generation unit; a phase weighting calculation unit operable to perform a phase weighting calculation with respect to phase in the reception process signals output from the high-frequency unit, in accordance with the phase weight generated by the weight generation unit; a phase weighting signal bit shift unit operable to shift bits of a phase weighting signal, which is obtained by the phase weighting calculation performed by the phase weighting calculation unit, in accordance with the most significant bit detected by the bit detection unit; and a signal amplitude correction unit operable to correct an effective phase weighting signal, which is obtained by the bit shift performed by the phase weighting signal bit shift unit, in accordance with an effective amplitude correction value obtained by the bit shift performed by the amplitude correction value bit shift unit.

The effective amplitude correction value is obtained by extracting an effective number for the amplitude correction value by shifting bits of the amplitude correction value. And the effective phase weighting signal is obtained by extracting an effective number for the phase weighting signal by shifting bits of the phase weighting signal.

The effective amplitude correction value has the same information as the amplitude correction value, but has a smaller number of digits for calculation than the amplitude correction value. Also, the effective phase weighting signal has the same information as the phase weighting signal, but has a smaller number of digits for calculation than the phase weighting signal.

In the above-stated receiver, the effective phase weighting signal and the effective amplitude correction value may be used in the weighting calculation performed onto the plurality of reception process signals output from the high-frequency unit. Accordingly, the number of calculations, especially, the number of multiplications and divisions, performed in the weighting calculation is reduced.

In the above-stated receiver, the weight generation unit may generate, as the weights, a phase weight for performing a phase weighting calculation with respect to phase in the weighting calculation, and an amplitude correction value for performing a calculation with respect to amplitude in the weighting calculation, and the weighting calculation unit includes: a bit detection unit operable to detect a most significant bit in a code sequence representing the amplitude correction value generated by the weight generation unit; a phase weight bit shift unit operable to, in accordance with the most significant bit detected by the bit detection unit, shifts bits of the phase weight generated by the weight generation unit; an amplitude correction value bit shift unit operable to, in accordance with the most significant bit detected by the bit detection unit, shifts bits of the amplitude correction value generated by the weight generation unit; a weight amplitude correction unit operable to correct an effective phase weight, which is obtained by the bit shift performed by the phase weight bit shift unit, in accordance with an effective amplitude correction value which is obtained by the bit shift performed by the amplitude correction value bit shift unit; and an effective weighting calculation unit operable to perform a weighting calculation onto a plurality of reception process signals output from the high-frequency unit, in accordance with an effective weight which is obtained by the correction performed by the weight amplitude correction unit.

The effective amplitude correction value is obtained by extracting an effective number for the amplitude correction value by shifting bits of the amplitude correction value. And the effective phase weight is obtained by extracting an effective number for the phase weight by shifting bits of the phase weight.

The effective amplitude correction value has the same information as the amplitude correction value, but has a smaller number of digits for calculation than the amplitude correction value. Also, the effective phase weight has the same information as the phase weight, but has a smaller number of digits for calculation than the phase weight.

In the above-described receiver, the effective phase weight and the effective amplitude correction value are used in the weighting calculation performed onto the plurality of reception process signals output from the high-frequency unit. Accordingly, the number of calculations, especially, the number of multiplications and divisions, performed in the weighting calculation is reduced.

The above object is also fulfilled by a receiver comprising: a plurality of antennas; a channel characteristic estimation unit operable to estimate a channel characteristic for each channel, in accordance with a pilot signal included in a reception signal received by the plurality of antennas; an unnecessary signal estimation unit operable to estimate a plurality of characteristic amounts of unnecessary signals regarding interference and noise included in the reception signal received by the plurality of antennas; an error judgment unit operable to judge whether or not the plurality of characteristic amounts estimated by the unnecessary signal estimation unit satisfy a predetermined error allowance condition; a weight generation unit operable to generate weights for use in a weighting calculation to be performed onto the reception signal, by performing either a first generation process or a second generation process depending on a result of the judgment performed by the error judgment unit, wherein in the first generation process, the weight generation unit generates the weights in accordance with estimated channel characteristics obtained by the estimation performed by the channel characteristic estimation unit and a result of the estimation performed by the unnecessary signal estimation unit, and in the second generation process, the weight generation unit generates other weights in accordance with the estimated channel characteristics obtained by the estimation performed by the channel characteristic estimation unit, by a method that is different from a method for generating the weights; and a weighting calculation unit operable to perform a weighting calculation onto the reception signal received by the plurality of antennas, in accordance with the weights generated by the weight generation unit.

With the above-described structure, when there may be a deterioration in the accuracy of estimation of transmission signals that is obtained by performing the weighting calculation onto the plurality of reception process signals in accordance with the weights, the transmission signals are estimated by performing the weighting calculation in accordance with other weights. It is therefore possible to prevent the estimation accuracy of transmission signals from deteriorating.

The above object is also fulfilled by a receiver comprising: a plurality of antennas; a channel characteristic estimation unit operable to estimate a channel characteristic for each channel, in accordance with a pilot signal included in a reception signal received by the plurality of antennas;, a weight generation unit operable to generate, as weights for use in a weighting calculation to be performed onto the reception signal received by the plurality of antennas, a phase weight for performing a phase weighting calculation with respect to phase in the weighting calculation, and an amplitude correction value for performing a calculation with respect to amplitude in the weighting calculation, in accordance with in accordance with estimated channel characteristics obtained by the estimation performed by the channel characteristic estimation unit; a bit detection unit operable to detect a most significant bit in a code sequence representing the amplitude correction value generated by the weight generation unit; an amplitude correction value bit shift unit operable to, in accordance with the most significant bit detected by the bit detection unit, shifts bits of the amplitude correction value generated by the weight generation unit; a phase weighting calculation unit operable to perform a phase weighting calculation with respect to phase in the reception process signals output from the high-frequency unit, in accordance with the phase weight generated by the weight generation unit; a phase weighting signal bit shift unit operable to shift bits of a phase weighting signal, which is obtained by the phase weighting calculation performed by the phase weighting calculation unit, in accordance with the most significant bit detected by the bit detection unit; and a signal amplitude correction unit operable to correct an effective phase weighting signal, which is obtained by the bit shift performed by the phase weighting signal bit shift unit, in accordance with an effective amplitude correction value obtained by the bit shift performed by the amplitude correction value bit shift unit.

The effective amplitude correction value is obtained by extracting an effective number for the amplitude correction value by shifting bits of the amplitude correction value. And the effective phase weighting signal is obtained by extracting an effective number for the phase weighting signal by shifting bits of the phase weighting signal.

The effective amplitude correction value has the same information as the amplitude correction value, but has a smaller number of digits for calculation than the amplitude correction value. Also, the effective phase weighting signal has the same information as the phase weighting signal, but has a smaller number of digits for calculation than the phase weighting signal.

In the above-described receiver, the effective phase weighting signal and the effective amplitude correction value are used in the weighting calculation performed onto the plurality of reception process signals. Accordingly, the number of calculations, especially, the number of multiplications and divisions, performed in the weighting calculation is reduced.

The above object is also fulfilled by a receiver comprising: a plurality of antennas; a channel characteristic estimation unit operable to estimate a channel characteristic for each channel, in accordance with a pilot signal included in a reception signal received by the plurality of antennas; a weight generation unit operable to generate, as weights for use in a weighting calculation to be performed onto the reception signal received by the plurality of antennas, a phase weight for performing a phase weighting calculation with respect to phase in the weighting calculation, and an amplitude correction value for performing a calculation with respect to amplitude in the weighting calculation, in accordance with in accordance with estimated channel characteristics obtained by the estimation performed by the channel characteristic estimation unit; a bit detection unit operable to detect a most significant bit in a code sequence representing the amplitude correction value generated by the weight generation unit; a phase weight bit shift unit operable to, in accordance with the most significant bit detected by the bit detection unit, shifts bits of the phase weight generated by the weight generation unit; an amplitude correction value bit shift unit operable to, in accordance with the most significant bit detected by the bit detection unit, shifts bits of the amplitude correction value generated by the weight generation unit; a weight amplitude correction unit operable to correct an effective phase weight, which is obtained by the bit shift performed by the phase weight bit shift unit, in accordance with an effective amplitude correction value which is obtained by the bit shift performed by the amplitude correction value bit shift unit; and an effective weighting calculation unit operable to perform a weighting calculation onto the reception signal received by the plurality of antennas, in accordance with an effective weight which is obtained by the correction performed by the weight amplitude correction unit.

The effective amplitude correction value is obtained by extracting an effective number for the amplitude correction value by shifting bits of the amplitude correction value. And the effective phase weight is obtained by extracting an effective number for the phase weight by shifting bits of the phase weight.

The effective amplitude correction value has the same information as the amplitude correction value, but has a smaller number of digits for calculation than the amplitude correction value. Also, the effective phase weight has the same information as the phase weight, but has a smaller number of digits for calculation than the phase weight.

In the above-described receiver, the effective phase weight and the effective amplitude correction value are used in the weighting calculation performed onto the plurality of reception process signals output from the high-frequency unit. Accordingly, the number of calculations, especially, the number of multiplications and divisions, performed in the weighting calculation is reduced.

Figure 1:
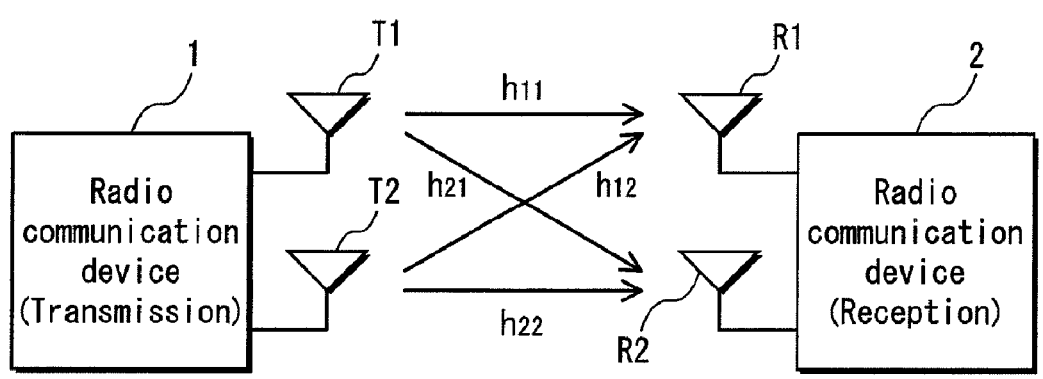
FIG. 1 shows the structure of the radio communication system in Embodiment 1.

DESCRIPTION OF CHARACTERS 10, 20 radio communication device unit
111, 115 antenna
121, 125 variable gain amplification unit
131, 135 down converter
140 AGC unit
150 channel characteristic estimation unit
160 noise estimation unit
161 noise amount information storage unit
162 noise amount estimation unit
170 weight generation unit
180 weighting calculation unit
190 demodulation unit
210 interference noise estimation unit
220 amplitude correction unit
221 interference measuring time gain holding unit 222 gain ratio calculation unit
223 multiplication unit
230 noise amount correction unit
231 1 generation unit
232 average noise amount generation unit
233 subtraction unit
234 multiplication unit
235 addition unit
240 weight generation unit

BEST MODE FOR CARRYING OUT THE INVENTION

<<Embodiment 1>>

The following describes Embodiment 1 of the present invention with reference to the attached drawings.

<Radio Communication System>

A radio communication system including a radio communication device of the present embodiment will be described with reference to FIG. 1. FIG. 1 shows the structure of the radio communication system including the radio communication device of the present embodiment.

The radio communication system includes a plurality of radio communication devices (FIG. 1 shows two radio communication devices (1 and 2)). The radio communication device 1 includes two antennas (T1 and T2), and the radio communication device 2 includes two antennas (R1 and R2). Note that the number of antennas included in each of the radio communication devices 1 and 2 is not limited to two, but may be three or more.

For example, the radio communication device 1 transmits two streams (ST1 and ST2) to the radio communication device 2 by the MIMO transmission.

The radio communication device 1 transmits a transmission signal of the stream ST1 from the antenna T1, and a transmission signal of the stream ST2 from the antenna T2. Each of the transmitted transmission signals is propagated through a space transmission path and is received by each of the antennas R1 and R2 of the radio communication device 2.

The radio communication device 2 estimates the channel characteristic for each channel, based on the pilot signal included in the reception signal of the baseband that is obtained by a certain process. The radio communication device 2 further estimates the noise power of the noise included in the reception signal of the baseband. The radio communication device 2 generates a weight matrix W based on a channel matrix H and an estimation value $\sigma^2$ of the noise power of the noise obtained by the estimation, and performs a weighting calculation onto the reception signal of the baseband based on the generated weight matrix W, where the matrix elements of the channel matrix H are estimation values $h_{11}$ through $h_{22}$ of the channel characteristic obtained by the estimation.

Note that the pilot signal means a signal whose signal waveform is known to both the transmission side and the reception side and is used for estimation of the channel characteristic. For example, the pilot signal corresponds to the long training symbol defined in the IEEE802.11.

Note that, in the present and following embodiments, the functions of only the reception side of the radio communication devices 1 and 2 will be described. This is because the present invention relates to the weighting calculation of the reception signal using the weight matrix W.

<Structure of Radio Communication Device>

Figure 2:
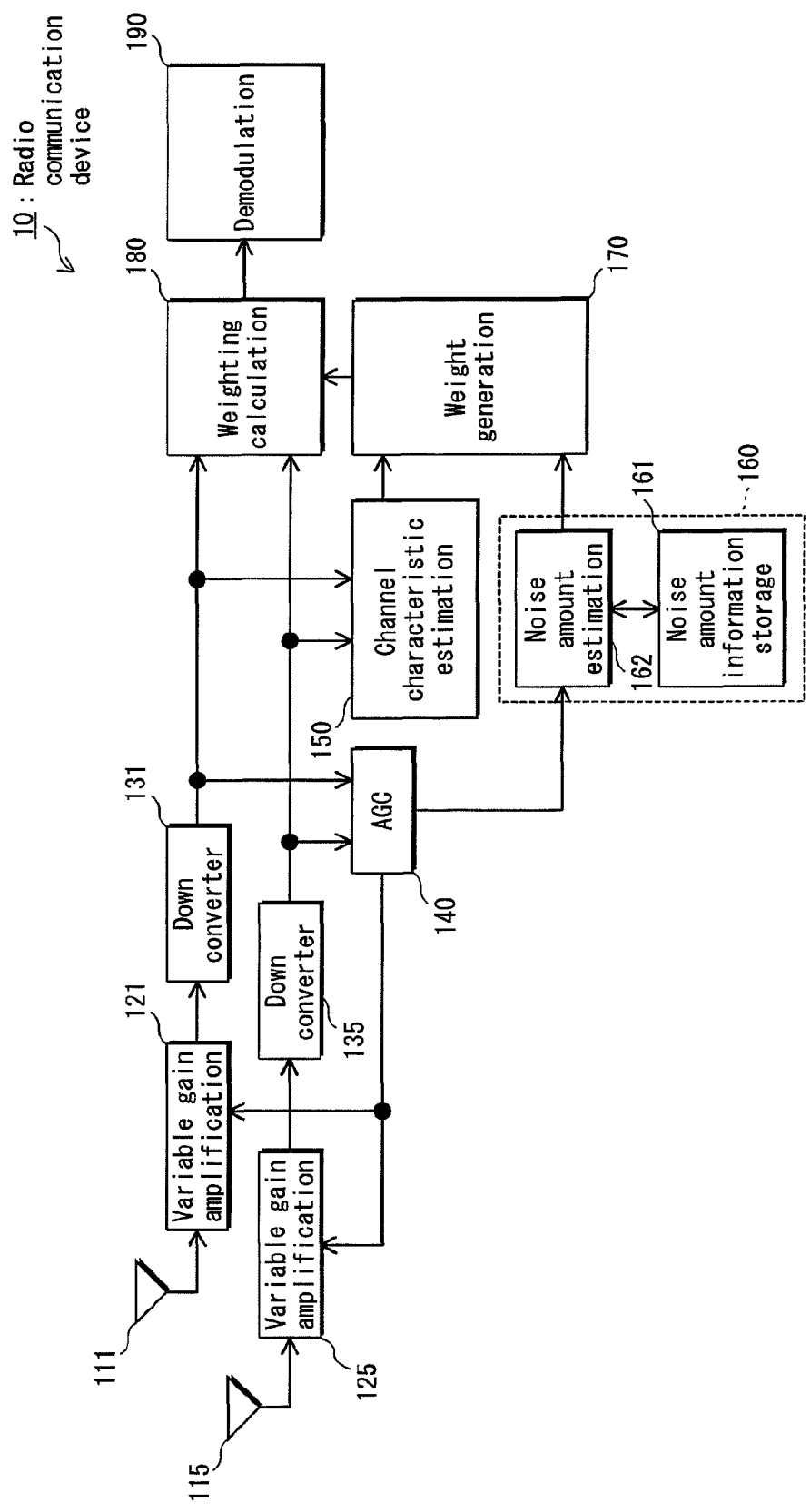
FIG. 2 shows the structure of the radio communication device in Embodiment 1.

The radio communication device of the present embodiment will be described with reference to FIG. 2. FIG. 2 shows the structure of the radio communication device of the present embodiment.

A radio communication device 10, such as the radio communication device 1 or 2, includes antennas 111 and 115 for receiving radio waves, variable gain amplification units 121 and 125, down converters 131 and 135, an AGC unit 140, a channel characteristic estimation unit 150, a noise estimation unit 160, a weight generation unit 170, a weighting calculation unit 180, and a demodulation unit 190.

Figure 15:
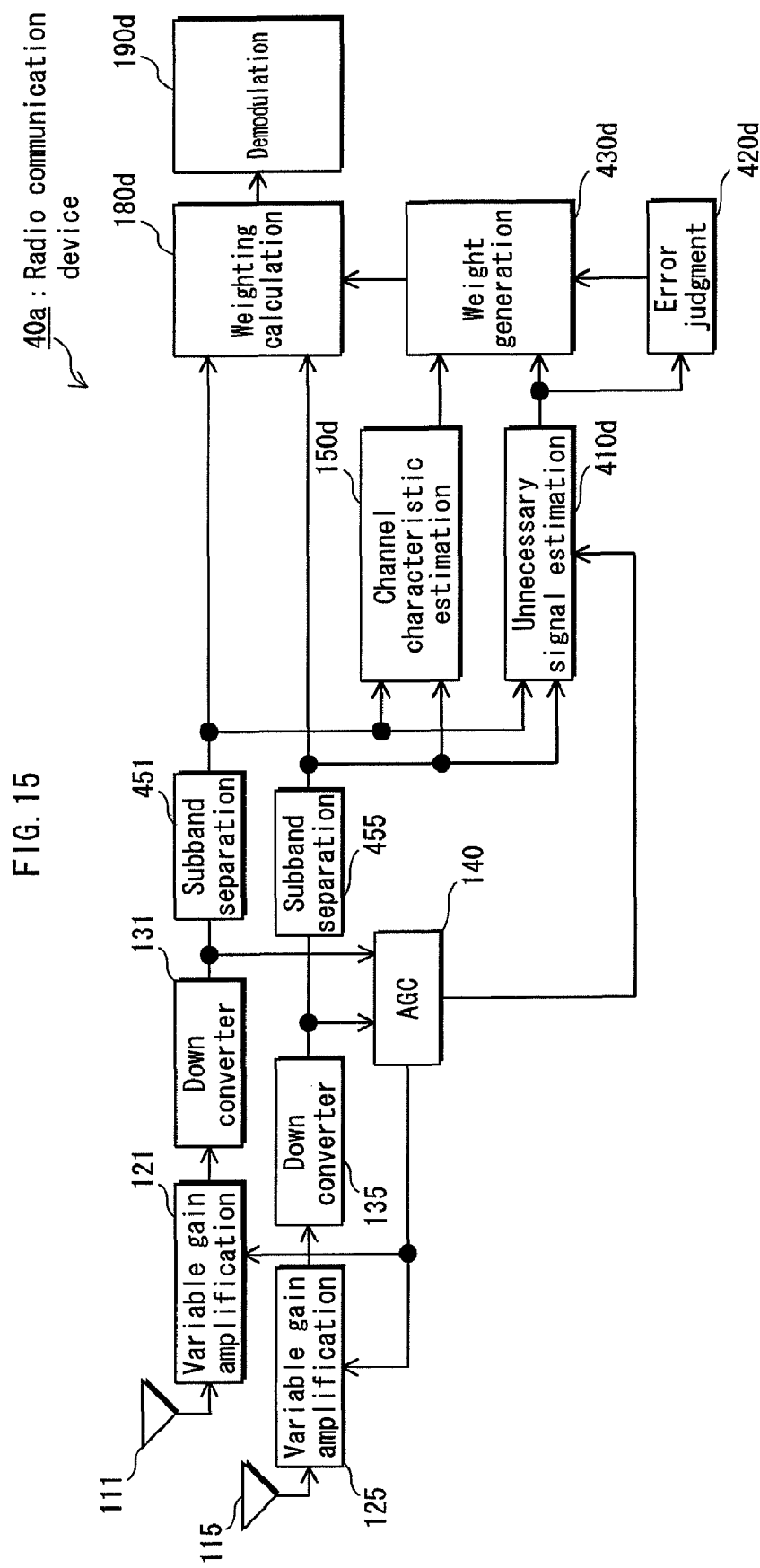
FIG. 15 shows the structure of the radio communication device in Embodiment 9.

Note that, in the present and following embodiments, the cases where the number of reception systems (blocks each of which is composed of an antenna, a variable gain amplification unit, and a down converter, and in the case shown in FIG. 15, each block further includes a subband separation unit) is two are shown in the drawings, but the number of reception systems is not limited to two, but may be three or more.

(Variable Gain Amplification Units 121 and 125)

The variable gain amplification unit 121 amplifies a reception signal input from the antenna 111 based on the gain value, and outputs a signal (hereinafter referred to as "amplification signal"), which is obtained by the amplification, to the down converter 131.

The variable gain amplification unit 125 amplifies a reception signal input from the antenna 115 based on the gain value, and outputs the amplification signal, which is obtained by the amplification, to the down converter 135.

Note that the gain value of the variable gain amplification units 121 and 125 is controlled by the AGC unit 140.

(Down Converters 131 and 135)

The down converter 131 down-converts an amplification signal of a high-frequency band input from the variable gain amplification unit 121 into a digital signal of the baseband (hereinafter, such signal is referred to as "BB signal"), and outputs the BB signal to the AGC unit 140, the channel characteristic estimation unit 150, and the weighting calculation unit 180.

The down converter 135 down-converts an amplification signal of a high-frequency band input from the variable gain amplification unit 125 into a digital signal of the baseband (BB signal), and outputs the BB signal to the AGC unit 140, the channel characteristic estimation unit 150, and the weighting calculation unit 180.

Note that the blocks including the variable gain amplification units 121 and 125 and the down converters 131 and 135 correspond to a high-frequency unit of the radio communication device 10.

(AGC Unit 140)

The AGC (Automatic Gain Control) unit 140 calculates the power of BB signal based on the BB signals output from the down converters 131 and 135, and, based on the calculation results of the power, calculates the gain value of the variable gain amplification units 121 and 125 such that the amplitude or power of BB signal becomes constant. The AGC unit 140 then outputs a gain control signal to the variable gain amplification units 121 and 125, and to a noise amount estimation unit 162 (which will be described later) of the noise estimation unit 160, where the gain control signal indicates a gain value obtained by the calculation of the gain value.

Note that the constant amplitude or the constant power means an amplitude level or a power level that ensures a sufficiently high quantization accuracy while preventing occurrence of overflow when the down converter 131 or 135 converts an analog signal into a digital signal having limited accuracy.

Note, however, that the AGC unit 140, during a first period which will be described in the following, fixes the gain value of the variable gain amplification units 121 and 125 to a gain value at a point in time when an arrival of a desired signal is detected.

Note that the desired signal means a signal that has a preamble signal attached to the head of a packet signal, thereby enabling an arrival of the packet signal to be detected. Here, the preamble signal means a signal whose signal waveform is known to both the transmission side and the reception side and is used for detection of a packet signal and gain adjustment of the variable gain amplification units 121 and 125, and the like. For example, the preamble signal corresponds to the short training symbol defined in the IEEE802.11. Note that the detection of arrival of the desired signal is performed based on the preamble signal.

The above-mentioned first period (1) extends from the detection of arrival of the desired signal to a time when it is judged that the desired signal is not destined to the own device, in the case where the desired signal is not destined to the own device and (2) extends from the detection of arrival of the desired signal to the end of the arrival of the desired signal, in the case where the desired signal is destined to the own device.

Note that the AGC unit 140 may control the gains of the variable gain amplification units 121 and 125 such that the amplitude or power of the amplification signals output from the variable gain amplification units 121 and 125 becomes constant.

(Channel Characteristic Estimation Unit 150)

The channel characteristic estimation unit 150, during reception of a pilot signal included in the desired signal, estimates the channel characteristic for each channel by performing a correlation calculation between each of one or more pilot signals included in the BB signals input from the down converters 131 and 135 and the pilot signal (whose signal waveform is known to the reception side) on the transmission side corresponding to the pilot signal that is being received. The channel characteristic estimation unit 150 then creates a channel matrix H whose matrix elements are the estimation values of the channel characteristic obtained by the estimation, and outputs the created channel matrix H to the weight generation unit 170.

(Noise Estimation Unit 160)

The noise estimation unit 160 estimates the noise power (noise amount) of the noise included in the BB signals output from the down converters 131 and 135. The noise estimation unit 160 includes a noise amount information storage unit 161 and a noise amount estimation unit 162.

[Noise Amount Information Storage Unit 161]

The noise amount information storage unit 161 is, for example, a semiconductor memory for storing noise amount information which indicates relationships between the gain value of the variable gain amplification units 121 and 125 and the amount of noise included in the BB signals output from the down converters 131 and 135.

—Outline of Noise Amount Information

Figure 3B:
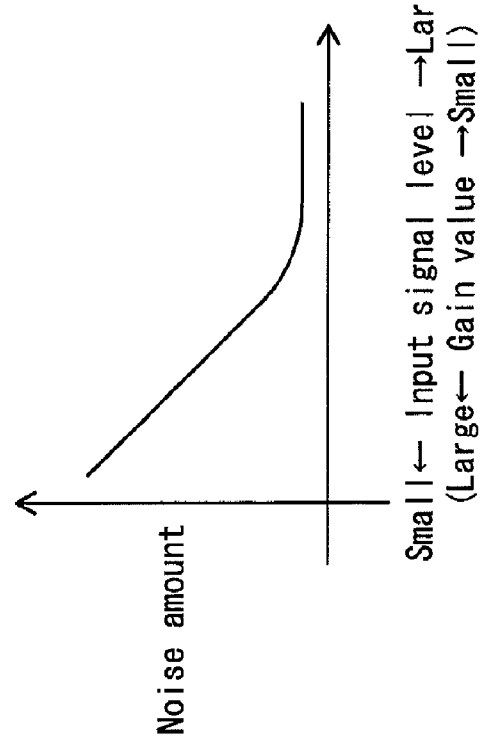
FIGS. 3A and 3B provide illustrations for explanation of the noise amount information stored in the noise amount information storage unit in Embodiment 2.
Figure 3A:
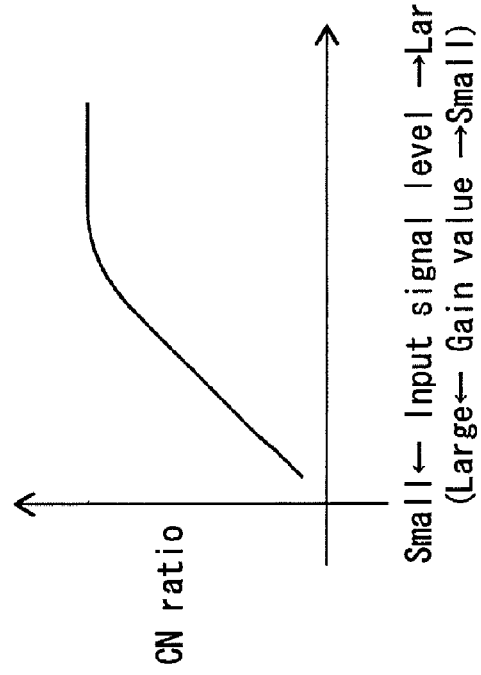

Here, the noise amount information stored in the noise amount information storage unit 161 will be described with reference to FIGS. 3A and 3B. FIGS. 3A and 3B provide illustrations for explanation of the noise amount information stored in the noise amount information storage unit 161. Note that in FIGS. 3A and 3B, both vertical and horizontal axes are logarithmic (decibel) displays.

FIG. 3A shows the CN (Carrier to Noise) ratio characteristic of the BB signal when the AGC unit 140 controls the gains of the variable gain amplification units 121 and 125 that are used in a general-purpose radio communication module.

The horizontal axis of FIG. 3A indicates the signal level of the input signal input into the variable gain amplification units 121 and 125 (or the gain value of the variable gain amplification units 121 and 125). The vertical axis of FIG. 3A indicates the CN ratio of the signal power (signal amount) of signals included in the BB signals output from the down converters 131 and 135 to the noise power (noise amount) of the noise included in the same BB signals output from the down converters 131 and 135.

In general, the smaller the signal level of the input signal is, the larger the gain value of the variable gain amplification units 121 and 125 is, due to the gain control performed by the AGC unit 140. As the gain value of the variable gain amplification units 121 and 125 becomes larger, the noise amount of the noise is amplified greatly, and the CN ratio becomes smaller. Accordingly, as shown in FIG. 3A, as the signal level of the input signal becomes smaller, namely, as the gain value of the variable gain amplification units 121 and 125 becomes larger, the CN ratio of the BB signals output from the down converters 131 and 135 becomes smaller.

As the signal level of the input signal becomes larger, the gain value of the variable gain amplification units 121 and 125 becomes smaller, due to the gain control performed by the AGC unit 140. As the gain value of the variable gain amplification units 121 and 125 becomes smaller, the noise amount of the noise output from the variable gain amplification units 121 and 125 becomes smaller, and thus the CN ratio of the BB signals output from the down converters 131 and 135 becomes larger relatively. Accordingly, as shown in FIG. 3A, as the signal level of the input signal becomes larger, namely, as the gain value of the variable gain amplification units 121 and 125 becomes smaller, the CN ratio of the BB signals output from the down converters 131 and 135 becomes larger.

However, as shown in FIG. 3A, with respect to the signal levels of the input signal exceeding a predetermined level, even if the signal level of the input signal becomes larger, namely, even if the gain value of the variable gain amplification units 121 and 125 becomes smaller, the CN ratio of the BB signals output from the down, converters 131 and 135 hardly becomes larger.

This is because the noise amount of the noise generated by the variable gain amplification units 121 and 125 and the down converters 131 and 135 becomes more dominant than the noise amount of the noise included in the input signal input into the variable gain amplification units 121 and 125.

FIG. 3B shows the noise amount characteristic of the BB signal when the AGC unit 140 controls the gains of the variable gain amplification units 121 and 125 that are used in a general-purpose radio communication module.

The horizontal axis of FIG. 3B indicates the signal level of the input signal input into the variable gain amplification units 121 and 125 (or the gain value of the variable gain amplification units 121 and 125). The vertical axis of FIG. 3B indicates the noise amount of the noise included in the BB signals output from the down converters 131 and 135. Note that the noise amount characteristic shown in FIG. 3B is obtained based on the CN ratio characteristic shown in FIG. 3A.

As shown in FIG. 3B, the larger the signal level of the input signal is, namely, the smaller the gain value of the variable gain amplification units 121 and 125 is, the smaller the noise amount of the noise included in the BB signals is.

However, with respect to the signal levels of the input signal exceeding a predetermined level, even if the signal level of the input signal becomes larger, namely, even if the gain value of the variable gain amplification units 121 and 125 becomes smaller, the noise amount of the noise included in the BB signals output from the down converters 131 and 135 hardly becomes smaller.

The noise amount information storage unit 161 stores noise amount information that indicates relationships between the gain value of the variable gain amplification units 121 and 125 and the noise amount of the noise included in the BB signals output from the down converters 131 and 135, the relationships being created based on the noise amount characteristic shown in FIG. 33.

Note that it is preferable that the noise amount information to be stored in the noise amount information storage unit 161 is created by taking account of the CN ratio characteristic of the high-frequency unit that includes the variable gain amplification units 121 and 125 and the down converters 131 and 135 that are actually provided in the radio communication device 10.

[Noise Amount Estimation Unit 162]

The noise amount estimation unit 162 specifies a gain value (hereinafter referred to as "control gain value") of the variable gain amplification units 121 and 125 based on the gain control signal input from the AGC unit 140 during reception of a desired signal (namely, during the first period). The noise amount estimation unit 162 then estimates a noise amount of noise corresponding to the specified control gain value (that is to say, a noise amount of noise included in the BB signals output from the down converters 131 and 135 during reception of a desired signal) by referring to the noise amount information stored in the noise amount information storage unit 161, and outputs an estimation value $\sigma^2$ of the estimated noise amount to the weight generation unit 170.

The noise estimation unit 160 estimates the noise amount of noise included in the BB signals during reception of a desired signal, by using the noise amount information that is created by taking account of the characteristic of the variable gain amplification units 121 and 125 and the like that has been explained with reference to FIGS. 3A and 3B. With this structure, the noise estimation unit 160 can accurately estimate the noise amount of noise included in the BB signals during reception of a desired signal.

(Weight Generation Unit 170)

The weight generation unit 170 generates a weight matrix W by performing a calculation of the following Equation (7) using the channel matrix H input from the channel characteristic estimation unit 150 and the estimation value $\sigma^2$ of the noise amount input from the noise amount estimation unit 162 during reception of a desired signal. The weight generation unit 170 then outputs the generated weight matrix W to the weighting calculation unit 180.

[Equation 7]

$$W = H^H (HH^H + \sigma^2 I)^{-1} \qquad (7)$$

(Weighting Calculation Unit 180)

The weighting calculation unit 180 multiplies the weight matrix W input from the weight generation unit 170 by a reception signal matrix r whose matrix elements are BB signals output from the down converters 131 and 135, and outputs a transmission signal, which is obtained by the multiplication, to the demodulation unit 190.

Note that, when the transmission signal is a single stream signal, the weighting calculation unit 180 operates as an MRC that takes the noise amount into account. Also, when the transmission signals for the MIMO system and the like is composed of a plurality of stream signals, the weighting calculation unit 180 operates as a stream separation that performs separation and synthesis onto the transmission signal that has been synthesized in the middle of a transmission, taking noise amount into account.

(Demodulation Unit 190)

The demodulation unit 190 demodulates the transmission signal input from the weighting calculation unit 180, and outputs a demodulation signal, which is obtained by the demodulation, to a circuit unit that follows itself.

<Operation of Radio Communication Device>

The reception operation of the radio communication device 10 shown in FIG. 2 will be described.

In the radio communication device 10, the reception signals received by the antennas 111 and 115 are amplified by the variable gain amplification units 121 and 125, and then down-converted by the down converters 131 and 135. Note that the AGC unit 140 controls the gains of the 121 and 125 such that the amplitude level or the power level of the output signals of the down converters 131 and 135 becomes constant.

When an arrival of a desired signal is detected by a signal detection unit (not illustrated) of the radio communication device 10, the AGC unit 140 fixes the gain value of the 121 and 125 to a value at a point in time when the arrival of the desired signal is detected.

The channel characteristic estimation unit 150 estimates the channel characteristic for each channel based on the one or more pilot signals included in the BB signals output from the down converters 131 and 135, and outputs a channel matrix H, whose matrix elements are the estimation values of the channel characteristic obtained by the estimation, to the weight generation unit 170.

The noise amount estimation unit 162 estimates a noise amount of noise corresponding to the gain value (control gain value) of the variable gain amplification units 121 and 125 by referring to the noise amount information stored in the noise amount information storage unit 161, and outputs the estimation value $\sigma^2$ of the estimated noise amount to the weight generation unit 170.

The weight generation unit 170 generates a weight matrix W using the channel matrix H and the estimation value $\sigma^2$ of the noise amount. The weighting calculation unit 180 multiplies the weight matrix W by a reception signal matrix r whose matrix elements are BB signals output from the down converters 131 and 135. The demodulation unit 190 demodulates a transmission signal obtained by the multiplication by the weighting calculation unit 180.

In the above description, it is explained that the AGC unit 140 makes the gains of the variable gain amplification units 121 and 125 to a same gain value. However, the present invention is not limited to this structure. This also applies to the following embodiments.

<<Embodiment 2>>

The following describes Embodiment 2 of the present invention with reference to the attached drawings.

The present embodiment differs from Embodiment 1 in that the noise amount information stored in the noise amount information storage unit 161*a* (see FIG. 4) differs from the noise amount information stored in the noise amount information storage unit 161.

In the present embodiment, structural elements that are the same as those of Embodiment 1 are assigned with the same reference signs, and the description thereof is omitted since the description in Embodiment 1 can be applied thereto.

<Structure of Radio Communication Device>

Figure 4:
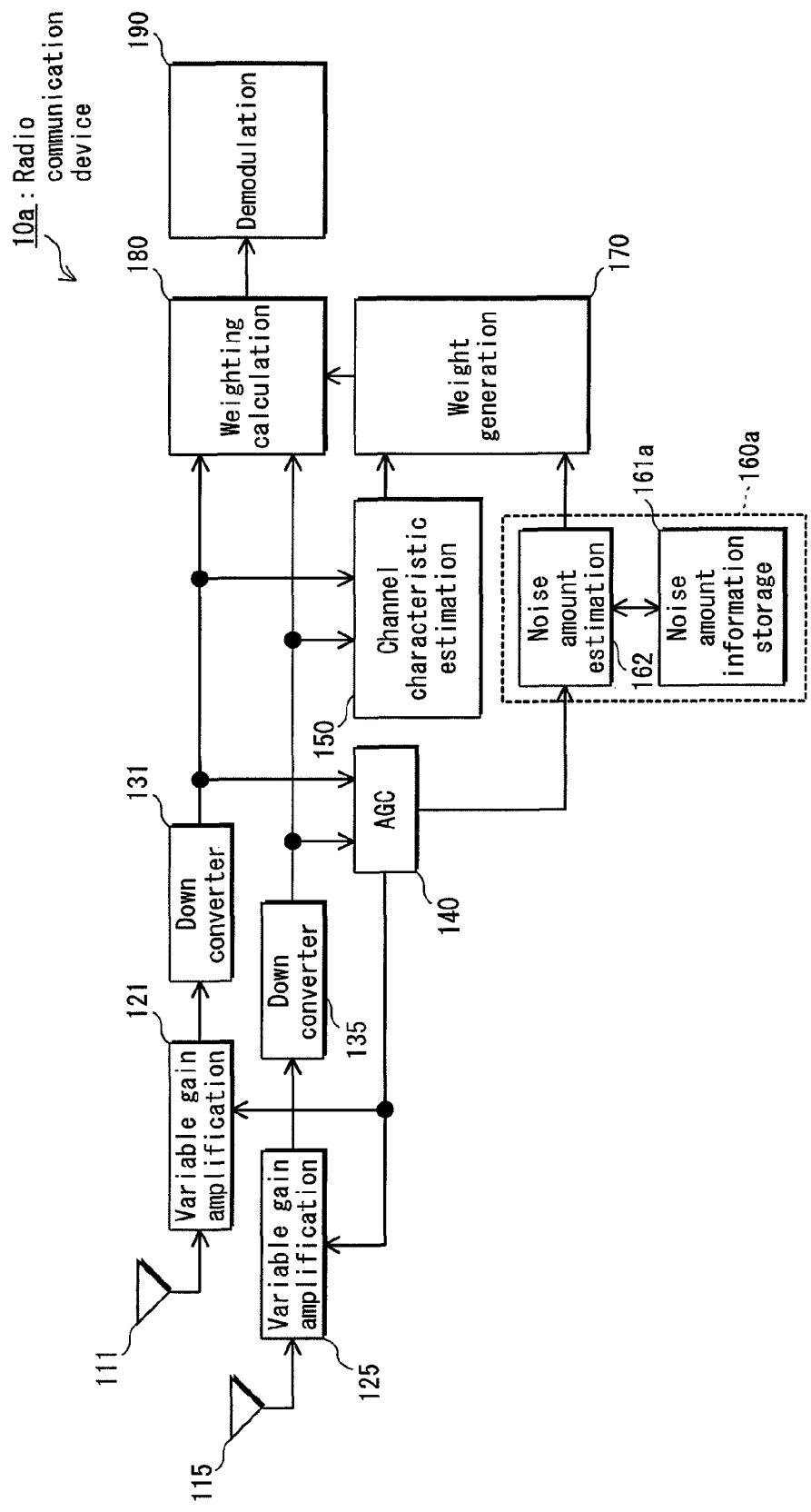
FIG. 4 shows the structure of the radio communication device in Embodiment 2.

The radio communication device of the present embodiment will be described with reference to FIG. 4. FIG. 4 shows the structure of the radio communication device of the present embodiment.

A radio communication device 10a includes antennas 111 and 115, variable gain amplification units 121 and 125, down converters 131 and 135, an AGC unit 140, a channel characteristic estimation unit 150, a noise estimation unit 160a, a weight generation unit 170, a weighting calculation unit 180, and a demodulation unit 190.

(Noise Estimation Unit 160a)

The noise estimation unit 160a estimates the noise power (noise amount) of the noise included in the BB signals output from the down converters 131 and 135. The noise estimation unit 160a includes the noise amount information storage unit 161a and the noise amount estimation unit 162.

Note that the noise amount estimation unit 162 estimates the noise amount of the noise included in the BB signals during reception of a desired signal, by referring to the noise amount information stored in the noise amount information storage unit 161a.

[Noise Amount Information Storage Unit 161a]

The noise amount information storage unit 161a is, for example, a semiconductor memory for storing noise amount information which indicates relationships between the gain value of the variable gain amplification units 121 and 125 and the amount of noise included in the BB signals output from the down converters 131 and 135.

—Outline of Noise Amount Information

The noise amount information to be stored in the noise amount information storage unit 161a is created by treating, as a noise component, a signal distortion component in the high-frequency unit that includes the variable gain, amplification units 121 and 125 and the down converters 131 and 135.

Figure 5A:
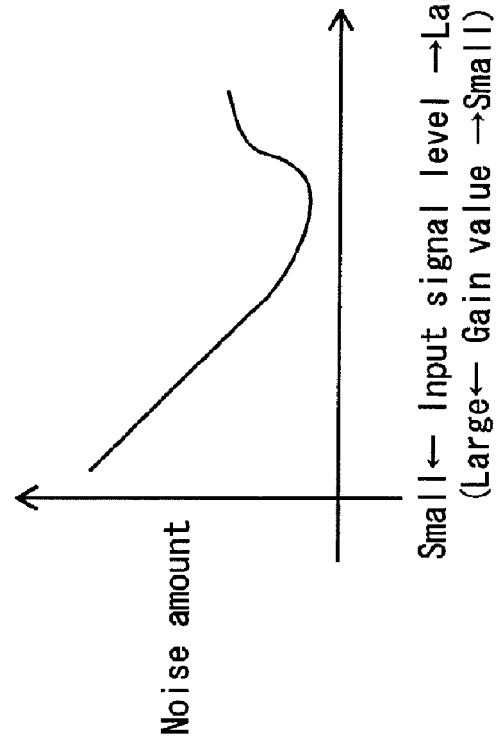
FIGS. 5A and 5B provide illustrations for explanation of the noise amount information stored in the noise amount information storage unit shown in FIG. 4.
Figure 5B:
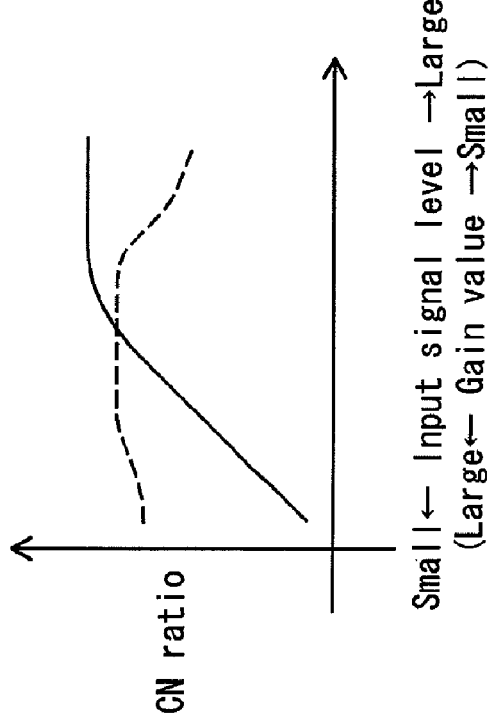

In the following, the noise amount information stored in the noise amount information storage unit 161a will be described with reference to FIGS. 5A and 5B. FIGS. 5A and 5B provide illustrations for explanation of the noise amount information stored in the noise amount information storage unit 161a. Note that in FIGS. 5A and 5B, both vertical and horizontal axes are logarithmic (decibel) displays.

The solid line shown in FIG. 5A represents the CN ratio characteristic of the BB signal when the AGC unit 140 controls the gains of the variable gain amplification units 121 and 125 that are used in a general-purpose radio communication module. The dotted line shown in FIG. 5A represents the CN ratio characteristic of the BB signal reflecting the signal distortion in the high-frequency unit that includes the variable gain amplification units 121 and 125 and the down converters 131 and 135. Note that the signal distortion in the high-frequency unit is disregarded in the CN ratio characteristic of the BB signal represented by the solid line in FIG. 5A.

The horizontal axis of FIG. 5A indicates the signal level of the input signal input into the variable gain amplification units 121 and 125 (or the gain value of the variable gain amplification units 121 and 125). The vertical axis of FIG. 5A indicates the CN ratio of the signal power (signal amount) of signals included in the BB signals output from the down converters 131 and 135 to the noise power (noise amount) of the noise included in the same BB signals output from the down converters 131 and 135.

To the CN ratio characteristic represented by the solid line in FIG. 5A, description of the CN ratio characteristic shown in FIG. 3A is applicable, thus description thereof is omitted here.

Here, the CN ratio characteristic of the BB signals reflecting the signal distortion will be described.

The range (hereinafter referred to as "adjustable range") in which the amplitude of the input signal can be adjusted by the variable gain amplification units 121 and 125 is limited.

In general, as an amplitude level of the input signal becomes closer to an amplitude level corresponding to a boundary of the adjustable range of the variable gain amplification units 121 and 125, a distortion occurs more easily in signals output from the variable gain amplification units 121 and 125.

Accordingly, as indicated by the dotted line in FIG. 5A, the CN ratio of the BB signals is deteriorated an area in which the amplitude level of the input signal is small, and in an area in which the amplitude level of the input signal is large. In other words, the CN ratio of the BB signals is deteriorated an area in which the gain value of the variable gain amplification units 121 and 125 is large, and in an area in which the gain value of the variable gain amplification units 121 and 125 is small.

FIG. 5B shows the noise amount characteristic of the BB signal when a signal distortion component in the high-frequency unit is treated as a noise component.

The horizontal axis of FIG. 5B indicates the signal level of the input signal input into the variable gain amplification units 121 and 125 (or the gain value of the variable gain amplification units 121 and 125). The vertical axis of FIG. 5B indicates the noise amount of the noise included in the BB signals output from the down converters 131 and 135. Note that the noise amount characteristic shown in FIG. 5B is obtained based on the CN ratio characteristic indicated by each of the solid and dotted lines in FIG. 5A.

The noise amount information storage unit 161a stores noise amount information that indicates relationships between the gain value of the variable gain amplification units 121 and 125 and the noise amount of the noise included in the BB signals output from the down converters 131 and 135, the relationships being created based on the noise amount characteristic shown in FIG. 5B.

Note that it is preferable that the noise amount information to be stored in the noise amount information storage unit 161a is created by taking account of the CN ratio characteristic of the high-frequency unit that includes the variable gain amplification units 121 and 125 and the down converters 131 and 135 that are actually provided in the radio communication device 10a.

The noise estimation unit 160a described above estimates the noise amount of the noise included in the BB signals output from the down converters 131 and 135, by using the noise amount information in which the signal distortion in the high-frequency unit described with reference to FIGS. 5A and 5B is taken into account. With this structure, the estimation of the noise amount of noise included in the BB signals performed by the noise estimation unit 160a is further improved in accuracy.

<<Embodiment 3>>

The following describes Embodiment 3 of the present invention with reference to the attached drawings.

The present embodiment differs from Embodiments 1 and 2 in that Embodiments 1 and 2 regard only noise as a component of unnecessary signals, while Embodiment 3 regards noise and interference as components of unnecessary signals.

In the present embodiment, structural elements that are the same as those of the previously described embodiments are assigned with the same reference signs, and the description thereof is omitted since the description in previously described embodiments can be applied thereto.

<Structure of Radio Communication Device>

Figure 6:
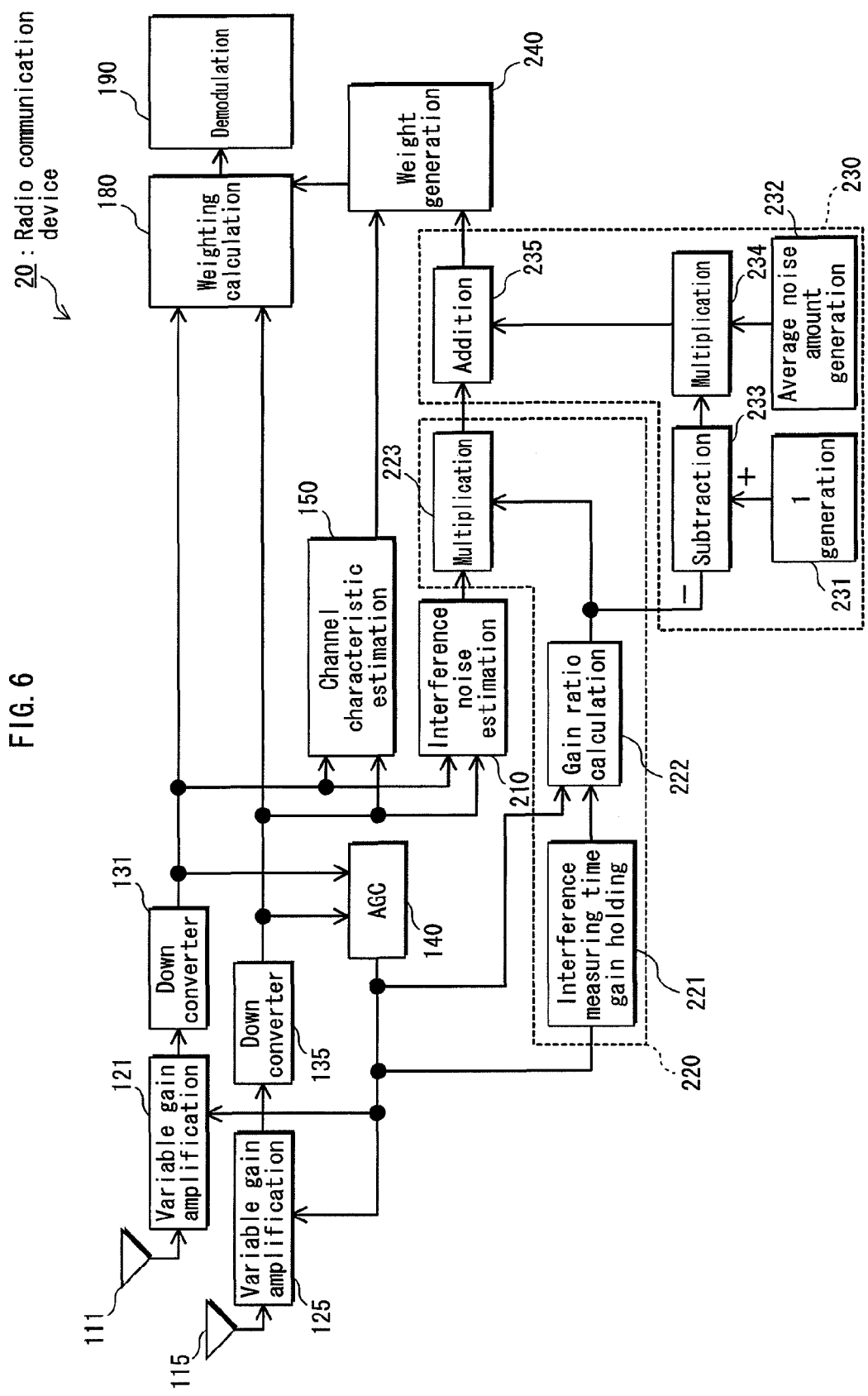
FIG. 6 shows the structure of the radio communication device in Embodiment 3.

The radio communication device of the present embodiment will be described with reference to FIG. 6. FIG. 6 shows the structure of the radio communication device of the present embodiment.

A radio communication device 20 includes antennas 111 and 115, variable gain amplification units 121 and 125, down converters 131 and 135, an AGC unit 140, a channel characteristic estimation unit 150, an interference noise estimation unit 210, an amplitude correction unit 220, a noise amount correction unit 230, a weight generation unit 240, a weighting calculation unit 180, and a demodulation unit 190.

Note that the AGC unit 140 outputs a gain control signal to the variable gain amplification units 121 and 125, the interference noise estimation unit 210, an interference measuring time gain holding unit 221, and a gain ratio calculation unit 222, where the interference measuring time gain holding unit 221 and the gain ratio calculation unit 222, which are provided in the amplitude correction unit 220, will be described later.

(Interference Noise Estimation Unit 210)

The interference noise estimation unit 210, based on a plurality of BB signals output from the down converters 131 and 135, repeatedly estimates a plurality of characteristic amounts for unnecessary signals composed of noise and interference included in the BB signals, during an interference measuring time (a period excluding a second period which will be described below). The interference noise estimation unit 210 creates a covariance matrix $R_{UU}$ whose matrix elements are estimation values of a plurality of characteristic amounts obtained by the estimation, and holds the created covariance matrix $R_{UU}$. Note that the covariance matrix $R_{UU}$ is a covariance matrix of an unnecessary signal matrix U whose matrix elements are unnecessary signals.

The above-mentioned second period is: (1) in the case where an arrival of a desired signal is not detected, a period after the reception power level of the reception signal increases by a predetermined range of levels or more until a time period corresponding to the signal length of the preamble signal passes; (2) in the case where an arrival of a desired signal not destined to the own device is detected, a period after the reception power level of the reception signal increases by a predetermined range of levels or more until it is judged that the desired signal is not destined to the own device; and (3) in the case where an arrival of a desired signal destined to the own device is detected, a period after the reception power level of the reception signal increases by a predetermined range of levels or more until the arrival of the desired signal ends.

Here, the covariance matrix $R_{UU}$ will be described.

When the radio communication device 20 is provided with N pieces of antennas, the covariance matrix $R_{UU}$ is a matrix composed of N rows and N columns.

When the N pieces of antennas are respectively referred to as the first antenna through the $N^{th}$ antenna, the matrix element of the $i^{th}$ row (i=1, . . . , N) $j^{th}$ column (j=1, . . . , N) of the covariance matrix $R_{UU}$ is a time average value of multiplication values that are obtained by multiplying a BB signal corresponding to the $i^{th}$ antenna by the complex conjugate signal of a BB signal corresponding to the $j^{th}$ antenna. Note that the diagonal component of the covariance matrix $R_{UU}$ is a time average value of the power of interference and noise of unnecessary signals included in the BB signals. The non-diagonal component of the covariance matrix $R_{UU}$ is a time average value of the correlation power among different BB signals. Note that the diagonal component of the covariance matrix $R_{UU}$ corresponds to the interference and noise amounts of the unnecessary signals, and the non-diagonal component of the covariance matrix $R_{UU}$ corresponds to the correlation amount among different BB signals.

(Amplitude Correction Unit 220)

The amplitude correction unit 220 conducts an amplitude correction onto the covariance matrix $R_{UU}$ input from the interference noise estimation unit 210, based on the gain value of the variable gain amplification units 121 and 125. The amplitude correction unit 220 includes an interference measuring time gain holding unit 221, a gain ratio calculation unit 222, and a multiplication unit 223.

[Interference Measuring Time Gain Holding Unit 221]

The interference measuring time gain holding unit 221, during measuring of the interference, repeatedly specifies a gain value of the variable gain amplification units 121 and 125 (hereinafter referred to as "first control gain value") based on the gain control signal input from the AGC unit 140, and holds the specified first control gain value.

[Gain Ratio Calculation Unit 222]

The gain ratio calculation unit 222, during reception of a desired signal, obtains the first control gain value stored in the interference measuring time gain holding unit 221, and specifies a gain value of the variable gain, amplification units 121 and 125 (hereinafter referred to as "second control gain value") based on the gain control signal input from the AGC unit 140.

The gain ratio calculation unit 222 then calculates a gain ratio Δg that is a ratio of the second control gain value to the first control gain value, and outputs the calculated gain ratio Δg to the multiplication unit 223.

This will be described in an example.

When the power of signals input into the variable gain amplification units 121 and 125 is represented as $P_{IN}$, the power of signals output from the variable gain amplification units 121 and 125 is represented as $P_{OUT}$, and the gain with respect to the power of the variable gain amplification units 121 and 125 is represented as K, the relationship among them is represented as "$K=P_{OUT}/P_{IN}$".

In this case, when the first control gain value is represented as Ka and the second control gain value is represented as Kb, the gain ratio Δg is represented as "Kb/Ka".

Note that the calculation method for the gain ratio is not limited to the above-described one.

[Multiplication Unit 223]

The multiplication unit 223, during reception of a desired signal, obtains the covariance matrix $R_{UU}$ from the interference noise estimation unit 210. The multiplication unit 223 then obtains a matrix $\Delta gR_{UU}$ by multiplying the obtained covariance matrix $R_{UU}$ by the gain ratio Δg input from the gain ratio calculation unit 222, and outputs the obtained matrix $\Delta gR_{UU}$ to an addition unit 235 of the noise amount correction unit 230, as an amplitude correction covariance matrix. The addition unit 235 will be described later.

(Noise Amount Correction Unit 230)

The noise amount correction unit 230, during reception of a desired signal, corrects the noise amount included in the amplitude correction covariance matrix $\Delta gR_{UU}$ that is obtained by the amplitude correction by the amplitude correction unit 220. The noise amount correction unit 230 includes a 1 generation unit 231, an average noise amount generation unit 232, a subtraction unit 233, a multiplication unit 234, and an addition unit 235. Note that the components of the noise amount correction unit 230 operate during reception of a desired signal.

[1 Generation Unit 231]

The radio communication device 1 generation unit 231 generates a constant "1", and outputs the generated constant "1" to the subtraction unit 233.

[Average Noise Amount Generation Unit 232]

The average noise amount generation unit 232 generates an average noise power (average noise amount) n of the noise that occurs in a high-frequency unit including the variable gain amplification units 121 and 125 and the down converters 131 and 135, and outputs the generated average noise amount n to the multiplication unit 234.

Note that, for example, the average noise amount generation unit 232 prestores an average noise amount n, and the average noise amount generation unit 232 outputs the average noise amount n, which is stored in itself, to the multiplication unit 234.

Note that the average noise amount output from the average noise amount generation unit 232 may exclude an average noise amount of the noise that occurs in the high-frequency unit.

[Subtraction Unit 233]

The subtraction unit 233 subtracts the gain ratio g input from the gain ratio calculation unit 222 from the constant "1" input from the radio communication device 1 generation unit 231, and outputs a subtraction value 1−Δg, which is obtained by the subtraction, to the multiplication unit 234 as a noise correction coefficient.

[Multiplication Unit 234]

The multiplication unit 234 multiplies a unit matrix I by the average noise amount n input from the average noise amount generation unit 232. The multiplication unit 234 then multiplies a matrix nI, which is obtained by the above multiplication, by the noise correction coefficient 1−Δg input from the subtraction unit 233, and outputs a matrix (1−Δg)nI, which is obtained by the above multiplication, to the addition unit 235 as a noise correction matrix.

[Addition Unit 235]

The addition unit 235 obtains a matrix $\Delta g R_{UU} + (1-\Delta g)nI$ by adding the amplitude correction covariance matrix $\Delta g R_{UU}$ input from the multiplication unit 223 and the noise correction matrix $(1-\Delta g)nI$ input from the multiplication unit 234, and outputs the obtained matrix $\Delta g R_{UU} + (1-\Delta g)nI$ to the weight generation unit 240 as a noise amount correction covariance matrix.

In the above-described structure, the process of subtracting $\Delta g nI$ from the amplitude correction covariance matrix $\Delta g R_{UU}$ corresponds to the process of removing (suppressing) the noise amount of the amplitude-corrected noise that occurs in the high-frequency unit from the amplitude correction covariance matrix $\Delta g R_{UU}$. Also, the process of adding nI and the amplitude correction covariance matrix $\Delta g R_{UU}$ corresponds to the process of adding the average noise amount of noise that occurs in the high-frequency unit and the amplitude correction covariance matrix $\Delta g R_{UU}$.

With the above-described structure, the noise amount of noise that occurs in the high-frequency unit among the noise amount correction covariance matrix $\Delta g R_{UU} + (1-\Delta g)nI$ that is used in generating the weight matrix W substantially matches the noise amount of noise that actually occurs in the high-frequency unit.

(Weight Generation Unit 240)

The weight generation. unit 240, during reception of a desired signal, generates the weight matrix W by performing a calculation of the following Equation (8) using the channel matrix H input from the channel characteristic estimation unit 150 and the noise amount correction covariance matrix $\Delta g R_{UU} + (1-\Delta g)nI$ input from the addition unit 235. The weight generation unit 240 then outputs the generated weight matrix W to the weighting calculation unit 180.

[Equation 8]

$$W = H^H (HH^H + \Delta g R_{UU} + (1-\Delta g)nI)^{-1} \quad (8)$$

When the reception power of the reception signal during the interference estimation is small enough compared with the reception power of the desired signal during the reception thereof, the first control gain value is large enough compared with the second control gain value. When this happens, a value of gain ratio Δg exceeds the actual range of limited accuracy when the gain ratio Δg is calculated, and the gain ratio Δg is treated as zero.

Even in such a case, as understood from the Equation (8), the component of unnecessary signals in the noise amount correction covariance matrix remains as nI, and it never becomes zero. An MMSE calculation would fail when the component of unnecessary signals is zero. However, with the radio communication device 20 of the present embodiment, the component of unnecessary signals never becomes zero, and thus the MMSE calculation does not fail.

<Operation of Radio Communication Device>

Figure 7:
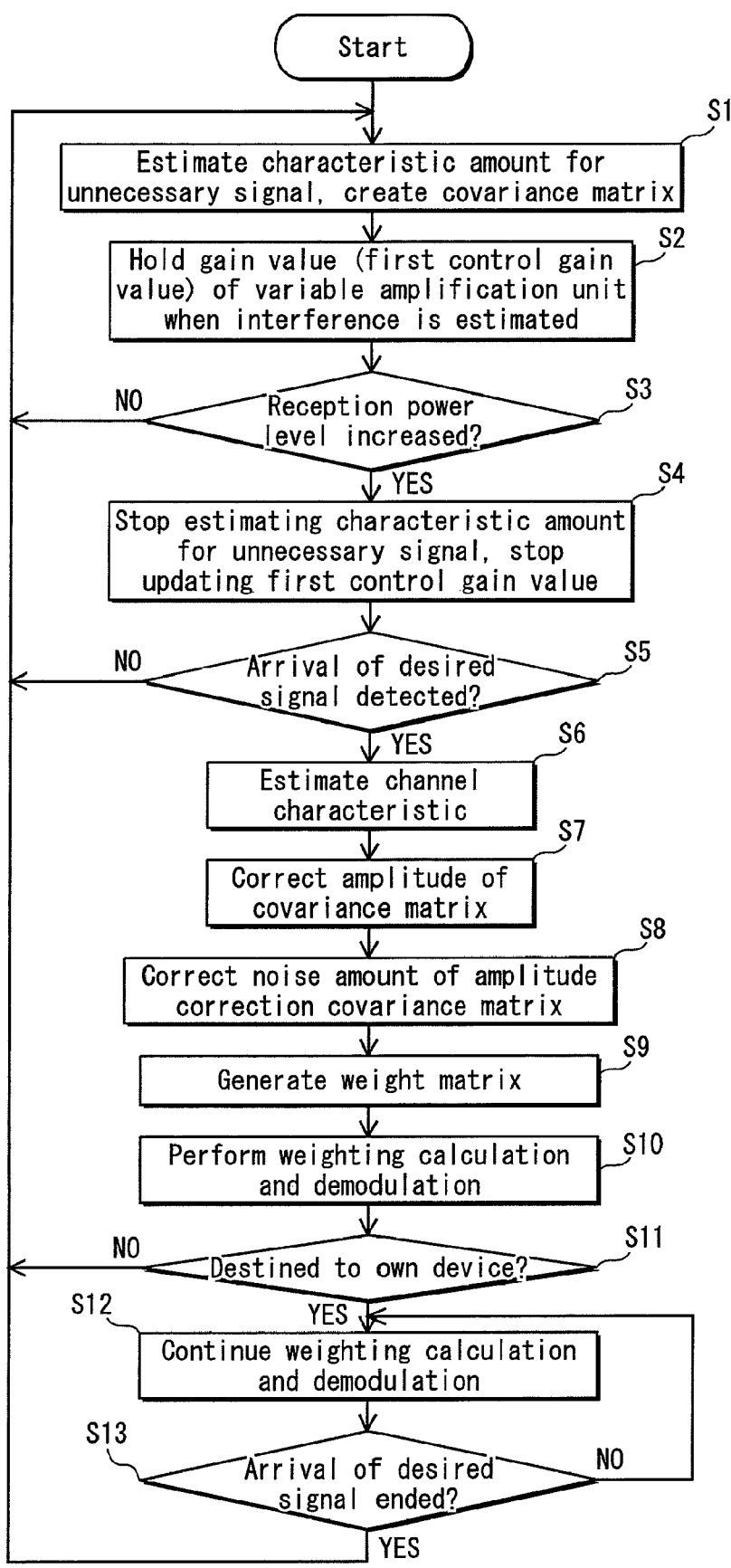
FIG. 7 is a flowchart showing an overview of the reception operation performed by the radio communication device shown in FIG. 6.

The reception operation of the radio communication device 20 shown in FIG. 6 will be described with reference to FIG. 7. FIG. 7 is a flowchart showing an overview of the reception operation performed by the radio communication device 20 shown in FIG. 6.

Reception signals received by the antennas 111 and 115 are amplified by the variable gain amplification units 121 and 125 under the gain control by the AGC unit 140, and then downconverted by the down converters 131 and 135.

The interference noise estimation unit 210 estimates a plurality of characteristic amounts for unnecessary signals included in a plurality of BB signals, based on the plurality of BB signals input from the down converters 131 and 135. The interference noise estimation unit 210 creates a covariance matrix $R_{UU}$ whose matrix elements are estimation values of the plurality of characteristic amounts obtained by the estimation, and holds the created covariance matrix $R_{UU}$ (step S1).

The interference measuring time gain holding unit 221 specifies, a gain value (first control gain value) of the variable gain amplification units 121 and 125 based on the gain control signal input from the AGC unit 140, and holds the specified first control gain value (step S2).

The radio communication device 20 judges whether or not the reception power level of the reception signal has increased (step S3). When the reception power level of the reception signal has not increased (NO in step S3), the process of steps S1 and S2 continues to be performed.

When the reception power level of the reception signal has increased (YES in step S3), the interference noise estimation unit 210 stops the estimation process of estimating the characteristic amounts for unnecessary signals, and the interference measuring time gain holding unit 221 stops the update process of specifying and holding the first control gain value (step S4).

The signal detection unit (not illustrated) of the radio communication device 20 performs the process of detecting a desired signal, based on the preamble signal (step S5). When it judges that an arrival of a desired signal has not been detected (NO in step S5), the control returns to perform the process of steps S1 and S2.

When it judges that an arrival of a desired signal has been detected (YES in step S5), the AGC unit 140 fixes the gain value of the variable gain amplification units 121 and 125 to a gain value at a point in time when an arrival of a desired signal was detected. The channel characteristic estimation unit 150 estimate a channel characteristic for each channel, and creates a channel matrix H whose matrix elements are the estimation values of the channel characteristic for each channel obtained by the estimation (step S6).

The gain ratio calculation unit 222 of the amplitude correction unit 220 specifies a gain value of the variable gain amplification units 121 and 125 (second control gain value) based on the gain control signal input from the AGC unit 140, and calculates a gain ratio $\Delta g$ that is a ratio of the second control gain value to the first control gain value stored in the interference measuring time gain holding unit 221. The multiplication unit 223 multiplies the covariance matrix $R_{UU}$ held by the interference noise estimation unit 210 by the gain ratio $\Delta g$ calculated by the gain ratio calculation unit 222 (step S7).

The subtraction unit 233 of the noise amount correction unit 230 subtracts the gain ratio $\Delta g$ input from the gain ratio calculation unit 222 from the constant "1" input from the radio communication device 1 generation unit 231. The multiplication unit 234 multiplies a unit matrix I by the average noise amount n input from the average noise amount generation unit 232. The multiplication unit 234 multiplies a matrix nI, which is obtained by multiplying a unit matrix I by the average noise amount n input from the average noise amount generation unit 232, by a result of the subtraction (noise correction coefficient) $1-\Delta g$ input from the subtraction unit 233. The addition unit 235 obtains a matrix $\Delta g R_{UU}+(1-\Delta g)nI$ by adding the amplitude correction covariance matrix $\Delta g R_{UU}$ input from the multiplication unit 223 and the noise correction matrix $(1-\Delta g)nI$ input from the multiplication unit 234, and outputs the obtained matrix $\Delta g R_{UU}+(1-\Delta g)nI$ to the weight generation unit 240 as a noise amount correction covariance matrix (step S8).

The weight generation unit 240 generates a weight matrix W based on the channel matrix H created by the channel characteristic estimation unit 150 and the noise amount correction covariance matrix $\Delta g R_{UU}+(1-\Delta g)nI$ input from the addition unit 235 (step S9).

The weighting calculation unit 180 performs a weighting calculation for weighting the plurality of BB signals input from the down converters 131 and 135 based on the weight matrix W generated by the weight generation unit 240. The demodulation unit 190 then demodulates the transmission signal that was obtained by the weighting calculation (step S10).

The radio communication device 20 judges, based on the destination address in the header of the desired signal, whether or not the desired signal is destined to the own device (step S11). When the desired signal is not destined to the own device (NO in step S11), the control returns to perform the process of steps S1 and S2.

When the desired signal is destined to the own device (YES in step S11), the weighting calculation unit 180 continues the weighting calculation process and the demodulation unit 190 continues the demodulation process (step S12).

The radio communication device 20 judges whether or not the arrival of desired signal has ended (step S13). When the arrival of desired signal has not ended (NO in step S13), the process of step S12 continues to be performed. When the arrival of desired signal has ended (YES in step S13), the control returns to perform the process of steps S1 and S2.

<Example of Operation of Radio Communication Device>

Figure 8:
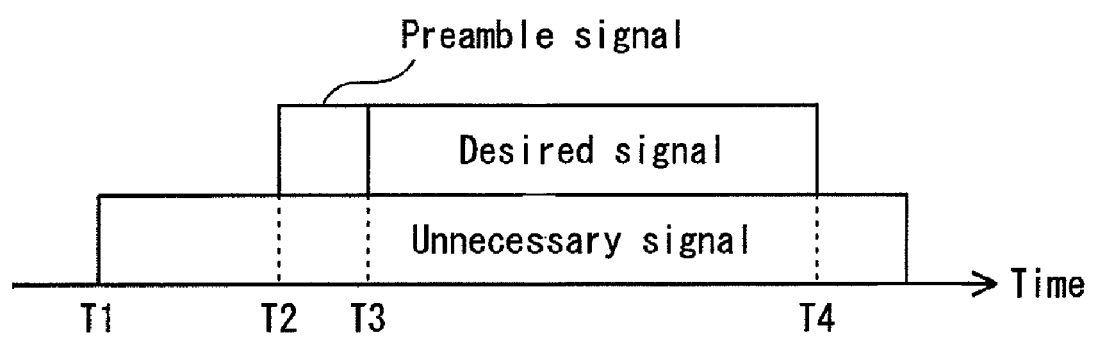
FIG. 8 is provided to facilitate explanation of example of the reception operation of the radio communication device shown in FIG. 6.

An example of the reception operation of the radio communication device 20 shown in FIG. 6 will be described with reference to FIG. 8. FIG. 8 is provided to facilitate explanation of example of the reception operation of the radio communication device 20 shown in FIG. 6.

Suppose here that, while the interference noise estimation unit 210 is performing the estimation process of estimating the characteristic amounts for unnecessary signals and the interference measuring time gain holding unit 221 is performing the process of determining and holding the first control gain value, the radio communication device 20 detects, at time T1, an increase of the reception power level of the reception signal. When this happens, the interference noise estimation unit 210 stops the estimation process of estimating the characteristic amounts for unnecessary signals, and the interference measuring time gain holding unit 221 stops the update process of determining and holding the first control gain value.

In the present example, it is presumed here that the signal detection unit does not detect an arrival of a desired signal based on the preamble signal, and thus the interference noise estimation unit 210 resumes estimating the characteristic amounts for unnecessary signals and the interference measuring time gain holding unit 221 resumes determining and holding the first control gain value.

Suppose here that, while the interference noise estimation unit 210 is performing the estimation process of estimating the characteristic amounts for unnecessary signals and the interference measuring time gain holding unit 221 is performing the process of determining and holding the first control gain value, the radio communication device 20 detects, at time T2, an increase of the reception power level of the reception signal. When this happens, the interference noise estimation unit 210 stops the estimation process of estimating the characteristic amounts for unnecessary signals, and the interference measuring time gain holding unit 221 stops the update process of specifying and holding the first control gain value.

In the present example, it is presumed here that the signal detection unit detects an arrival of a desired signal based on the preamble signal. When this happens, The channel characteristic estimation unit 150 estimates the channel characteristic for each channel at time T3. The gain ratio calculation unit 222 and the multiplication unit 223 of the noise amount correction unit 230 correct the amplitude of the covariance matrix $R_{UU}$ held by the interference noise estimation unit 210. The noise amount correction unit 230 corrects the noise amount included in the amplitude correction covariance matrix that is obtained by the amplitude correction by the amplitude correction unit 220.

The weight generation unit 240 generates a weight matrix based on the channel matrix that is obtained by the estimation of the channel characteristic by the channel characteristic estimation unit 150 and the noise amount correction covariance matrix that is obtained by the correction of the noise amount by the noise amount correction unit 230.

The weighting calculation unit 180 performs a weighting calculation for weighting the plurality of BB signals input from the down converters 131 and 135 based on the weight matrix, and the demodulation unit 190 demodulates the transmission signal that was obtained by the weighting calculation.

In the present example, the arrival of the desired signal ends at time T4, then the interference noise estimation unit 210 resumes estimating the characteristic amounts for unnecessary signals and the interference measuring time gain holding unit 221 resumes determining and holding the first control gain value.

<<Embodiment 4>>

The following describes Embodiment 4 of the present invention with reference to the attached drawings.

The present embodiment differs from Embodiment 3 in the method of the noise amount correction performed onto the amplitude correction covariance matrix obtained by the amplitude correction by the amplitude correction unit 220.

In the present embodiment, structural elements that are the same as those of the previously described embodiments are assigned with the same reference signs, and the description thereof is omitted since the description in previously described embodiments can be applied thereto.

<Structure of Radio Communication Device>

Figure 9:
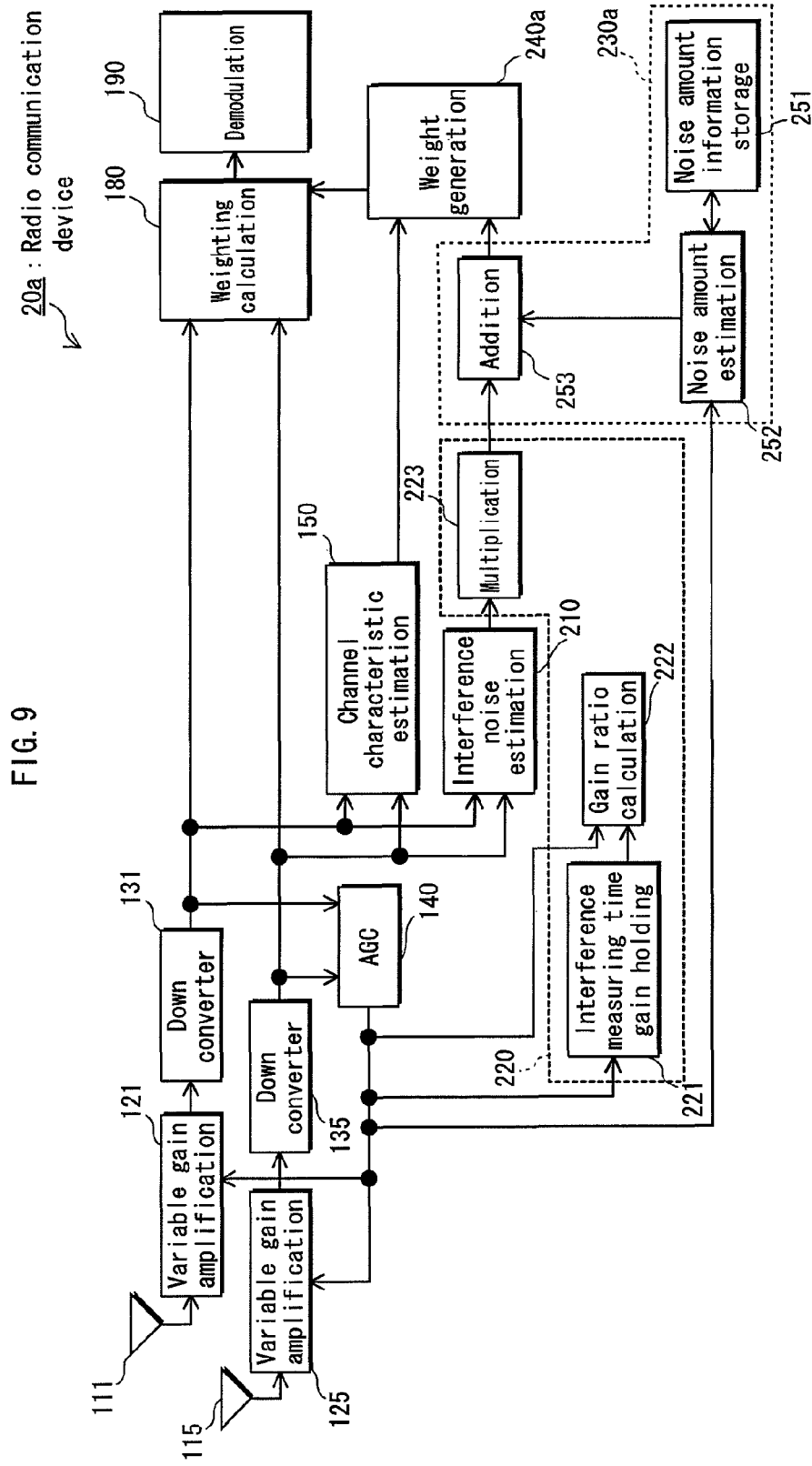
FIG. 9 shows the structure of the radio communication device in Embodiment 4.

The radio communication device of the present embodiment will be described with reference to FIG. 9. FIG. 9 shows the structure of the radio communication device of the present embodiment.

A radio communication device 20a includes antennas 111 and 115, variable gain amplification units 121 and 125, down converters 131 and 135, an AGC unit 140, a channel characteristic estimation unit 150, an interference noise estimation unit 210, an amplitude correction unit 220, a noise amount correction unit 230a, a weight generation unit 240a, a weighting calculation unit 180, and a demodulation unit 190.

Note that the AGC unit 140 outputs a gain control signal to the variable gain amplification units 121 and 125, the interference noise estimation unit 210, an interference measuring time gain holding unit 221, a gain ratio calculation unit 222, and a noise amount estimation unit 252 (which will be described later) provided in the noise amount correction unit 230a, where the interference measuring time gain holding unit 221 and the gain ratio calculation unit 222 are provided in the amplitude correction unit 220.

(Noise Amount Correction Unit 230a)

The noise amount correction unit 230a, during reception of a desired signal, corrects the noise amount included in the amplitude correction covariance matrix $\Delta g R_{UU}$ that is obtained by the amplitude correction by the amplitude correction unit 220. The noise amount correction unit 230a includes a noise amount information storage unit 251, a noise amount estimation unit 252, and an addition unit 253. Note that the components of the noise amount correction unit 230a, excluding the noise amount information storage unit 251, operate during reception of a desired signal.

[Noise Amount Information Storage Unit 251]

The noise amount information storage unit 251 stores noise amount information which indicates relationships between the gain value of the variable gain amplification units 121 and 125 and the amount of noise included in the BB signals output from the down converters 131 and 135.

Note, however, that the noise amount information stored in the noise amount information storage unit 161, or the noise amount information stored in the noise amount information storage unit 161a may be used as the noise amount information stored in the noise amount information storage unit 251.

[Noise Amount Estimation Unit 252]

The noise amount estimation unit 252 specifies a gain value of the variable gain amplification units 121 and 125 (second control gain value) during reception of desired signal, based on the gain control signal input from the AGC unit 140. The noise amount estimation unit 252 then estimates the noise amount of the noise corresponding to the specified second control gain value (the noise amount of the noise included in the BB signals output from the down converters 131 and 135 during reception of desired signal) by referring to the noise amount information stored in the noise amount information storage unit 251, and outputs an estimation value $\sigma_1^2$ of the estimated noise amount to the addition unit 253.

[Addition Unit 253]

The addition unit 253 multiplies the unit matrix I by the estimation value $\sigma_1^2$ of the estimated noise amount input from the noise amount estimation unit 252. The addition unit 253 then adds a matrix $\sigma_1^2 I$, which is obtained by the multiplication, and the amplitude correction covariance matrix $\Delta g R_{UU}$ input from the multiplication unit 223. The addition unit 253 then outputs a matrix $\Delta g R_{UU} + \sigma_1^2 I$, which is obtained by the addition, to the weight generation unit 240a as a noise amount correction covariance matrix.

(Weight Generation Unit 240a)

The weight generation unit 240a, during reception of a desired signal, generates the weight matrix W by performing a calculation of the following Equation (9) using the channel matrix H input from the channel characteristic estimation unit 150 and the noise amount correction covariance matrix $\Delta g R_{UU} + \sigma_1^2 I$ input from the addition unit 253. The weight generation unit 240a then outputs the generated weight matrix W to the weighting calculation unit 180.

[Equation 9]

$$W = H^H (HH^H + \Delta g R_{UU} + \sigma_1^2 I) \qquad (9)$$

As described above, the gain value of the variable gain amplification units 121 and 125 and the noise amount of the noise that occurs in the high-frequency unit change differently. According to the present embodiment, however, the noise amount information storage unit 251 prestores noise amount information that indicates relationships between the gain value of the variable gain amplification units 121 and 125 and the noise amount of the noise included in the BB signals output from the down converters 131 and 135. And the noise amount correction unit 230a estimates the noise amount of the noise included in the BB signals output from the down converters 131 and 135, based on the gain value of the variable gain amplification units 121 and 125 during reception of desired signal by referring to the noise amount information, and corrects the noise amount of the amplitude correction covariance matrix using the estimation value of the estimated noise amount. Due to this structure, the radio communication device 20a of the present embodiment improves the accuracy of correcting the noise amount correction covariance matrix that is used in generation of the weight matrix W, enabling a high-accuracy weight matrix W to be generated.

Also, even in the case where the gain ratio $\Delta g$ might be treated as zero, as understood from the Equation (9) shown above, the component of unnecessary signals in the noise amount correction covariance matrix remains as $\sigma_1^2 I$, and it never becomes zero. An MMSE calculation would fail when the component of unnecessary signals is zero. However, with the radio communication device 20a of the present embodiment, the component of unnecessary signals never becomes zero, and thus the MMSE calculation does not fail.

<<Embodiment 5>>

The following describes Embodiment 5 of the present invention with reference to the attached drawings.

The present embodiment differs from Embodiments 3 and 4 in the method of the noise amount correction performed onto the amplitude correction covariance matrix obtained by the amplitude correction by the amplitude correction unit 220.

In the present embodiment, structural elements that are the same as those of the previously described embodiments are assigned with the same reference signs, and the description thereof is omitted since the description in previously described embodiments can be applied thereto.

<Structure of Radio Communication Device>

Figure 10:
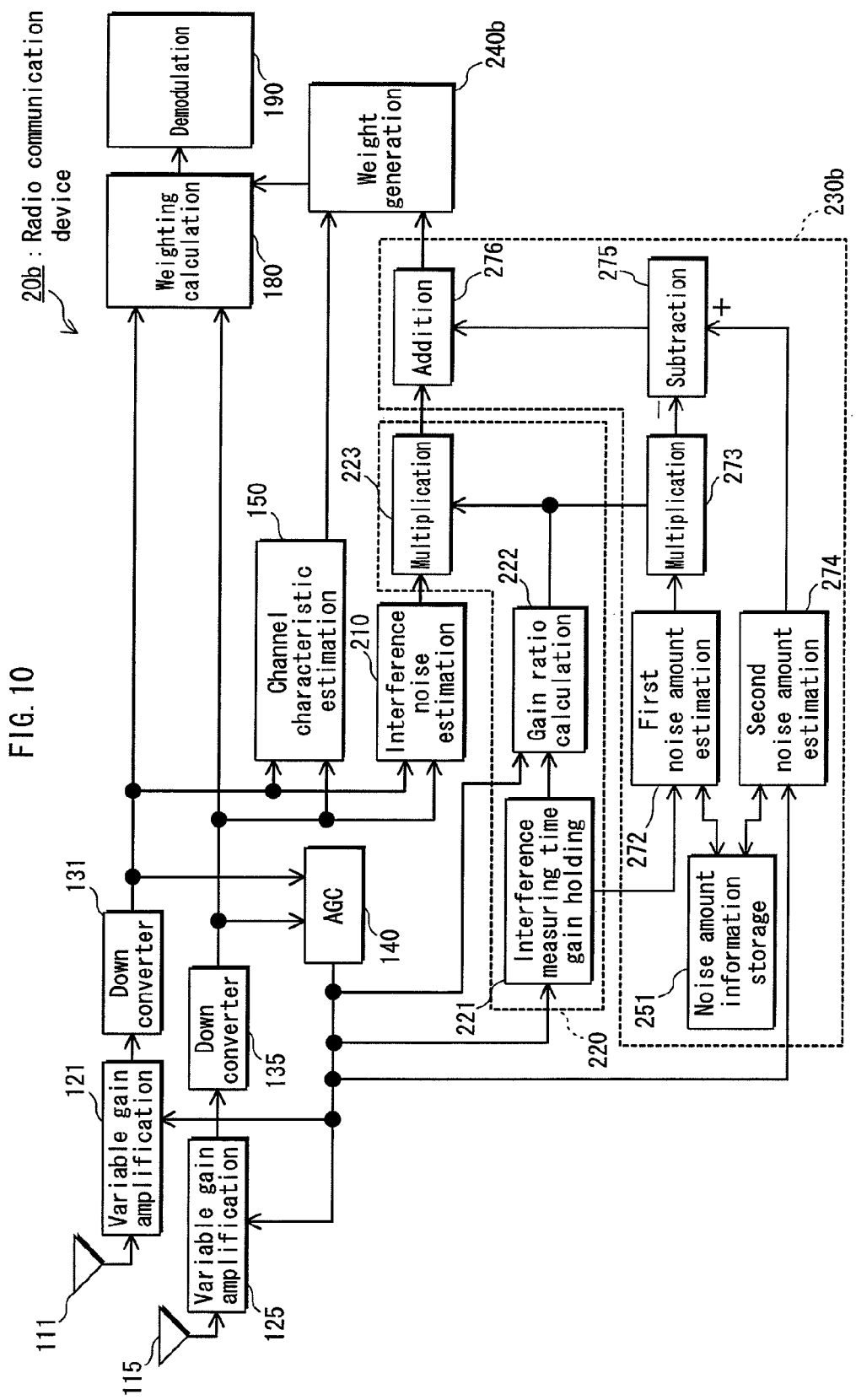
FIG. 10 shows the structure of the radio communication device in Embodiment 5.

The radio communication device of the present embodiment will be described with reference to FIG. 10. FIG. 10 shows the structure of the radio communication device of the present embodiment.

A radio communication device 20b includes antennas 111 and 115, variable gain amplification units 121 and 125, down converters 131 and 135, an AGC unit 140, a channel characteristic estimation unit 150, an interference noise estimation unit 210, an amplitude correction unit 220, a noise amount correction unit 230b, a weight generation unit 240b, a weighting calculation unit 180, and a demodulation unit 190.

Note that the AGC unit 140 outputs a gain control signal to the variable gain amplification units 121 and 125, the interference noise estimation unit 210, an interference measuring time gain holding unit 221, a gain ratio calculation unit 222, and a second noise amount estimation unit 274 (which will be described later) provided in the noise amount correction unit 230b, where the interference measuring time gain holding unit 221 and the gain ratio calculation unit 222 are provided in the amplitude correction unit 220.

(Noise Amount Correction Unit 230b)

The noise amount correction unit 230b, during reception of a desired signal, corrects the noise amount included in the amplitude correction covariance matrix $gR_{UU}$ that is obtained by the amplitude correction by the amplitude correction unit 220.

The noise amount correct ion unit 230b includes a noise amount information storage unit 251, a first noise amount estimation unit 272, a multiplication unit 273, a second noise amount estimation unit 274, a subtraction unit 275, and an addition unit 276. Note that the components of the noise amount correction unit 230b, excluding the noise amount information storage unit 251, operate during reception of a desired signal.

[First Noise Amount Estimation Unit 272]

The first noise amount estimation unit 272 obtains the first control gain value stored in the interference measuring time gain holding unit 221. The first noise amount estimation unit 272 then estimates the noise amount of the noise corresponding to the obtained first control gain value (the noise amount of the noise included in the BB signals output from the down converters 131 and 135 during measuring of the interference) by referring to the noise amount information stored in the noise amount information storage unit 251, and outputs an estimation value $\sigma_{2a}^2$ of the estimated noise amount to the multiplication unit 273.

[Multiplication Unit 273]

The multiplication unit 273 multiplies the gain value $\Delta g$ input from the gain ratio calculation unit 222 by the noise amount estimation value $\sigma_{2a}^2$ input from the first noise amount estimation unit 272, and outputs a multiplication value $\Delta g\sigma_{2a}^2$ obtained by the multiplication to the subtraction unit 275 as a first correction noise amount.

[Second Noise Amount Estimation Unit 274]

The second noise amount estimation unit 274 specifies a gain value of the variable gain amplification units 121 and 125 (second control gain value) during reception of desired signal, based on the gain control signal input from the AGC unit 140. The second noise amount estimation unit 274 then estimates the noise amount of the noise corresponding to the specified second control gain value (the noise amount of the noise included in the BB signals output from the down converters 131 and 135 during reception of desired signal) by referring to the noise amount information stored in the noise amount information storage unit 251, and outputs an estimation value $\sigma_{2b}^2$ of the estimated noise amount to the subtraction unit 275 as a second correction noise amount.

[Subtraction Unit 275]

The subtraction unit 275 subtracts the first correction noise amount $\Delta g\sigma_{2a}^2$ input from the multiplication unit 273 from the second correction noise amount $\sigma_{2b}^2$ input from the second noise amount estimation unit 274, and outputs a subtraction value $\sigma_{2b}^2 - \Delta g\sigma_{2a}^2$, which is obtained by the subtraction, to the addition unit 276 as a correction noise amount.

[Addition Unit 276]

The addition unit 276 multiplies the unit matrix I by the correction noise amount $\sigma_{2b}^2 - \Delta g\sigma_{2a}^2$ input from the subtraction unit 275. The addition unit 276 then adds a matrix $(\sigma_{2b}^2 - \Delta g\sigma_{2a}^2)I$, which is obtained by the multiplication, and the amplitude correction covariance matrix $\Delta gR_{UU}$ input from the multiplication unit 223. The addition unit 276 then outputs a matrix $\Delta gR_{UU} + (\sigma_{2b}^2 - \Delta g\sigma_{2a}^2)I$, which is obtained by the addition, to the weight generation unit 240b as a noise amount correction covariance matrix.

(Weight Generation Unit 240B)

The weight generation unit 240b, during reception of a desired signal, generates the weight matrix W by performing a calculation of the following Equation (10) using the channel matrix H input from the channel characteristic estimation unit 150 and the noise amount correction covariance matrix $gR_{UU} + (\sigma_{2b}^2 - \Delta g\sigma_{2a}^2)I$ input from the addition unit 276. The weight generation unit 240b then outputs the generated weight matrix W to the weighting calculation unit 180.

[Equation 10]

$$W = H^H(HH^H + gR_{UU} + (\sigma_{2b}^2 - \Delta g\sigma_{2a}^2)I)^{-1} \tag{10}$$

Even in the case where the gain ratio $\Delta g$ might be treated as zero, as understood from the Equation (10) shown above, the component of unnecessary signals in the noise amount correction covariance matrix remains as $\sigma_{2b}^2 I$, and it never becomes zero. An MMSE calculation would fail when the component of unnecessary signals is zero. However, with the radio communication device 20b of the present embodiment, the component of unnecessary signals never becomes zero, and thus the MMSE calculation does not fail.

In the following, the weight matrix W in the present embodiment will be considered.

The covariance matrix $R_{UU}$ during measuring of interference is represented by the following Equation (11), using a covariance matrix $R_H$ whose matrix elements are components regarding an interference signal, and estimation value $\sigma_{2a}^2$ of the noise amount of the noise output from the high-frequency unit during measuring of interference.

[Equation 11]

$$R_{UU} = R_H + \sigma_{2a}^2 I \tag{11}$$

The following Equation (12) is obtained when the Equation (11) is substituted into the Equation (10) above.

[Equation 12]

$$W = H^H(HH^H + \Delta gR_H + \sigma_{2b}^2 I)^{-1} \tag{12}$$

As indicated in the Equation (12) shown above, the components of the unnecessary signals are the covariance matrix $R_H$ corresponding to the unnecessary signals, and the estimation value $\sigma_{2b}^2$ of the noise amount of noise output from the high-frequency unit during reception of desired signal. It is understood from this that the components regarding the unnecessary signals included in the weight matrix W in the present embodiment match, with high accuracy, the components regarding the unnecessary signals included in the BB signals corresponding to the original desired signal.

Therefore, with the radio communication device 20b of the present embodiment, it is possible to generate a high-accuracy weight matrix W, and it is possible to estimate the transmission signal with high accuracy.

<<Embodiment 6>>

The following describes Embodiment 6 of the present invention with reference to the attached drawings.

The present embodiment and Embodiment 5 have the same method of noise amount correction performed onto the amplitude correction covariance matrix obtained by the amplitude correction by the amplitude correction unit 220. However, Embodiment 6 differs from Embodiment 5 in the structure of the noise amount correction unit for achieving the method.

In the present embodiment, structural elements that are the same as those of the previously described embodiments are assigned with the same reference signs, and the description thereof is omitted since the description in previously described embodiments can be applied thereto.

<Structure of Radio Communication Device>

Figure 11:
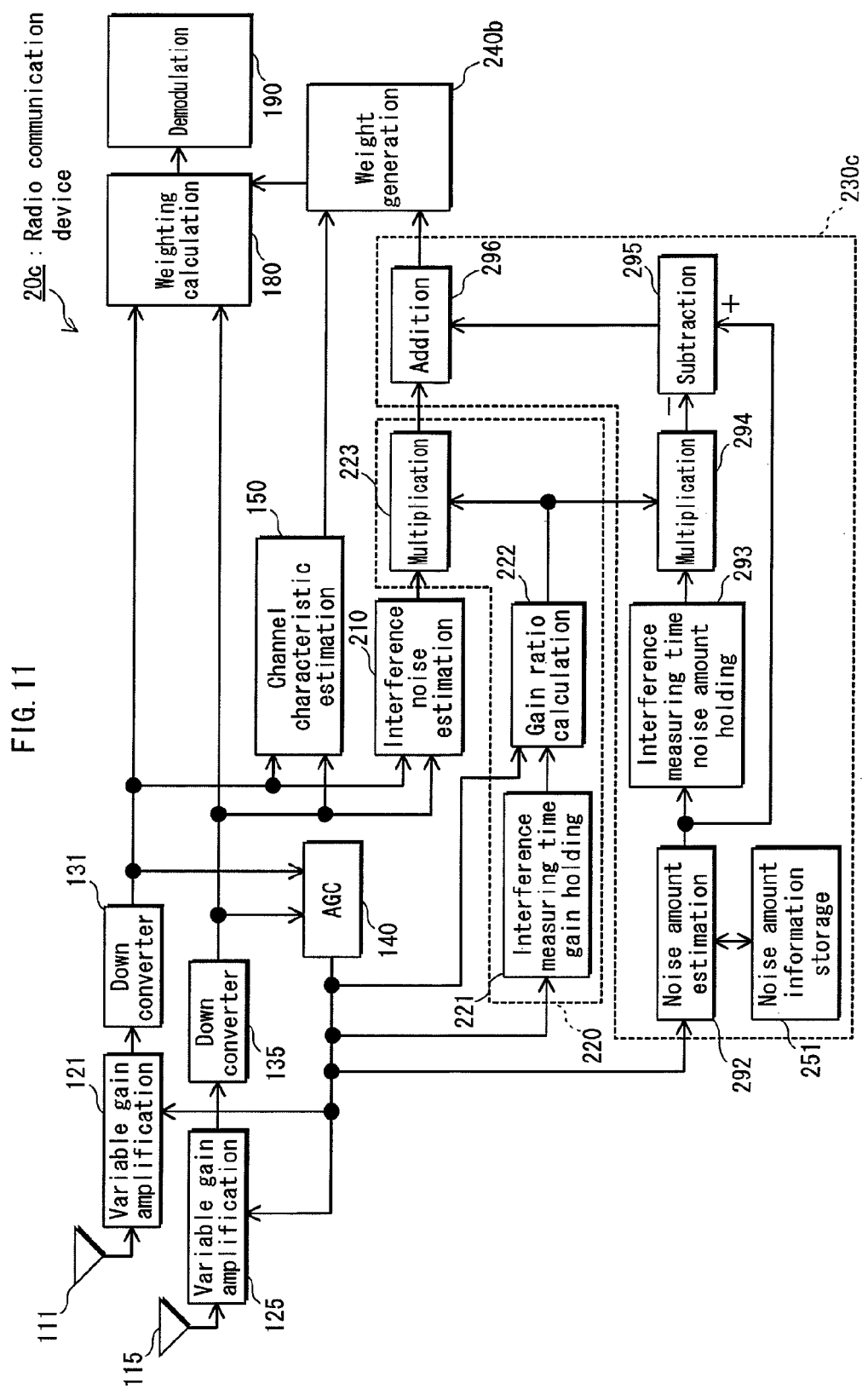
FIG. 11 shows the structure of the radio communication device in Embodiment 6.

The radio communication device of the present embodiment will be described with reference to FIG. 11. FIG. 11 shows the structure of the radio communication device of the present embodiment.

A radio communication device 20c includes antennas 111 and 115, variable gain amplification units 121 and 125, down converters 131 and 135, an AGC unit 140, a channel characteristic estimation unit 150, an interference noise estimation unit 210, an amplitude correction unit 220, a noise amount correction unit 230c, a weight generation unit 240b, a weighting calculation unit 180, and a demodulation unit 190.

Note that the AGC unit 140 outputs a gain control signal to the variable gain amplification units 121 and 125, the interference noise estimation unit 210, an interference measuring time gain holding unit 221, a gain ratio calculation unit 222, and a noise amount estimation unit 292 (which will be described later) provided in the noise amount correction unit 230c, where the interference measuring time gain holding unit 221 and the gain ratio calculation unit 222 are provided in the amplitude correction unit 220.

(Noise Amount Correction Unit 230C)

The noise amount correction unit 230c corrects the noise amount included in the amplitude correction covariance matrix $\Delta g R_{UU}$ that is obtained by the amplitude correction by the amplitude correction unit 220.

The noise amount correction unit 230c includes a noise amount information storage unit 251, a noise amount estimation unit 292, an interference measuring time noise amount holding unit 293, a multiplication unit 294, a subtraction unit 295, and an addition unit 296.

[Noise Amount Estimation Unit 292]

The noise amount estimation unit 292 specifies a gain value of the variable gain amplification units 121 and 125 (first control gain value) during measuring of interference, based on the gain control signal input from the AGC unit 140. The noise amount estimation unit 292 then estimates the noise amount of the noise corresponding to the specified first control gain value (the noise amount of the noise included in the BB signals output from the down converters 131 and 135 during measuring of interference) by referring to the noise amount information stored in the noise amount information storage unit 251, and stores an estimation value $\sigma_{2a}^2$ of the estimated noise amount into the interference measuring time noise amount holding unit 293. Note that, during measuring of interference, the noise amount estimation unit 292 repeatedly performs the process of estimating the noise amount of the noise and storing the estimation value into the interference measuring time noise amount holding unit 293.

The noise amount estimation unit 292 specifies a gain value of the variable gain amplification units 121 and 125 (second control gain value) during reception of desired signal, based on the gain control signal input from the AGC unit 140. The noise amount estimation unit 292 then estimates the noise amount of the noise corresponding to the specified second control gain value (the noise amount of the noise included in the BB signals output from the down converters 131 and 135 during reception of desired signal) by referring to the noise amount information stored in the noise amount information storage unit 251, and outputs an estimation value a $\sigma_{2b}^2$ of the estimated noise amount to the subtraction unit 295 as a second correction noise amount.

[Interference Measuring Time Noise Amount Holding Unit 293]

The interference measuring time noise amount holding unit 293 holds the estimation value $\sigma_{2a}^2$ of the noise amount of noise during measuring of interference, that is input from the noise amount estimation unit 292.

[Multiplication Unit 294]

The multiplication unit 294, during reception of a desired signal, obtains the estimation value $\sigma_{2a}^2$ of the noise amount during measuring of interference, from the interference measuring time noise amount holding unit 293. The multiplication unit 294 then obtains a multiplication value $\Delta g \sigma_{2a}^2$ by multiplying the obtained estimation value $\sigma_{2a}^2$ of the noise amount by the gain ratio $\Delta g$ input from the gain ratio calculation unit 222, and outputs the obtained multiplication value $\Delta g \sigma_{2a}^2$ to the subtraction unit 295 as a first correction noise amount.

[Subtraction Unit 295]

The subtraction unit 295, during reception of a desired signal, subtracts the first correction noise amount $\Delta g \sigma_{2a}^2$ input from the multiplication unit 294 from the second correction noise amount $\sigma_{2b}^2$ input from the noise amount estimation unit 292, and outputs a subtraction value $\sigma_{2b}^2 - \Delta g \sigma_{2a}^2$, which is obtained by the subtraction, to the addition unit 296 as a correction noise amount.

[Addition Unit 296]

The addition unit 296, during reception of a desired signal, multiplies the unit matrix I by the correction noise amount $\sigma_{2b}^2 - \Delta g \sigma_{2a}^2$ input from the subtraction unit 295. The addition unit 296 then adds a matrix $(\sigma_{2b}^2 - \Delta g \sigma_{2a}^2)I$, which is obtained by the multiplication, and the amplitude correction covariance matrix $\Delta g R_{UU}$ input from the multiplication unit 223. The addition unit 296 then outputs a matrix $\Delta g R_{UU} (\sigma_{2b}^2 - \Delta g \sigma_{2a}^2)I$, which is obtained by the addition, to the weight generation unit 240b as a noise amount correction covariance matrix.

<<Embodiment 7>>

The following describes Embodiment 7 of the present invention with reference to the attached drawings.

The present embodiment differs from Embodiments 3 to 6 in the method of the noise amount correction performed onto the amplitude correction covariance matrix obtained by the amplitude correction by the amplitude correction unit 220.

In the present embodiment, structural elements that are the same as those of the previously described embodiments are assigned with the same reference signs, and the description thereof is omitted since the description in previously described embodiments can be applied thereto.

<Structure of Radio Communication Device>

Figure 12:
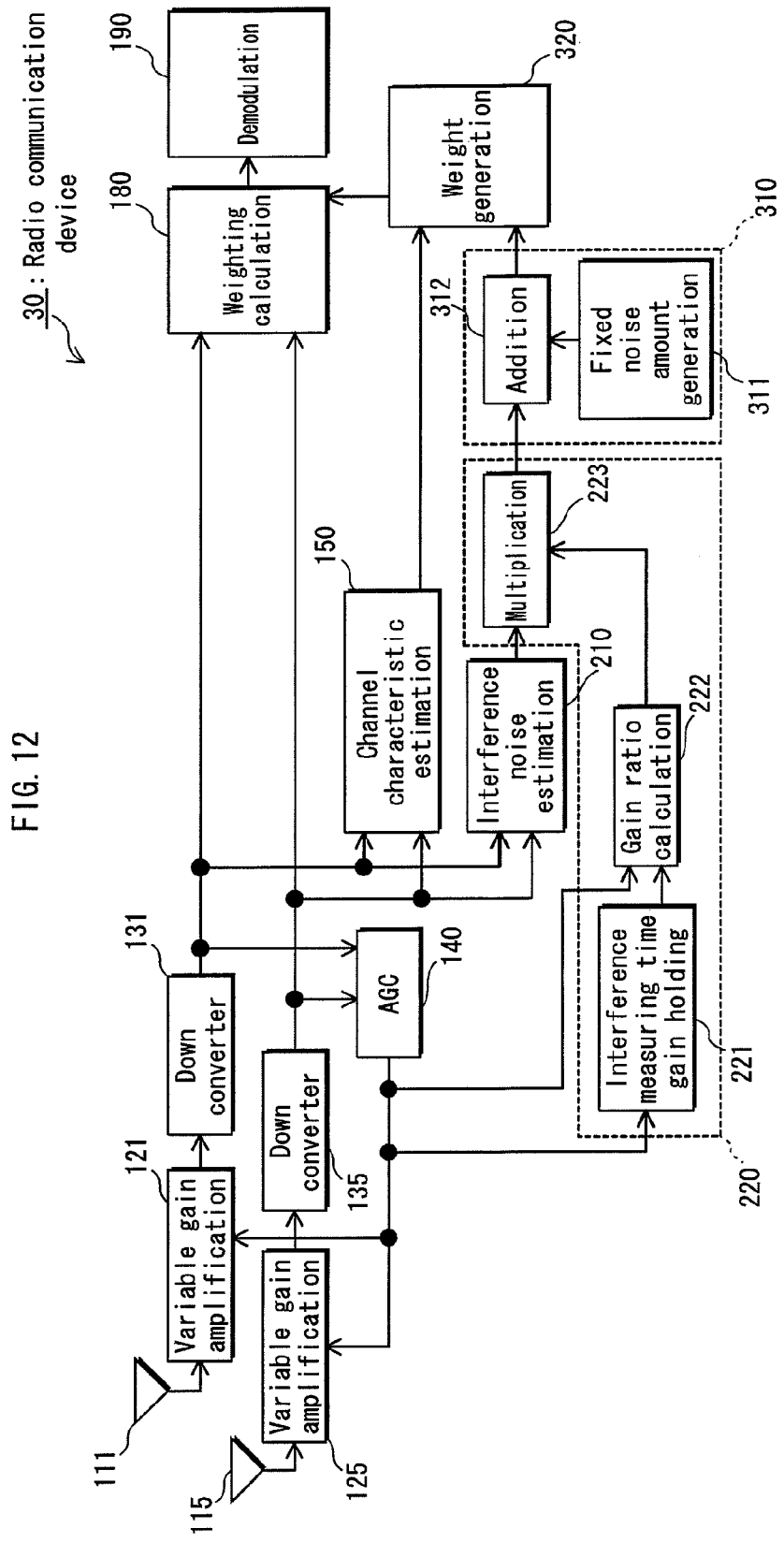
FIG. 12 shows the structure of the radio communication device in Embodiment 7.

The radio communication device of the present embodiment will be described with reference to FIG. 12. FIG. 12 shows the structure of the radio communication device of the present embodiment.

A radio communication device 30 includes antennas 111 and 115, variable gain amplification units 121 and 125, down converters 131 and 135, an AGC unit 140, a channel characteristic estimation unit 150, an interference noise estimation unit 210, an amplitude correction unit 220, a noise amount correction unit 310, a weight generation unit 320, a weighting calculation unit 180, and a demodulation unit 190.

(Noise Amount Correction Unit 310)

The noise amount correction unit 310, during reception of a desired signal, corrects the noise amount by adding a predetermined amount of noise to the amplitude correction covariance matrix $\Delta g R_{UU}$ that is obtained by the amplitude correction by the amplitude correction unit 220. The noise amount correction unit 310 includes a fixed noise amount generation unit 311 and an addition unit 312. Note that the components of the noise amount correction unit 310 operate during reception of a desired signal.

[Fixed Noise Amount Generation Unit 311]

The fixed noise amount generation unit 311 generates a predetermined amount of noise power (hereinafter referred to as "fixed noise amount") $n_1$, and outputs the generated fixed noise amount $n_1$ to the addition unit 312.

Note that, for example, the fixed noise amount generation unit 311 prestores a fixed noise amount $n_1$, and the fixed noise amount generation unit 311 outputs the fixed noise amount $n_1$, which is stored in itself, to the addition unit 312.

Note that the fixed noise amount $n_1$ may be, for example, an average noise amount of the noise that occurs in the high-frequency unit including the variable gain amplification units 121 and 125 and the down converters 131 and 135, or the smallest value among the values with which the MMSE calculation in a limited-accuracy calculation does not fail.

[Addition Unit 312]

The addition unit 312 multiplies the unit matrix I by the fixed noise amount $n_1$ input from the fixed noise amount generation unit 311. The addition unit 312 then adds a matrix $n_1 I$, which is obtained by the multiplication, and the amplitude correction covariance matrix $\Delta g R_{UU}$ input from the multiplication unit 223. The addition unit 312 then outputs a matrix $\Delta g R_{UU} + n_1 I$, which is obtained by the addition, to the weight generation unit 320 as a noise amount correction covariance matrix.

(Weight Generation Unit 320)

The weight generation unit 320, during reception of a desired signal, generates the weight matrix W by performing a calculation of the following Equation (13) using the channel matrix H input from the channel characteristic estimation unit 150 and the noise amount correction covariance matrix $\Delta g R_{UU} + n_1 I$ input from the addition unit 312. The weight generation unit 320 then outputs the generated weight matrix W to the weighting calculation unit 180.

[Equation 13]

$$W = H^H (H H^H + \Delta g R_{UU} + n_1 I)^{-1} \quad (13)$$

In the present embodiment described above, the noise amount correction covariance matrix is calculated by adding the amplitude correction covariance matrix and the matrix which is obtained by multiplying the unit matrix I by the fixed noise amount. With this structure, even in the case where the gain ratio $\Delta g$ might be treated as zero, the component of unnecessary signals in the noise amount correction covariance matrix remains as $n_1 I$, and it never becomes zero. An MMSE calculation would fail when the component of unnecessary signals is zero. However, with the radio communication device 30 of the present embodiment, the component of unnecessary signals never becomes zero, and thus the MMSE calculation does not fail.

Note that, in each of the embodiments described above, the period during which a desired signal is received or the period during which interference is measured are presented as examples. However, the present invention is not limited to these periods.

<<Embodiment 8>>

The following describes Embodiment 8 of the present invention with reference to the attached drawings.

Figure 13:
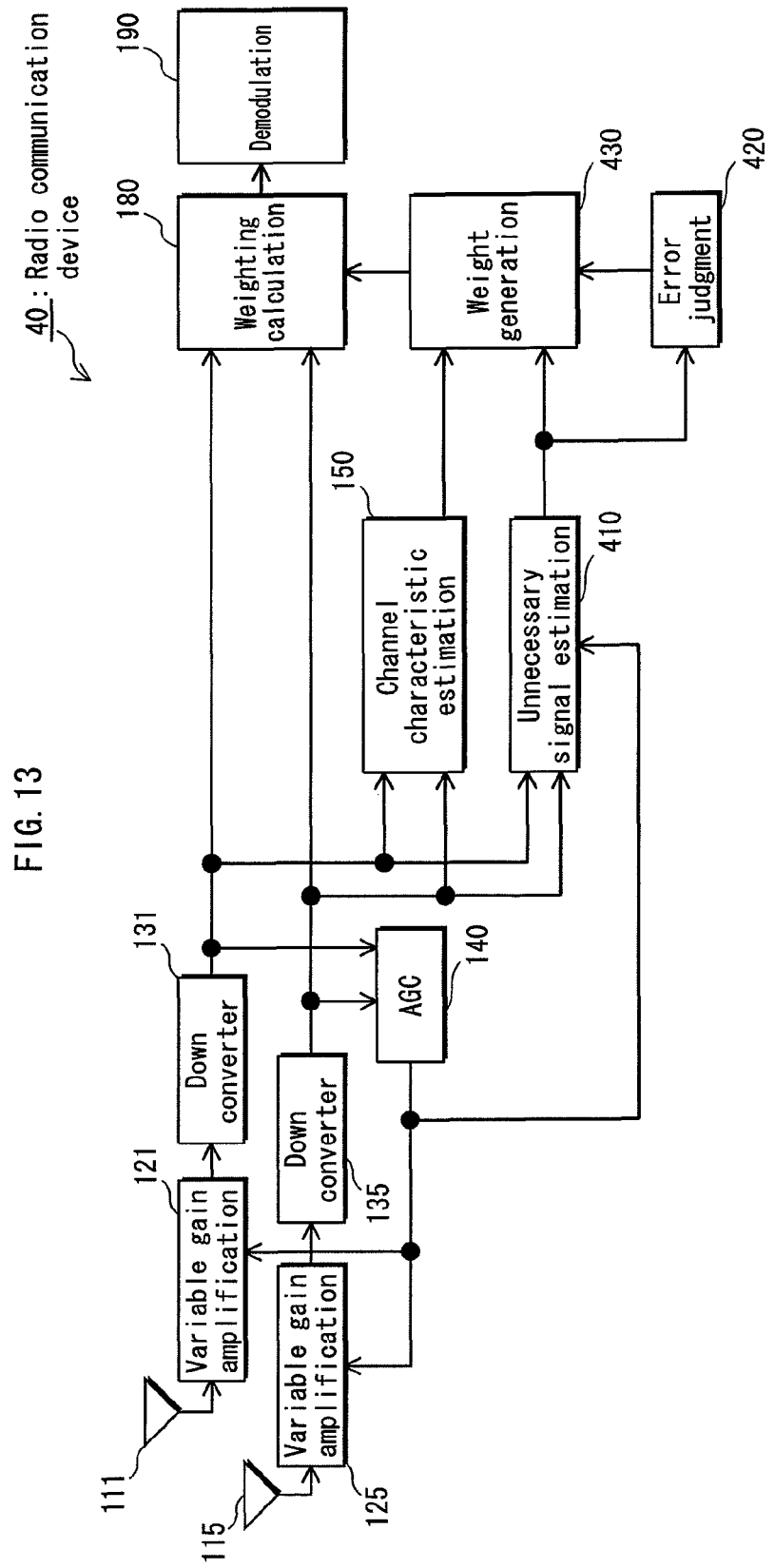
FIG. 13 shows the structure of the radio communication device in Embodiment 8.

A covariance matrix of an unnecessary signal matrix U whose matrix elements are unnecessary signals used for generating a weight matrix (hereinafter the covariance matrix is referred to as "unnecessary signal covariance matrix", which may be, for example, the noise amount correction covariance matrix $\Delta g R_{UU} + (1-g) n I$)) may include a large calculation error due to, for example, a quantization error in the down converters 131 and 135, or reduction of bit width in a processing circuit (for example, an unnecessary signal estimation unit 410 shown in FIG. 13) for calculating the unnecessary signal covariance matrix.

When an unnecessary signal covariance matrix includes a large error, a weight matrix generated with use of the unnecessary signal covariance matrix includes a large error compared with an original weight matrix. Accordingly, when the weighting calculation is performed, based on such a weight matrix including a large error, onto a plurality of BB signals output from the down converters 131 and 135, a resulted estimated transmission signal would include a large error, compared with an original transmission signal.

In view of this problem, the present embodiment provides a radio communication device which, compared with the radio communication device 20 of Embodiment 3, additionally has a function to, depending on the calculation error in the unnecessary signal covariance matrix output from the processing circuit, switch between methods by which the weight generation unit generates the weight matrix.

In the present embodiment, structural elements that are the same as those of the previously described embodiments are assigned with the same reference signs, and the description thereof is omitted since the description in previously described embodiments can be applied thereto.

<Structure of Radio Communication Device>

Figure 14:
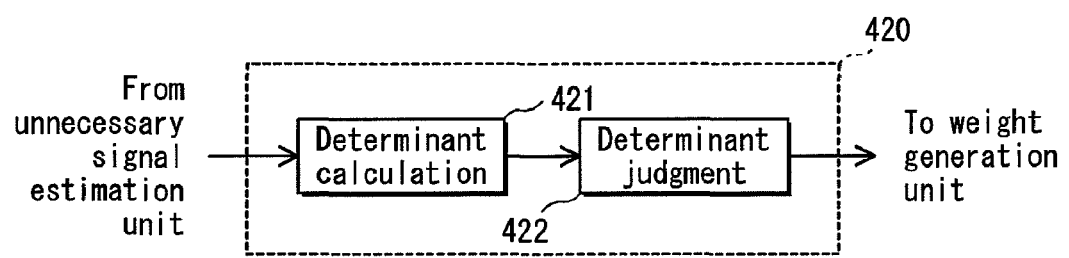
FIG. 14 shows the structure of the error judgment unit shown in FIG. 13.

The radio communication device of the present embodiment will be described with reference to FIGS. 13 and 14. FIG. 13 shows the structure of the radio communication device of the present embodiment. FIG. 14 shows the structure of an error judgment unit 420 shown in FIG. 13.

A radio communication device 40 includes antennas 111 and 115, variable gain amplification units 121 and 125, down converters 131 and 135, an AGC unit 140, a channel characteristic estimation unit 150, an unnecessary signal estimation unit 410, an error judgment unit 420, a weight generation unit 430, a weighting calculation unit 180, and a demodulation unit 190.

(Unnecessary Signal Estimation Unit 410)

The unnecessary signal estimation unit 410 is composed of the interference noise estimation unit 210, the amplitude correction unit 220, and the noise amount correction unit 230 described in Embodiment 3 (see FIG. 6). The unnecessary signal estimation unit 410 outputs, to the error judgment unit 420 and the weight generation unit 430, an unnecessary signal covariance matrix $R_{UU}$ (which is, in the present embodiment, the noise amount correction covariance matrix $\Delta g R_{UU} + (1 - \Delta g) n I$ described in Embodiment 3) that corresponds to the unnecessary signals included in the BB signals output from the down converters 131 and 135.

(Error Judgment Unit 420)

The error judgment unit 420, during reception of a desired signal, judges whether or not the unnecessary signal covariance matrix $R_{UU}$ input from the unnecessary signal estimation unit 410 satisfies a predetermined error allowance condition. The error judgment unit 420 includes a determinant calculation unit 421 and a determinant judgment unit 422, as shown in FIG. 14.

Note that the error allowance condition means that the calculation error of the unnecessary signal covariance matrix $R_{UUI}$ falls within a predetermined range of calculation error. The error allowance condition in the present embodiment is that the value of determinant in the unnecessary signal covariance matrix $R_{UUI}$ is 0 or more.

Meanwhile, with respect to the covariance matrix of an unnecessary signal matrix whose matrix elements are unnecessary signals included in the BB signals, it is known from the mathematical property thereof that the value of determinant in the covariance matrix is 0 or more.

It is therefore possible to regard that a calculation error of a covariance matrix of an unnecessary signal matrix is small when the value of determinant in the covariance matrix is 0 or more, and that the calculation error is large when the value of determinant in the covariance matrix is less than 0.

As a result, even with respect to an unnecessary signal covariance matrix which is obtained after the interference noise estimation unit 210 and the noise amount correction unit 230 respectively perform an amplitude correction and a noise amount correction onto a covariance matrix of an unnecessary signal matrix, it is possible to regard that a calculation error of an unnecessary signal covariance matrix $R_{UUI}$ is small when the value of determinant in the unnecessary signal covariance matrix $R_{UUI}$ is 0 or more, and that the calculation error is large when the value of determinant in the unnecessary signal covariance matrix $R_{UUI}$ is less than 0.

[Determinant Calculation Unit 421]

The determinant calculation unit 421 calculates the value of a determinant in the unnecessary signal covariance matrix $R_{UUI}$ which is input from the unnecessary signal estimation unit 410, and outputs the value of the determinant, which is obtained by the calculation, to the determinant judgment unit 422.

[Determinant Judgment Unit 422]

The determinant judgment unit 422 judges whether the value of the determinant in the unnecessary signal covariance matrix $R_{UUI}$ is "0 or more" ("not less than 0") or "less than 0", where the value is input from the determinant calculation unit 421.

When it judges that the value of the determinant in the unnecessary signal covariance matrix $R_{UUI}$ is 0 or more, the determinant judgment unit 422 judges that the calculation error of the unnecessary signal covariance matrix $R_{UUI}$ is small and that the unnecessary signal covariance matrix $R_{UUI}$ satisfies the error allowance condition. In this case, the determinant judgment unit 422 outputs an error judgment signal, which indicates that the unnecessary signal covariance matrix $R_{UUI}$ satisfies the error allowance condition, to the weight generation unit 430.

On the other hand, when it judges that the value of the determinant in the unnecessary signal covariance matrix $R_{UUI}$ is less than 0, the determinant judgment unit 422 judges that the calculation error of the unnecessary signal covariance matrix $R_{UUI}$ is large and that the unnecessary signal covariance matrix $R_{UUI}$ does not satisfy the error allowance condition. In this case, the determinant judgment unit 422 outputs an error judgment signal, which indicates that the unnecessary signal covariance matrix $R_{UUI}$ does not satisfy the error allowance condition, to the weight generation unit 430.

(Weight Generation Unit 430)

The weight generation unit 430, when the error judgment signal input from the error judgment unit 420 indicates that the error allowance condition is satisfied, generates a weight matrix (hereinafter referred to as "interference suppressing weight matrix") for suppressing the interference, by performing a calculation of the above-shown Equation (8) using the channel matrix H input from the channel characteristic estimation unit 150 and the unnecessary signal covariance matrix $R_{UUI}$ input from the unnecessary signal estimation unit 410 (in the present embodiment, it is the noise amount correction covariance matrix $\Delta g R_{UU} + (1-\Delta g)nI$). The weight generation unit 430 then outputs the generated weight matrix to the weighting calculation unit 180.

On the other hand, when the error judgment signal input from the error judgment unit 420 indicates that the error allowance condition is not satisfied, the weight generation unit 430 generates a weight matrix (hereinafter referred to as "maximum ratio combining weight matrix") for the maximum ratio combining for maximizing the ratio of signal power to noise power, based on the channel matrix H input from the channel characteristic estimation unit 150, without using the unnecessary signal covariance matrix $R_{UUI}$ input from the unnecessary signal estimation unit 410. The weight generation unit 430 then outputs the generated maximum ratio combining weight matrix to the weighting calculation unit 180. For example, characteristic values of matrix $HH^H$ are calculated, and then a characteristic vector that provides the maximum characteristic value among the characteristic values is the maximum ratio combining weight matrix to be generated.

When the interference suppressing weight matrix is input from the weight generation unit 430, the weighting calculation unit 180 multiplies the input interference suppressing weight matrix by a reception signal matrix whose matrix elements are BB signals input from the down converters 131 and 135. Also, when the maximum ratio combining weight matrix is input from the weight generation unit 430, the weighting calculation unit 180 multiplies the input maximum ratio combining weight matrix by a reception signal matrix whose matrix elements are BB signals input from the down converters 131 and 135. Note that in the actual calculation, the weighting calculation unit 180 does not judge whether the matrix is the interference suppressing weight matrix or the maximum ratio combining weight matrix.

The operational flow of the signal reception of the radio communication device 40 structured as described above is as follows.

In the flowchart shown in FIG. 7, a judgment step is inserted between steps S8 and S9. In this judgment step, the error judgment unit 420 judges whether or not the unnecessary signal covariance matrix $R_{UUI}$ satisfies the error allowance condition. Also, step S9 is replaced with a weight generation step in which, when it is judged in the judgment step that the unnecessary signal covariance matrix $R_{UUI}$ satisfies the error allowance condition, the weight generation unit 430 generates the interference suppressing weight matrix; and when it is judged that the unnecessary signal covariance matrix $R_{UUI}$ does not satisfy the error allowance condition, the weight generation unit 430 generates the maximum ratio combining weight matrix.

As described above, when the unnecessary signal covariance matrix $R_{UUI}$ estimated by the unnecessary signal estimation unit 410 includes a small calculation error compared with the original unnecessary signal covariance matrix, the weight generation unit 430 generates the interference suppressing weight matrix. And the weighting calculation unit 180 performs a weighting calculation onto a plurality of BB signals output from the down converters 131 and 135, based on the interference suppressing weight matrix.

Accordingly, when the unnecessary signal covariance matrix $R_{UUI}$ estimated by the unnecessary signal estimation unit 410 includes a small calculation error compared with the original unnecessary signal covariance matrix, the radio communication device 40 suppresses the unnecessary signals in the desired signal based on the interference suppressing weight matrix which is generated using the unnecessary signal covariance matrix $R_{UUI}$ including the small calculation error. This enables the transmission signal to be estimated with high accuracy.

Also, when the unnecessary signal covariance matrix $R_{UUI}$ estimated by the unnecessary signal estimation unit 410 includes a large calculation error compared with the original unnecessary signal covariance matrix, the weight generation unit 430 generates the maximum ratio combining weight matrix. And the weighting calculation unit 180 performs a weighting calculation onto a plurality of BB signals output from the down converters 131 and 135, based on the maximum ratio combining weight matrix.

Accordingly, when the unnecessary signal covariance matrix $R_{UUI}$ estimated by the unnecessary signal estimation unit 410 includes a large calculation error compared with the original unnecessary signal covariance matrix, the radio communication device 40 estimates the transmission signal based on the maximum ratio combining weight matrix, without using the interference suppressing weight matrix which is generated using the unnecessary signal covariance matrix $R_{UUI}$ including the large calculation error. This enables the transmission signal to be estimated with high accuracy.

<<Embodiment 9>>

The following describes Embodiment 9 of the present invention with reference to the attached drawings.

Aiming to adapt the radio communication device 40 of Embodiment 8 to the multi-carrier method such as the OFDM method, in the present embodiment, the radio communication device 40 is further provided with a function to separate the reception signal into a plurality of frequency subbands. Note that adaptation of the present embodiment is not limited to the multi-carrier method.

In the present embodiment, structural elements that are the same as those of the previously described embodiments are assigned with the same reference signs, and the description thereof is omitted since the description in previously described embodiments can be applied thereto.

<Structure of Radio Communication Device>

The radio communication device of the present embodiment will be described with reference to FIG. 15. FIG. 15 shows the structure of a radio communication device 40a of the present embodiment.

The radio communication device 40a includes antennas 111 and 115, variable gain amplification units 121 and 125, down converters 131 and 135, an AGC unit 140, subband separation units 451 and 455, a channel characteristic estimation unit 150d, an unnecessary signal estimation unit 410d, an error judgment unit 420d, a-weight generation unit 430d, a weighting calculation unit 180d, and a demodulation unit 190d.

(Subband Separation Unit 451, 455)

The subband separation unit 451 separates each BB signal input from the down converter 131 into a plurality of subband signals, and outputs the subband signals to the channel characteristic estimation unit 150d, the unnecessary signal estimation unit 410d, and the weighting calculation unit 180d.

The subband separation unit 455 separates each BB signal input from the down converter 135 into a plurality of subband signals, and outputs the subband signals to the channel characteristic estimation unit 150d, the unnecessary signal estimation unit 410d, and the weighting calculation unit 180d.

It is presumed here that the subband separation units 451 and 455 separate the BB signals into M pieces of subbands, where M is an integer of 2 or more.

When separating the BB signals into subbands, the subband separation units 451 and 455 may use, for example, the Fast Fourier Transform (FFT), the wavelet transform, or the filter bank.

(Channel Characteristic Estimation Unit 150d)

The channel characteristic estimation unit 150d, during reception of a pilot signal included in the desired signal, estimates the channel characteristic for each channel by performing, for each subband, a correlation calculation between the pilot signals included in the subband signals input from the down converters 131 and 135 and the pilot signals (whose signal waveform is known to the reception side) on the transmission side corresponding to the pilot signals that are being received.

The channel characteristic estimation unit 150d then creates, for each subband, a channel matrix (hereinafter referred to as "subband channel matrix") $H_m$ whose matrix elements are the estimation values of the channel characteristic obtained by the estimation, and outputs the created subband channel matrix $H_m$ to the weight generation unit 430d. Note that a subscript m (m=1, 2, . . . , M) indicates a subband number of a subband.

(Unnecessary Signal Estimation Unit 410d)

The unnecessary signal estimation unit 410d, during measuring of the interference, for each subband, repeatedly estimates a plurality of characteristic amounts for unnecessary signals composed of noise and interference included in a plurality of subband signals, based on the plurality of subband signals input from the subband separation units 451 and 455. The unnecessary signal estimation unit 410d creates a covariance matrix (hereinafter referred to as "subband covariance matrix") $R_{UUm}$ whose matrix elements are estimation values of a plurality of characteristic amounts obtained by the estimation.

Here, the subband covariance matrix $R_{UUm}$ will be described.

When the radio communication device 40a is provided with N pieces of antennas, the subband covariance matrix $R_{UUm}$ is a matrix composed of N rows and N columns.

When the N pieces of antennas are respectively referred to as the first antenna through the $N^{th}$ antenna, the matrix element of the $i^{th}$ row (i=1, . . . , N) $j^{th}$ column (j=1, . . . , N) of the subband covariance matrix $R_{UUm}$ is a time average value of multiplication values that are obtained by multiplying an unnecessary signal of a subband signal corresponding to the $i^{th}$ antenna by the complex conjugate signal of an unnecessary signal of a subband signal corresponding to the $j^{th}$ antenna. Note that the diagonal component of the subband covariance matrix $R_{UUm}$ is a time average value of the power of interference and noise of unnecessary signals included in the subband signals. The non-diagonal component of the subband covariance matrix $R_{UUm}$ is a time average value of the correlation power among unnecessary signals included in the BB signals.

The unnecessary signal estimation unit 410d multiplies, for each subband, the subband covariance matrix $R_{UUm}$ by the gain ratio $\Delta g$ being a ratio of the second control gain value during reception of a desired signal to the first control gain value during measuring of interference. The unnecessary signal estimation unit 410d then adds $(1-\Delta g)nI$ ("n" is an average value of noise amount of subband that occurs in the high-frequency unit) to a matrix $\Delta g R_{UUm}$, which is obtained by the multiplication, and outputs a matrix $\Delta gR_{UUm}+(1-\Delta g)nI$, which is obtained by the addition, to the error judgment unit 420d and the weight generation unit 430d, as a subband unnecessary signal covariance matrix.

(Error Judgment Unit 420d)

The error judgment unit 420d, for each subband, calculates a value of the determinant in the subband unnecessary signal covariance matrix that is input from the unnecessary signal estimation unit 410d, and judges whether the calculated value of the subband determinant in the unnecessary signal covariance matrix is "0 or more" ("not less than 0") or "less than 0".

When it judges that the value of the determinant in the subband unnecessary signal covariance matrix is 0 or more, the error judgment unit 420d outputs a subband error judgment signal, which indicates that the subband unnecessary signal covariance matrix satisfies the error allowance condition, to the weight generation unit 430d. On the other hand, when it judges that the value of the determinant in the subband unnecessary signal covariance matrix is less than 0, the error judgment unit 420d outputs a subband error judgment signal, which indicates that the subband unnecessary signal covariance matrix does not satisfy the error allowance condition, to the weight generation unit 430d.

(Weight Generation Unit 430d)

The weight generation unit 430d, for each subband, when the subband error judgment signal input from the error judgment unit 420d indicates that the error allowance condition is satisfied, generates a weight matrix (hereinafter referred to as "interference suppressing subband weight matrix") for suppressing the interference, based on the subband channel matrix $H_m$ input from the channel characteristic estimation unit 150d and the subband unnecessary signal covariance matrix $\Delta gR_{UUm}+(1-\Delta g)nI$ input from the unnecessary signal estimation unit 410d. Note that the interference suppressing subband weight matrix is obtained by performing a calculation using the above-shown Equation (8) in which the channel matrix H has been replaced with the subband channel matrix $H_m$ and the covariance matrix $R_{UU}$ has been replaced with the subband covariance matrix $R_{UUm}$.

On the other hand, when the subband error judgment signal input from the error judgment unit 420d indicates that the error allowance condition is not satisfied, the weight generation unit 430d generates a weight matrix (hereinafter referred to as "maximum ratio combining subband weight matrix") for the maximum ratio combining for maximizing the ratio of signal power to noise power, based on the subband channel matrix $H_m$ input from the channel characteristic estimation unit 150d, without using the subband unnecessary signal covariance matrix input from the unnecessary signal estimation unit 410d.

The weight generation unit 430d then, for each subband, outputs the generated interference suppressing subband weight matrix or the generated maximum ratio combining subband weight matrix to the weighting calculation unit 180d.

(Weighting Calculation Unit 180d)

The weighting calculation unit 180d, for each subband, multiplies the interference suppressing subband weight matrix or the maximum ratio combining subband weight matrix input from the weight generation unit 430d, by the subband reception signal matrix whose matrix elements are the subband signals input from the, subband separation units 451 and 455. The weighting calculation unit 180d then outputs the signals respectively corresponding to the subbands, which are obtained by the multiplication, to the demodulation unit 190d (hereinafter, the signals corresponding to the subbands are referred to as "subband transmission signals").

(Demodulation Unit 190d)

The demodulation unit 190d, for each subband, demodulates the subband transmission signal for each subband input from the weighting calculation unit 180d, and outputs a demodulation signal, which is obtained by the demodulation, to a circuit unit that follows itself.

Figure 16:
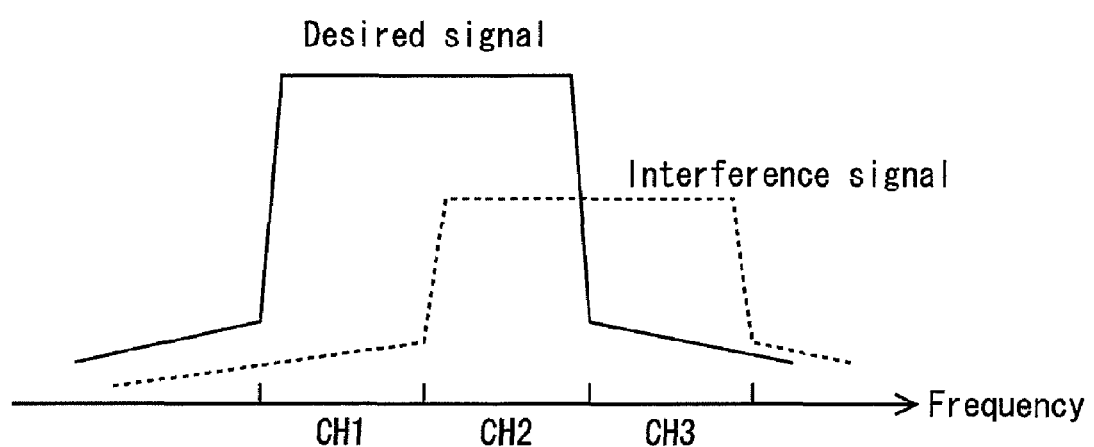
FIG. 16 provides illustrations for explanation of effects of the radio communication device shown in FIG. 15.

Here, a merit of switching, for each subband, between generation of the interference suppressing subband weight matrix and generation of the maximum ratio combining subband weight matrix will be explained with reference to FIG. 16. FIG. 16 shows the power spectrum for each of the desired signal and the interference signal. Note that the bandwidth of each of the transmission channels CH1 to CH3 is, for example, 20 MHz.

It is presumed here that the radio communication device 40a is performing a radio communication using a transmission channel which is composed of transmission channels CH1 and CH2 and whose bandwidth is 40 MHz. It is also presumed that a radio communication device which is an interference source for the radio communication device 40a is performing a radio communication using a transmission channel which is composed of transmission channels CH2 and CH3 and whose bandwidth is 40 MHz.

As shown in FIG. 16, a main lobe signal of the interference signal exists in the transmission channel CH2, and a side lobe signal of the interference signal exists in the transmission channel CH1.

In the radio communication device 40a of the above-stated circumstances, the power level of the interference signal in the transmission channel CH2 is relatively large and the power level of the interference signal in the transmission channel CH1 is relatively small, among the transmission channels in which the desired signal is transmitted.

In a band in which the power level of the interference signal is relatively small, the calculation error of the subband unnecessary signal covariance matrix becomes large due to, for example, a quantization error in the down converters 131 and 135 or reduction of bit width in the unnecessary signal estimation unit 410d.

When the calculation error of the subband unnecessary signal covariance matrix is large, the interference suppressing subband weight matrix, which is generated based on the subband unnecessary signal covariance matrix, includes a large error compared with the original interference suppressing subband weight matrix. When the interference suppressing subband weight matrix including a large error is used in the weighting calculation for a plurality of subband signals, the estimated subband transmission signal includes a large error compared with the original subband transmission signal.

Therefore, in a band in which the power level of the interference signal is relatively small, using the maximum ratio combining weight matrix in the weighting calculation for a plurality of subband signals can provide higher accuracy of the subband transmission signal, than using the interference suppressing subband weight matrix.

On the other hand, it is considered that, in general, in a band in which the power level of the interference signal is relatively large, the subband unnecessary signal covariance matrix becomes small compared with the original subband unnecessary signal covariance matrix in the calculation error thereof. In this case, by using the interference suppressing subband weight matrix, it is possible to effectively suppress the interference signal in the subband signal.

It is therefore considered that, in general, in a band in which the power level of the interference signal is relatively large, using the interference suppressing subband weight matrix in the weighting calculation for a plurality of subband signals can provide higher accuracy of the subband transmission signal, than using the maximum ratio combining weight matrix.

Therefore, by determining a weight matrix to be used in the weighting calculation for a plurality of subband signals by switching, for each subband, between the interference suppressing subband weight matrix and the maximum ratio combining subband weight matrix, it is possible to obtain a subband transmission signal with high estimation accuracy for each subband.

<<Embodiment 10>>

The following describes. Embodiment 10 of the present invention with reference to the attached drawings.

A lot of multiplications and divisions are performed in the weighting calculation based on the weight matrix for the reception signals. Accordingly, when the number of antennas on the transmission or reception side increases, the number of multiplications and divisions required for the calculation increases, as well.

Meanwhile, each time a multiplication/division is performed, the bit width becomes twice. Therefore, increase in the number of multiplications and divisions brings increase in the circuit size and power consumption.

For this reason, in general, to reduce the bit width, the rounding is performed in the middle of calculations such as multiplications and divisions. However, the calculation accuracy is deteriorated when the rounding is performed in the middle of calculations such as multiplications and divisions.

The present embodiment is aimed, in view of the above-described problem, to reduce the amount of calculation in the weighting calculation for the reception signals, while preventing the calculation accuracy from being deteriorated.

In the present embodiment, structural elements that are the same as those of the previously described embodiments are assigned with the same reference signs, and the description thereof is omitted since the description in previously described embodiments can be applied thereto.

<Structure of Radio Communication Device>

Figure 17:
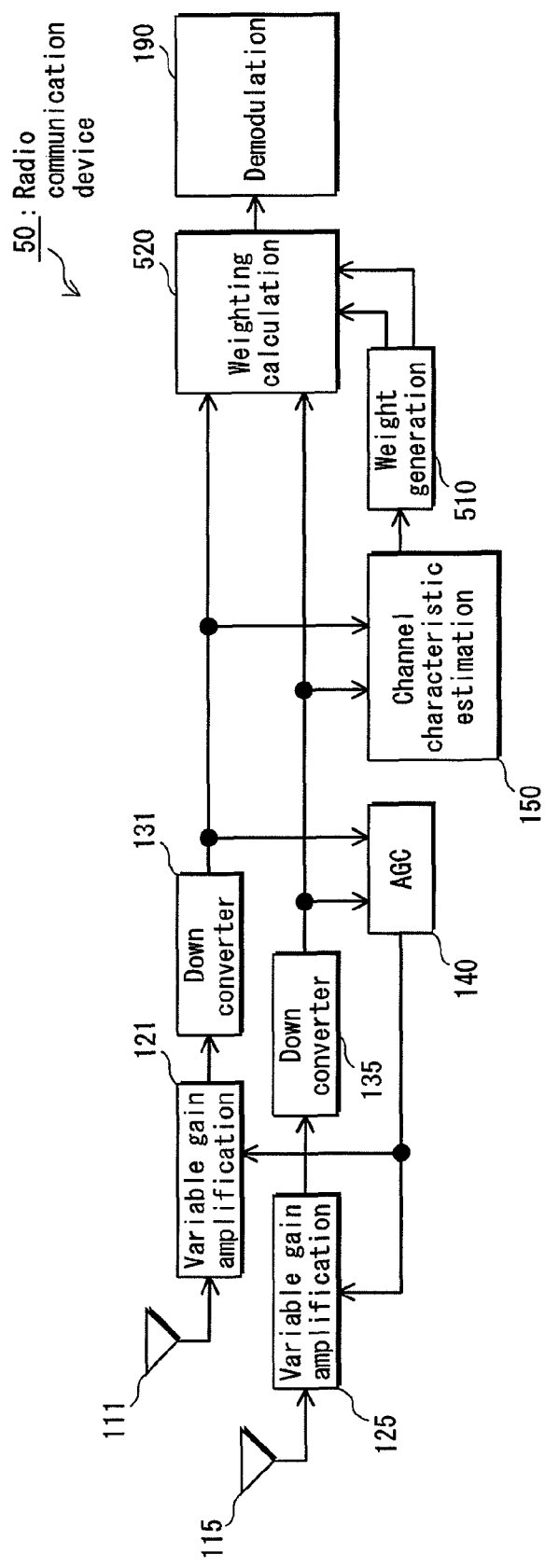
FIG. 17 shows the structure of the radio communication device in Embodiment 10.
Figure 18:
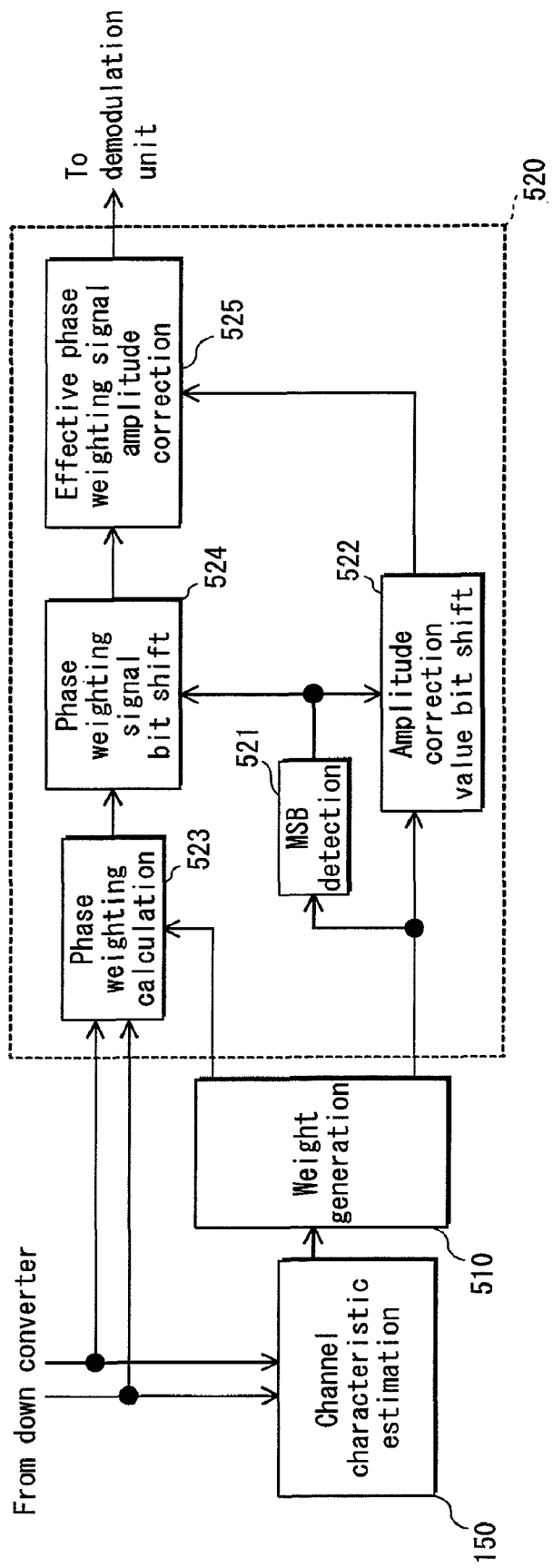
FIG. 18 shows the structure of the weighting calculation unit shown in FIG. 17.
Figure 19:
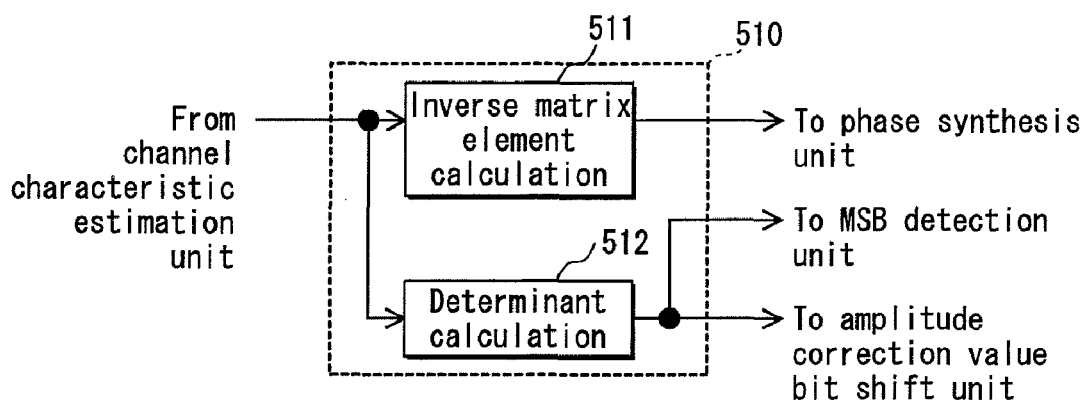
FIG. 19 shows the structure of the weight generation unit shown in FIG. 17.

The radio communication device of the present embodiment will be described with reference to FIGS. 17 to 19. FIG. 17 shows the structure of a radio communication device of the present embodiment. FIG. 18 shows the structure of a weighting calculation unit 520 shown in FIG. 17. FIG. 19 shows the structure of a weight generation unit 510 shown in FIG. 17.

The present embodiment explains a case where the ZF (Zero Forcing) method for obtaining an inverse matrix of the channel matrix H is used, as one example.

A radio communication device 50 includes antennas 111 and 115, variable gain amplification units 121 and 125, down converters 131 and 135, an AGC unit 140, a channel characteristic estimation unit 150, a weight generation unit 510, a weighting calculation unit 520, and a demodulation unit 190.

Note that the AGC unit 140 outputs a gain control signal to the variable gain amplification units 121 and 125.

(Weight Generation Unit 510)

The weight generation unit 510, during reception of a desired signal, generates a weight matrix to be used in the weighting calculation performed onto a plurality of BB signals output from the down converters 131 and 135. As shown in FIG. 19, the weight generation unit 510 includes an inverse matrix element calculation unit 511 and a determinant calculation unit 512. Note that the components of the weight generation unit 510 operate during reception of a desired signal.

[Inverse Matrix Element Calculation Unit 511]

The inverse matrix element calculation unit 511, based on the channel matrix H input from the channel characteristic estimation unit 150, calculates a matrix $(\det H)H^{-1}$ by multiplying an inverse matrix $H^{-1}$ of the channel matrix H by a determinant detH of the channel matrix H. The inverse matrix element calculation unit 511 outputs the calculated matrix $(\det H)H^{-1}$, as a phase weight matrix, to a phase weighting calculation unit 523 (which will be described later) of the weighting calculation unit 520.

Note that the phase weight matrix is a matrix that is used for performing a phase-related weighting calculation in the weighting calculation performed onto a plurality of BB signals output from the down converters 131 and 135.

Also, when the channel matrix H is a matrix composed of two rows and two columns, the matrix element of the first row and first column of the matrix $(\det H)H^{-1}$ is a matrix element $h_{22}$ of the second row and second column of the channel matrix H, and the matrix element of the second row and second column of the matrix $(\det H)H^{-1}$ is a matrix element $h_{11}$ of the first row and first column of the channel matrix H.

Further, the matrix element of the first row and second column of the matrix $(\det H)H^{-1}$ is a matrix element $-h_{12}$ which is a matrix element $h_{12}$ of the first row and second column of the channel matrix H, with it sign being reversed, and the matrix element of the second row and first column of the matrix $(\det H)H^{-1}$ is a matrix element $-h_{21}$ which is a matrix element $h_{21}$ of the second row and first column of the channel matrix H, with it sign being reversed.

[Determinant Calculation Unit 512]

The determinant calculation unit 512 calculates a determinant detH of the channel matrix H based on the channel matrix H input from the channel characteristic estimation unit 150, and outputs the calculated determinant detH to an MSB detection unit 521 and an amplitude correction value bit shift unit 522 (which will be described later) of the weighting calculation unit 520, as an amplitude correction value.

Note that the amplitude correction value is a value that is used for performing an amplitude correction calculation in the weighting calculation performed onto the BB signals output from the down converters 131 and 135.

Also, when the channel matrix H is a matrix composed of two rows and two columns, the determinant detH is a value $h_{11}h_{22}-h_{12}h_{21}$ which is obtained by subtracting a multiplication value $h_{12}h_{21}$, which is obtained by multiplying the matrix element $h_{12}$ of the first row and second column of the channel matrix H by matrix element $h_{21}$ of the second row and first column of the channel matrix H, from a multiplication value $h_{11}h_{22}$ which is obtained by multiplying the matrix element $h_{11}$ of the first row and first column of the channel matrix H by matrix element $h_{22}$ of the second row and second column of the channel matrix H.

(Weighting Calculation Unit 520)

The weighting calculation unit 520, during reception of a desired signal, performs the weighting calculation onto a plurality of BB signals output from the down converters 131 and 135, by using the phase weight matrix and the amplitude correction value input from the weight generation unit 510.

The weighting calculation unit 520 includes an MSB detection unit 521, an amplitude correction value bit shift unit 522, phase weighting calculation unit 523, a phase weighting signal bit shift unit 524, and an effective phase weighting signal amplitude correction unit 525. Note that the components of the weighting calculation unit 520 operate during reception of a desired signal.

[MSB Detection Unit 521]

The MSB detection unit 521 detects the Most Significant Bit (MSB) in a code sequence representing the amplitude correction value (value of determinant detH) input from the determinant calculation unit 512, and outputs an MSB notification signal to the amplitude correction value bit shift unit 522 and the phase weighting signal bit shift unit 524, where the MSB notification signal indicates the number of bit digits to be shifted based on the detected MSB.

More specifically, since the determinant detH of the channel matrix H is always a positive value, the MSB detection unit 521 detects a bit with a bit value "1" that is found first in order from the highest-order bit, as the MSB in the code sequence representing the value of determinant detH.

When the code sequence representing the value of determinant detH of the channel matrix H input into the MSB detection unit 521 is composed of bits $b_9$ through $b_0$ (the subscripts indicate bit digits, and bits with higher values of subscripts are higher bits), and the MSB detected by the MSB detection unit 521 is $b_6$, the MSB detection unit 521 outputs an MSB notification signal indicating that the number of bit digits to be shifted is three, to the amplitude correction value bit shift unit 522 and the phase weighting signal bit shift unit 524.

Note that determinants $det(\sigma^2 I + HH^H)$ and $det(HH^H + R_{UUS})$ of the embodiment which will be described later are each a positive value.

[Amplitude Correction Value Bit Shift Unit 522]

The amplitude correction value bit shift unit 522, based on the number of bit digits to be shifted indicated by the MSB notification signal input from the MSB detection unit 521, shifts the bits of the amplitude correction value (determinant detH) input from the determinant calculation unit 512 by the indicated number, and extracts therefrom an effective number of the amplitude correction value. The amplitude correction value bit shift unit 522 then outputs the extracted effective number of the amplitude correction value (hereinafter referred to as "effective amplitude correction value") to the effective phase weighting signal amplitude correction unit 525.

The number of digits constituting the code of the effective amplitude correction value output from the amplitude correction value bit shift unit 522 is smaller than the number of digits constituting the code of the amplitude correction value input into the amplitude correction value bit shift unit 522.

For example, when the code of the determinant detH (amplitude correction value) of the channel matrix H input into the amplitude correction value bit shift unit 522 is composed of bits $b_9$ through $b_0$ (the subscripts indicate bit digits, and bits with higher values of subscripts are higher bits), and the MSB notification signal indicates that the number of bit digits to be shifted is three, the amplitude correction value bit shift unit 522 shifts the amplitude correction value by three bits, and outputs the bits $b_6$ through $b_0$ to the effective phase weighting signal amplitude correction unit 525, as the effective amplitude correction value.

[Phase Weighting Calculation Unit 523]

The phase weighting calculation unit 523 multiplies the phase weight matrix $(detH)H^{-1}$ input from the inverse matrix element calculation unit 511 by the reception signal matrix r whose matrix elements are BB signals output from the down converters 131 and 135. The phase weighting calculation unit 523 then outputs a matrix (hereinafter referred to as "phase weighting signal matrix"), which is obtained by the multiplication, to the phase weighting signal bit shift unit 524.

[Phase Weighting Signal Bit Shift Unit 524]

The phase weighting signal bit shift unit 524, based on the number of bit digits to be shifted indicated by the MSB notification signal input from the MSB detection unit 521, shifts the bits of each matrix element of the phase weighting signal matrix input from the phase weighting calculation unit 523, and extracts therefrom an effective number of each matrix element of the phase weighting signal matrix. The phase weighting signal bit shift unit 524 then outputs a matrix (hereinafter referred to as "effective phase weighting signal matrix") whose matrix elements are the extracted effective numbers of the matrix elements, to the effective phase weighting signal amplitude correction unit 525.

The number of digits constituting the code of each matrix element of the effective phase weighting signal matrix output from the phase weighting signal bit shift unit 524 is smaller than the number of digits constituting the code of each matrix element of the phase weighting signal matrix input into the phase weighting signal bit shift unit 524.

Note, however, that the number of digits of the amplitude correction value shifted by the amplitude correction value bit shift unit 522 is the same as the number of digits of each matrix element of the phase weighting signal matrix shifted by the phase weighting signal bit shift unit 524.

For example, when the code of each matrix element of the phase weighting signal matrix input into the phase weighting signal bit shift unit 524 is composed of bits $b_{15}$ through $b_0$ (the subscripts indicate bit digits, and bits with higher values of subscripts are higher bits), and the MSB notification signal indicates that the number of bit digits to be shifted is three, the phase weighting signal bit shift unit 524 shifts each matrix element of the phase weighting signal matrix by three bits, and outputs the effective phase weighting signal matrix whose matrix elements are each composed of the bits $b_{12}$ through $b_0$ to the effective phase weighting signal amplitude correction unit 525.

[Effective Phase Weighting Signal Amplitude Correction Unit 525]

The effective phase weighting signal amplitude correction unit 525 corrects the amplitude of each matrix element of the effective phase weighting signal matrix input from the phase weighting signal bit shift unit 524 based on the effective amplitude correction value input from the amplitude correction value bit shift unit 522, and outputs a signal matrix whose matrix elements are values obtained by the correction, to the demodulation unit 190.

More specifically, the effective phase weighting signal amplitude correction unit 525 divides the value of each matrix element of the effective phase weighting signal matrix by the effective amplitude correction value.

Note that the above-described phase weighting signal matrix and effective phase weighting signal matrix include a matrix composed of one row and one column.

In the division process, the effective phase weighting signal amplitude correction unit 525 divides the value of each matrix element of the effective phase weighting signal matrix whose number of digits is smaller than that of each matrix element of the phase weighting signal matrix, by the effective amplitude correction value whose code is composed of a smaller number of digits than the code of the amplitude correction value. This contributes to reduction of the amount of calculation performed by the effective phase weighting signal amplitude correction unit 525 in the division process.

Furthermore, the calculation accuracy in the division process performed by the effective phase weighting signal amplitude correction unit 525 is not deteriorated since the effective amplitude correction value and each matrix element of the effective phase weighting signal matrix that are used in the division process are respectively obtained by extracting the effective number of the amplitude correction value and the effective number of each matrix element of the phase weighting signal matrix.

Here, the operation of the weighting calculation unit 520 will be described briefly.

The MSB detection unit 521 detects the Most Significant Bit (MSB) in a code sequence representing the value of the determinant input from the determinant calculation unit 512.

The amplitude correction value bit shift unit 522, based on the detection result input from the MSB detection unit 521, shifts the bits of the amplitude correction value input from the determinant calculation unit 512, and extracts therefrom the effective number of the amplitude correction value.

The phase weighting calculation unit 523 performs the phase-related weighting onto the BB signals output from the down converters 131 and 135, based on the phase weight matrix input from the inverse matrix element calculation unit 511.

The phase weighting signal bit shift unit 524 performs the bit shifting onto the phase weighting signal matrix obtained by the process of the phase weighting calculation unit 523, based on the detection result input from the MSB detection unit 521, and extracts therefrom an effective number of each matrix element of the phase weighting signal matrix.

The effective phase weighting signal amplitude correction unit 525 corrects the amplitude of each matrix element of the effective phase weighting signal matrix obtained by the process of the phase weighting signal bit shift unit 524, based on the effective amplitude correction value obtained by the process of the amplitude correction value bit shift unit 522.

<<Embodiment 11>>

The following describes Embodiment 11 of the present invention with reference to the attached drawings.

The present embodiment provides a radio communication device having the functions of the radio communication device described in Embodiment 1, additionally with a function to reduce the amount of calculation in the weighting calculation.

In the present embodiment, structural elements that are the same as those of the previously described embodiments are assigned with the same reference signs, and the description thereof is omitted since the description in previously described embodiments can be applied thereto.

<Structure of Radio Communication Device>

Figure 20:
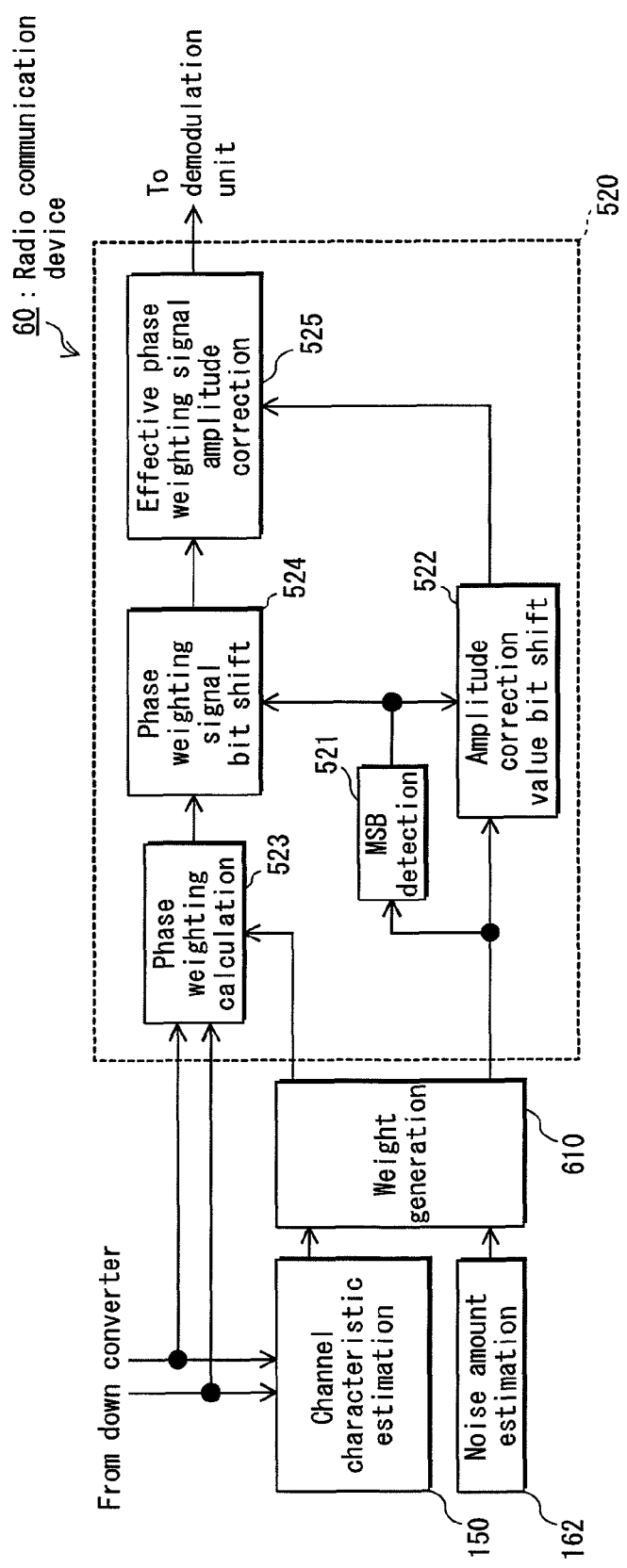
FIG. 20 shows the structure of the radio communication device in Embodiment 11.
Figure 21:
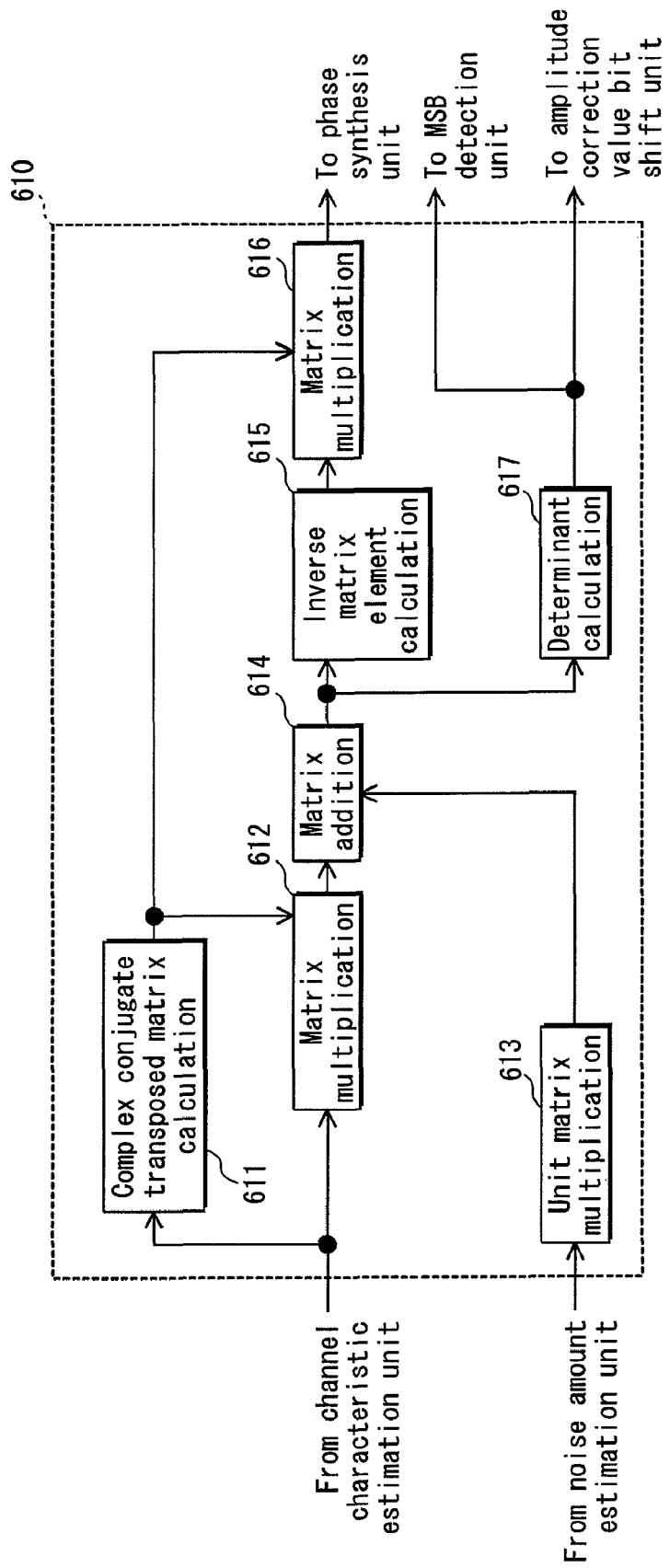
FIG. 21 shows the structure of the weight generation unit shown in FIG. 20.

The radio communication device of the present embodiment will be described with reference to FIGS. 20 and 21. FIG. 20 shows the structure of the radio communication device of the present embodiment. FIG. 21 shows the structure of a weight generation unit 610 shown in FIG. 20. Note that FIG. 20 shows a block whose components correspond to the channel characteristic estimation unit 150, the noise amount estimation unit 162, the weight generation unit 170, and the weighting calculation unit 180 shown in FIG. 2.

The present embodiment explains a case where the MMSE method is used, as one example.

The radio communication device 60 includes a channel characteristic estimation unit 150, a noise amount estimation unit 162, a weight generation unit 610, and a weighting calculation unit 520.

(Weight Generation Unit 610)

The weight generation unit 610, during reception of a desired signal, generates weights for use in the weighting calculation on a plurality of BB signals output from the down converters 131 and 135.

The weight generation unit 610, as shown in FIG. 21, includes a complex conjugate transposed matrix calculation unit 611, a matrix multiplication unit 612, a unit matrix multiplication unit 613, a matrix addition unit 614, an inverse matrix element calculation unit 615, a matrix multiplication unit 616, and a determinant calculation unit 617. Note that the components of the weight generation unit 610 operate during reception of a desired signal.

[Complex Conjugate Transposed Matrix Calculation Unit 611]

The complex conjugate transposed matrix calculation unit 611 calculates a complex conjugate transposed matrix $H^H$ of the channel matrix H input from the channel characteristic estimation unit 150, and outputs the calculated complex conjugate transposed, matrix $H^H$ to the matrix multiplication unit 612 and the matrix multiplication unit 616.

[Matrix Multiplication Unit 612]

The matrix multiplication unit 612 multiplies the channel matrix H input from the channel characteristic estimation unit 150 by the complex conjugate transposed matrix $H^H$ input from the complex conjugate transposed matrix calculation unit 611, and outputs a matrix $HH^H$ which is obtained by the multiplication to the matrix addition unit 614.

[Unit Matrix Multiplication Unit 613]

The unit matrix multiplication unit 613 multiplies the unit matrix I by the noise amount $\sigma^2$ input from the noise amount estimation unit 162, and outputs a matrix $\sigma^2 I$ which is obtained by the multiplication to the matrix addition unit 614.

[Matrix Addition Unit 614]

The matrix addition unit 614 adds the matrix $HH^H$ input from the matrix multiplication unit 612 and the matrix $\sigma^2 I$ input from the unit matrix multiplication unit 613, and outputs a matrix $\sigma^2 I + HH^H$ which is obtained by the addition to the inverse matrix element calculation unit 615 and the determinant calculation unit 617.

[Inverse Matrix Element Calculation Unit 615]

The inverse matrix element calculation unit 615, based on the matrix $\sigma^2 + HH^H$ input from the matrix addition unit 614, calculates a matrix $\det(\sigma^2 I + HH^H)(\sigma^2 I + HH^H)^{-1}$ by multiplying an inverse matrix $(\sigma^2 I + HH^H)^{-1}$ of the matrix $\sigma^2 I + HH^H$ by a determinant $\det(\sigma^2 I + HH^H)$ of the matrix $\sigma^2 I + HH^H$. The inverse matrix element calculation unit 615 then outputs the calculated matrix $\det(\sigma^2 I + HH^H)(\sigma^2 I + HH^H)^{-1}$ to the matrix multiplication unit 616.

[Matrix Multiplication Unit 616]

The matrix multiplication unit 616 multiplies the matrix $\det(\sigma^2 I + HH^H)(\sigma^2 I + HH^H)^{-1}$ input from the inverse matrix element calculation unit 615 by the complex conjugate transposed matrix $H^H$ input from the complex conjugate transposed matrix calculation unit 611, and outputs a matrix $\det(\sigma^2 I + HH^H)H^H(\sigma^2 I + HH^H)^{-1}$ which is obtained by the multiplication to the phase weighting calculation unit 523, as a phase weight matrix.

[Determinant Calculation Unit 617]

The determinant calculation unit 617 calculates a determinant $\det(\sigma^2 I + HH^H)$ of the matrix $\sigma^2 I + HH^H$ based on the matrix $\sigma^2 I + HH^H$ input from the matrix addition unit 614, and outputs the calculated determinant $\det(\sigma^2 I + HH^H)$ to the MSB detection unit 521 and the amplitude correction value bit shift unit 522, as an amplitude correction value.

Note that the MSB detection unit 521 and the amplitude correction value bit shift unit 522 in the present embodiment use the determinant $\det(\sigma^2 I + HH^H)$ instead of the determinant detH, as the amplitude correction value.

Also, the phase weighting calculation unit 523 in the present embodiment uses the matrix $\det(\sigma^2 I + HH^H)H^H(\sigma^2 I + HH^H)^{-1}$ instead of the matrix $(\det H)H^{-1}$, as the phase weight matrix.

<<Embodiment 12>>

The following describes Embodiment 12 of the present invention with reference to the attached drawings.

The present embodiment, as is the case with Embodiment 11, provides a radio communication device having the functions of the radio communication device described in Embodiment 1, additionally with a function to reduce the amount of calculation in the weighting calculation. However, the present embodiment differs from Embodiment 11 in the method for reducing the amount of calculation in the weighting calculation.

In the present embodiment, it is taken into consideration that, in the MMSE method, the determinant $\det(\sigma^2 I + HH^H)$ does not take an extremely small value being close to zero so that the amount of noise can be taken into account in the weighting calculation for the reception signal.

In the present embodiment, structural elements that are the same as those of the previously described embodiments are assigned with the same reference signs, and the description thereof is omitted since the description in previously described embodiments can be applied thereto.

<Structure of Radio Communication Device>

Figure 22:
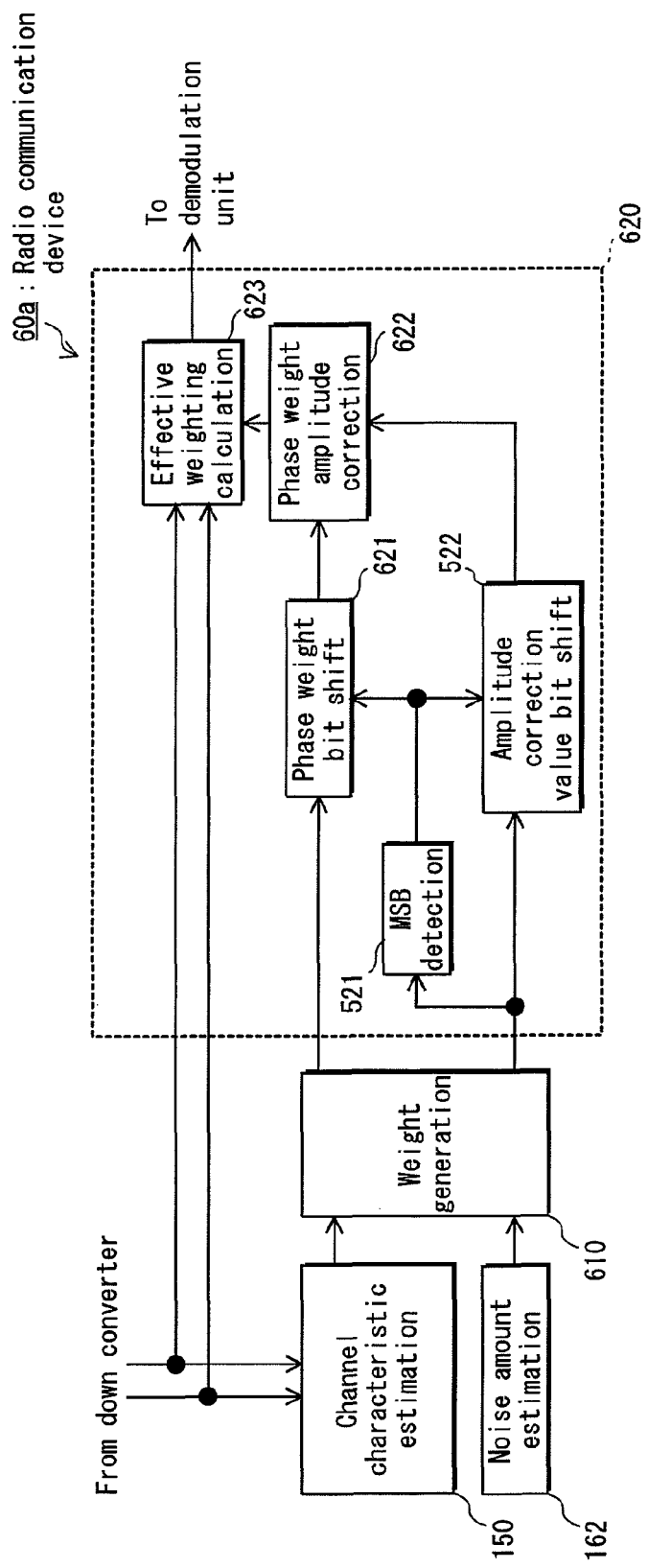
FIG. 22 shows the structure of the radio communication device in Embodiment 12.

The radio communication device of the present embodiment will be described with reference to FIG. 22. FIG. 22 shows the structure of the radio communication device of the present embodiment. Note that FIG. 22 shows a block whose components correspond to the channel characteristic estimation unit 150, the noise amount estimation unit 162, the weight generation unit 170, and the weighting calculation unit 180 shown in FIG. 2.

A radio communication device 60a includes a channel characteristic estimation unit 150, a noise amount estimation unit 162, a weight generation unit 610, and a weighting calculation unit 620.

Note that the weight generation unit 610 outputs the above-described matrix $\det(\sigma^2 I + HH^H) H^H (\sigma^2 I + HH^H)^{-1}$ to a phase weight bit shift unit 621 (which will be described later) in the weighting calculation unit 620, as the phase weight matrix, and outputs the above-described matrix $\det(\sigma^2 I + HH^H)$ to the MSB detection unit 521 and the amplitude correction value bit shift unit 522, as the amplitude correction value.

(Weighting Calculation Unit 620)

The weighting calculation unit 620, during reception of a desired signal, performs the weighting calculation onto a plurality of BB signals output from the down converters 131 and 135, by using the phase weight matrix and the amplitude correction value input from the weight generation unit 610.

The weighting calculation unit 620 includes an MSB detection unit 521, an amplitude correction value bit shift unit 522, a phase weight bit shift unit 621, a phase weight amplitude correction unit 622, and an effective weighting calculation unit 623. Note that the components of the weighting calculation unit 620 operate during reception of a desired signal.

Note that the MSB detection unit 521 and the amplitude correction value bit shift unit 522 in the present embodiment use the determinant $\det(\sigma^2 I + HH^H)$ instead of the determinant detH, as the amplitude correction value.

[Phase Weight Bit Shift Unit 621]

The phase weight bit shift unit 621, based on the number of bit digits to be shifted indicated by the MSB notification signal input from the MSB detection unit 521, shifts the bits of each matrix element of the phase weight matrix input from the matrix multiplication unit 616 of the weight generation unit 610, and extracts therefrom an effective number of each matrix element of the phase weight matrix. The phase weight bit shift unit 621 then outputs a matrix (hereinafter referred to as "effective phase weight matrix") whose matrix elements are the extracted effective numbers for the matrix elements, to the phase weight amplitude correction unit 622.

The number of digits constituting the code of each matrix element of the effective phase weight matrix output from the phase weight bit shift unit 621 is smaller than the number of digits constituting the code of each matrix element of the phase weight matrix input into the phase weight bit shift unit 621.

Note, however, that the number of digits of the amplitude correction value shifted by the amplitude correction value bit shift unit 522 is the same as the number of digits of each matrix element of the phase weight matrix shifted by the phase weight bit shift unit 621.

For example, when the code of each matrix element of the phase weight matrix input into the phase weight bit shift unit 621 is composed of bits $b_{15}$ through $b_0$ (the subscripts indicate bit digits, and bits with higher values of subscripts are higher bits), and the MSB notification signal indicates that the number of bit digits to be shifted is three, the phase weight bit shift unit 621 shifts each matrix element of the phase weight matrix by three bits, and outputs the effective phase weight matrix whose matrix elements are each composed of the bits $b_{12}$ through $b_0$ to the phase weight amplitude correction unit 622.

[Phase Weight Amplitude Correction Unit 622]

The phase weight amplitude correction unit 622 corrects the amplitude of each matrix element of the effective phase weight matrix input from the phase weight bit shift unit 621 based on the effective amplitude correction value input from the amplitude correction value bit shift unit 522, and outputs a matrix (hereinafter referred to as "effective weight matrix") whose matrix elements are values obtained by the correction, to the effective weighting calculation unit 623.

More specifically, the phase weight amplitude correction unit 622 divides the value of each matrix element of the effective phase weight matrix by the effective amplitude correction value.

[Effective Weighting Calculation Unit 623]

The effective weighting calculation unit 623 multiplies the effective weight matrix input from the phase weight amplitude correction unit 622 by a reception signal matrix whose matrix elements are a plurality of BB signals output from the down converters 131 and 135.

According to the present embodiment, in the division process, the phase weight amplitude correction unit 622 divides the value of each matrix element of the effective phase weight matrix whose number of digits is smaller than that of each matrix element of the phase weight matrix, by the effective amplitude correction value whose code is composed of a smaller number of digits than the code of the amplitude correction value.

Also, in the weighting calculation process, the effective weighting calculation unit 623 multiplies the effective weight matrix whose code is composed of a smaller number of digits than that of the weight matrix, by a reception signal matrix whose matrix elements are a plurality of BB signals.

The above-described structure contributes to reduction of the amount of calculation performed by the weighting calculation unit 620 in the weighting calculation process.

Here, the operation of the weighting calculation unit 620 will be described briefly.

The phase weight bit shift unit 621 detects the Most Significant Bit (MSB) in a code sequence representing the value of the determinant input from the determinant calculation unit 512.

The amplitude correction value bit shift unit 522, based on the detection result input from the MSB detection unit 521, shifts the bits of the amplitude correction value input from the determinant calculation unit 617, and extracts therefrom the effective number of the amplitude correction value.

The phase weight bit shift unit 621 performs the bit shifting onto the phase weight matrix input from the matrix multiplication unit 616, based on the detection result input from the MSB detection unit 521, and extracts therefrom an effective number of each matrix element of the phase weight matrix.

The phase weight amplitude correction unit 622 corrects the amplitude of each matrix element of the effective phase weight matrix which is obtained by the bit shifting by the phase weight bit shift unit 621, based on the effective amplitude correction value which is obtained by the bit shifting by the amplitude correction value bit shift unit 522.

The effective weighting calculation unit 623 assigns weights to the BB signals input from the down converters 131 and 135 based on the effective weight matrix input from the phase weight amplitude correction unit 622.

<<Embodiment 13>>

The following describes Embodiment 13 of the present invention with reference to the attached drawings.

The present embodiment provides a radio communication device having the functions of the radio communication device described in Embodiment 3, additionally with a function to reduce the amount of calculation in the weighting calculation.

In the present embodiment, structural elements that are the same as those of the previously described embodiments are assigned with the same reference signs, and the description thereof is omitted since the description in previously described embodiments can be applied thereto.

<Structure of Radio Communication Device>

Figure 23:
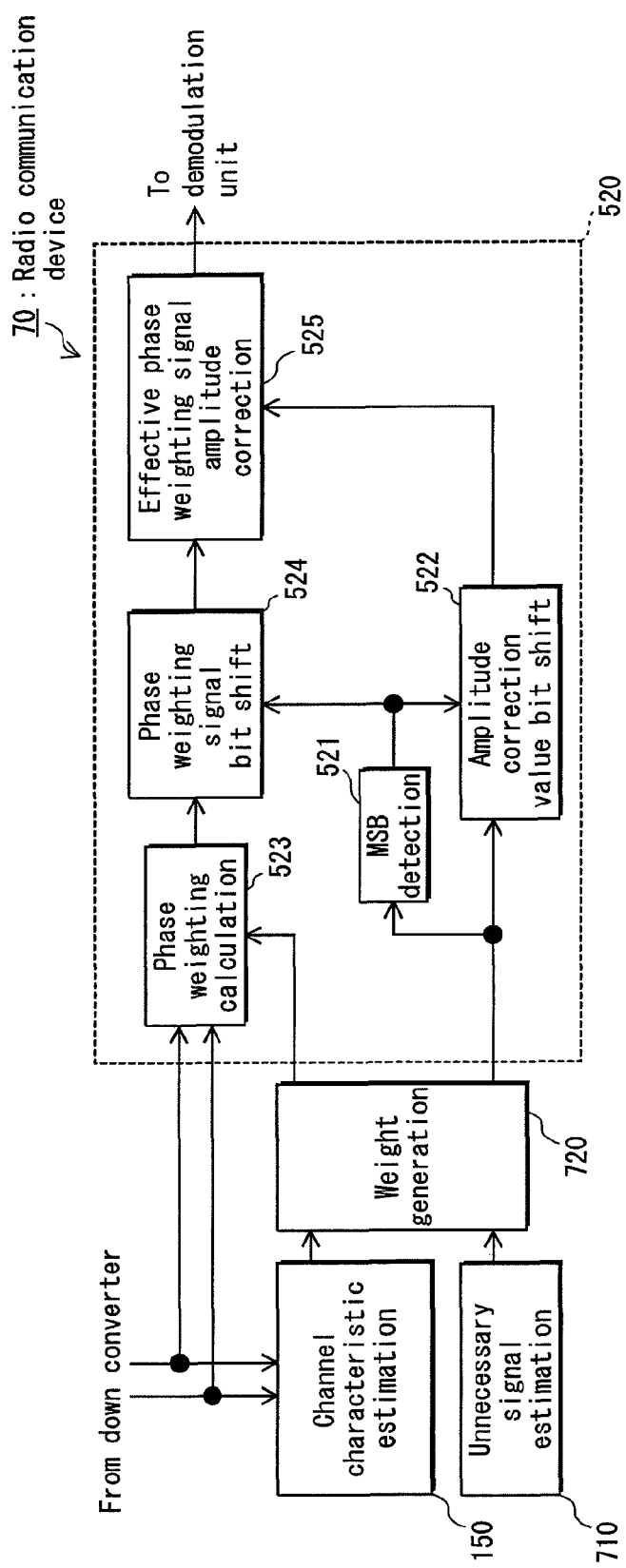
FIG. 23 shows the structure of the radio communication device in Embodiment 13.
Figure 24:
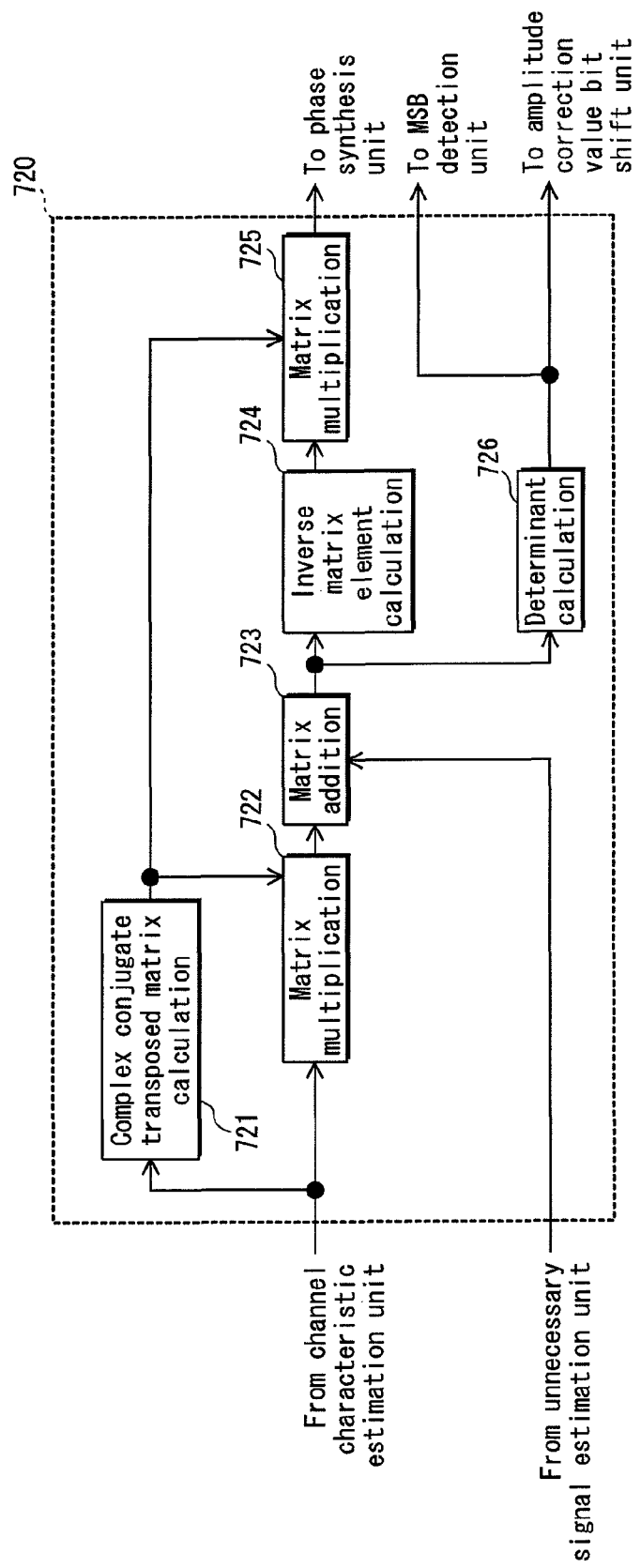
FIG. 24 shows the structure of the weight generation unit shown in FIG. 23.

The radio communication device of the present embodiment will be described with reference to FIGS. 23 and 24. FIG. 23 shows the structure of the radio communication device of the present embodiment. FIG. 24 shows the structure of a weight generation unit 720 shown in FIG. 23. Note that FIG. 23 shows a block whose components correspond to the channel characteristic estimation unit 150, the interference noise estimation unit 210, the amplitude correction unit 220, the noise amount correction unit 230, the weight generation unit 240, and the weighting calculation unit 180 shown in FIG. 6.

The present embodiment explains a case where the MMSE method is used, as one example.

The radio communication device 70 includes a channel characteristic estimation unit 150, an unnecessary signal estimation unit 710, a weight generation unit 720, and a weighting calculation unit 520.

Note that the unnecessary signal estimation unit 710 has functions of a circuit unit composed of the interference noise estimation unit 210, the amplitude correction unit 220, and the noise amount correction unit 230 shown in FIG. 6. Note also that the unnecessary signal covariance matrix that is output from the unnecessary signal estimation unit 710 to the weight generation unit 720 is represented as $R_{UUS}$.

(Weight Generation Unit 720)

The weight generation unit 720, during reception of a desired signal, generates weights for use in the weighting calculation on a plurality of BB signals output from the down converters 131 and 135.

The weight generation unit 720 includes a complex conjugate transposed matrix calculation unit 721, a matrix multiplication unit 722, a matrix addition unit 723, an inverse matrix element calculation unit 724, a matrix multiplication unit 725, and a determinant calculation unit 726. Note that the components of the weight generation unit 720 operate during reception of a desired signal.

[Complex Conjugate Transposed Matrix Calculation Unit 721]

The complex conjugate transposed matrix calculation unit 721 calculates a complex conjugate transposed matrix $H^H$ of the channel matrix H input from the channel characteristic estimation unit 150, and outputs the calculated complex conjugate transposed matrix $H^H$ to the matrix multiplication unit 722 and the matrix multiplication unit 725.

[Matrix Multiplication Unit 722]

The matrix multiplication unit 722 multiplies the channel matrix H input from the channel characteristic estimation unit 150 by the complex conjugate transposed matrix $H^H$ input from the complex conjugate transposed matrix calculation unit 721, and outputs a matrix $HH^H$ which is obtained by the multiplication to the matrix addition unit 723.

[Matrix Addition Unit 723]

The matrix addition unit 723 adds the matrix $HH^H$ input from the matrix multiplication unit 722 and the covariance matrix $R_{UUS}$ input from the unnecessary signal estimation unit 710, and outputs a matrix $HH^H+R_{UUS}$ which is obtained by the addition to the inverse matrix element calculation unit 724 and the determinant calculation unit 726.

[Inverse Matrix Element Calculation Unit 724]

The inverse matrix element calculation unit 724, based on the matrix $HH^H+R_{UUS}$ input from the matrix addition unit 723, calculates a matrix det $(HH^H+R_{UUS})$ $(HH^H+R_{UUS})^{-1}$ by multiplying an inverse matrix $(HH^H+R_{UUS})^{-1}$ of the matrix $HH^H+R_{UUS}$ by a determinant det$(HH^H+R_{UUS})$ of the matrix $HH^H+R_{UUS}$. The inverse matrix element calculation unit 724 then outputs the calculated matrix det $(HH^H+R_{UUS})$ $(HH^H+R_{UUS})^{-1}$ to the matrix multiplication unit 725.

[Matrix Multiplication Unit 725]

The matrix multiplication unit 725 multiplies the matrix det $(HH^H+R_{UUS})$ $(HH^H+R_{UUS})^{-1}$ input from the inverse matrix element calculation unit 724 by the complex conjugate transposed matrix $H^H$ input from the complex conjugate transposed matrix calculation unit 721. The matrix multiplication unit 725 then outputs a matrix det$(HH^H+R_{UUS})H^H$ $(HH^H+R_{UUS})^{-1}$ to the phase weighting calculation unit 523 as a phase weight matrix.

[Determinant Calculation Unit 726]

The determinant calculation unit 726, based on the matrix $HH^H+R_{UUS}$ input from the matrix addition unit 723, calculates a determinant det$(HH^H+R_{UUS})$ of the matrix $HH^H+R_{UUS}$, and outputs the calculated determinant det $(HH^H+R_{UUS})$ to the MSB detection unit 521 and the amplitude correction value bit shift unit 522.

Note that the MSB detection unit 521 and the amplitude correction value bit shift unit 522 in the present embodiment use the determinant det$(HH^H+R_{UUS})$ instead of the determinant detH, as the amplitude correction value.

Also, the phase weighting calculation unit 523 in the present embodiment uses the matrix det $(HH^H+R_{UUS})H^H$ $(HH^H+R_{UUS})^{-1}$ instead of the matrix $(detH)H^{-1}$, as the phase weight matrix.

<<Embodiment 14>>

The following describes Embodiment 14 of the present invention with reference to the attached drawings.

The present embodiment, as is the case with Embodiment 13, provides a radio communication device having the functions of the radio communication device described in Embodiment 3, additionally with a function to reduce the amount of calculation in the weighting calculation. However, the present embodiment differs from Embodiment 13 in the method for reducing the amount of calculation in the weighting calculation.

In the present embodiment, structural elements that are the same as those of the previously described embodiments are assigned with the same reference signs, and the description thereof is omitted since the description in previously described embodiments can be applied thereto.

<Structure of Radio Communication Device>

Figure 25:
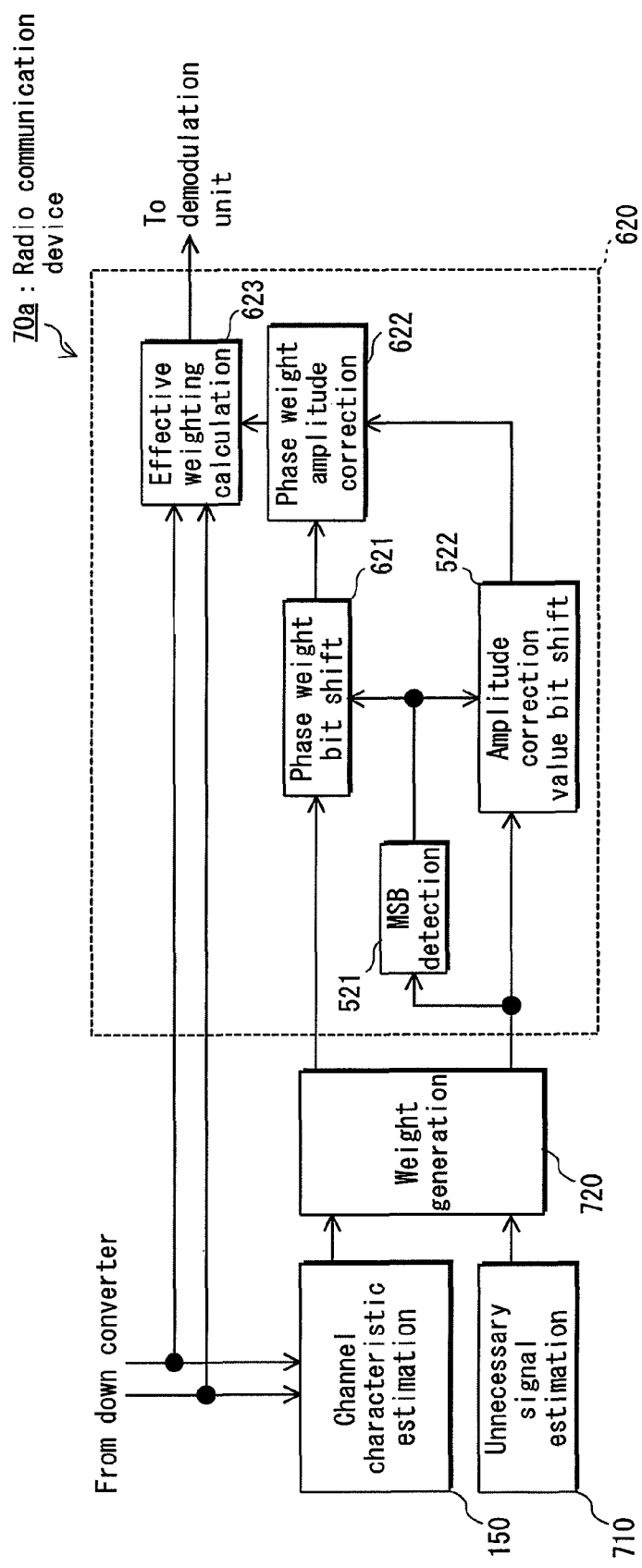
FIG. 25 shows the structure of the radio communication device in Embodiment 14.
Figure 26:
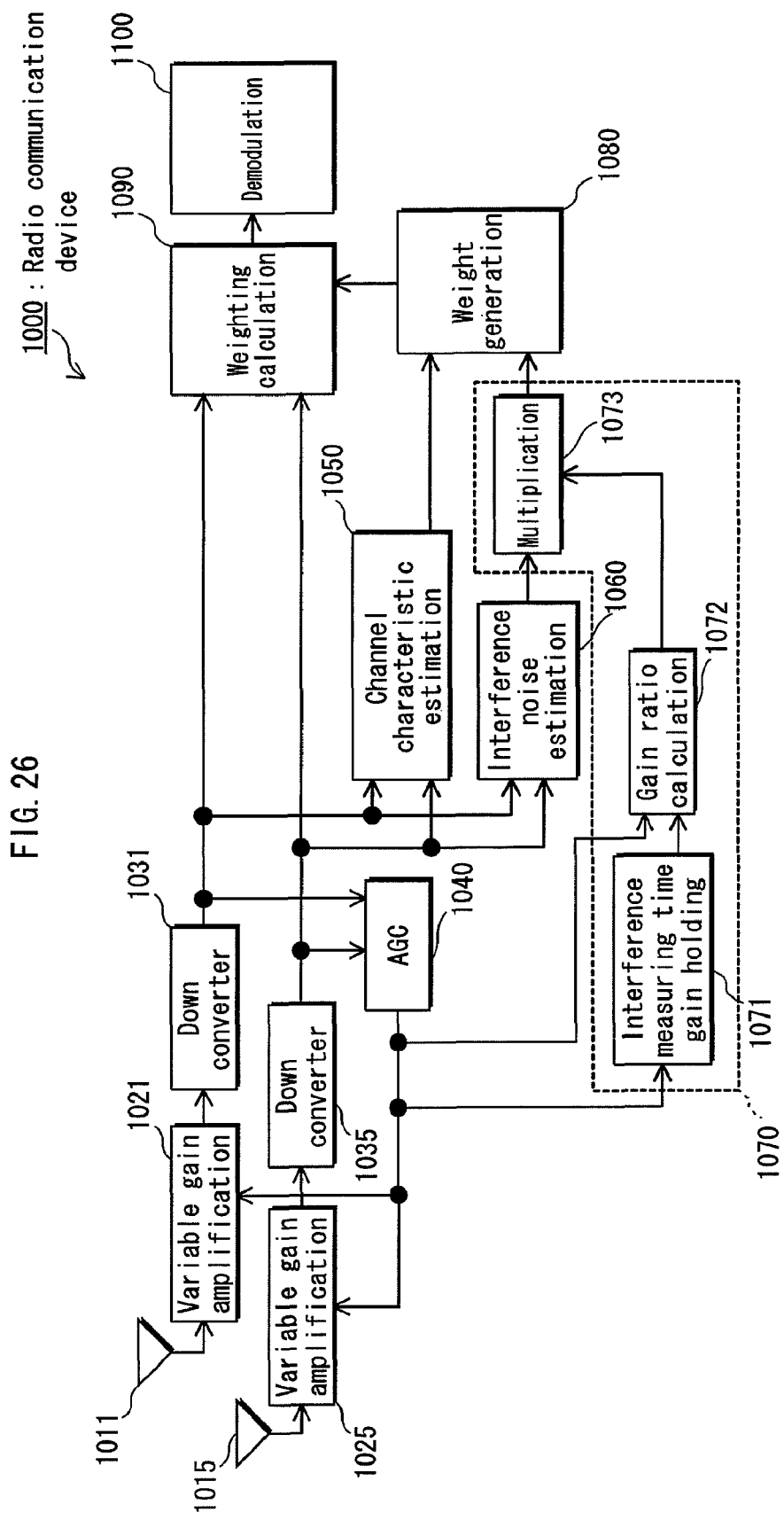
FIG. 26 shows the structure of the conventional radio communication device.

The radio communication device of the present embodiment will be described with reference to FIG. 25. FIG. 25 shows the structure of the radio communication device of the present embodiment. Note that FIG. 25 shows a block whose components correspond to the channel characteristic estimation unit 150, the interference noise estimation unit 210, the amplitude correction unit 220, the noise amount correction unit 230, the weight generation unit 240, and the weighting calculation unit 180 shown in FIG. 6.

The radio communication device 70a includes a channel characteristic estimation unit 150, an unnecessary signal estimation unit 710, a weight generation unit 720, and a weighting calculation unit 620.

Note that the weight generation unit 720 outputs the above-described matrix $det(HH^H+R_{UUS})H^H(HH^H+R_{UUS})^{-1}$ to the phase weight bit shift unit 621 in the weighting calculation unit 620, as the phase weight matrix, and outputs the above-described matrix $det(HH^H+R_{UUS})$ to the MSB detection unit 521 and the amplitude correction value bit shift unit 522, as the amplitude correction value.

Note that the MSB detection unit 521 and the amplitude correction value bit shift unit 522 use the determinant $det(HH^H+R_{UUS})$ instead of the determinant detH, as the amplitude correction value. The phase weight bit shift unit 621 uses the matrix $det(HH^H+R_{UUS})H^H(HH^H+R_{UUS})^{-1}$ instead of the matrix $det(\sigma^2 I+HH^H)H^H(\sigma^2 I+HH^H)^{-1}$, as the phase weight matrix.

<<Supplemental Notes>>

The present invention is not limited to the above-described embodiments, but may be modified in various ways. The following are examples of such modifications.

(1) In the above-described embodiments, the corresponding drawings show a case where the radio communication device includes two reception systems: a reception system including the antenna 111, the variable gain amplification unit 121, and the down converter 131; and a reception system including the antenna 115, the variable gain amplification unit 125, and the down converter 135. However, the number of reception systems included in the radio communication device is not limited to two, but may be three or more.

(2) The noise amount information which is stored in the noise amount information storage unit 161 in Embodiment 1, the noise amount information storage unit 161a in Embodiment 2, and the noise amount information storage unit 251 in Embodiments 4 through 6 has been described with reference to FIGS. 3 and 5. However, the noise amount information is not limited to this. For example, information indicating the relationships between the gain value of the variable gain amplification units 121 and 125 and noise amount of noise included in the BB signals output from the high-frequency unit may be used as the noise amount information, where the noise amount information is obtained from results of measurement that has been performed using real machines to measure the values of relationships between the gain value of the variable gain amplification units 121 and 125 and the noise amount of noise that occurs in the high-frequency unit (which includes the variable gain amplification units and the down converters).

Also, the noise amount information which is stored in the noise amount information storage unit 161, the noise amount information storage unit 161a, and the noise amount information storage unit 251 indicates the relationships between the gain value of the variable gain amplification units 121 and 125 and noise amount of noise included in the BB signals output from the down converters 131 and 135. However, not limited to this, the noise amount information may indicate, for example, the relationships between the signal level of signals input into the variable gain amplification units 121 and 125 and noise amount of noise included in the BB signals output from the down converters 131 and 135. Note that the noise amount information may be created by taking into consideration the contents having been described respectively with reference to FIGS. 3 and 5.

(3) The structure of the noise amount correction unit 230 described in Embodiment 3 is not limited to the above-described structure, but may be any structure as far as the following can be executed.

That is to say, the noise amount correction unit adds the amplitude correction covariance matrix $\Delta g R_{UU}$ input from the multiplication unit 223 and the matrix nI which is obtained by multiplying the average noise amount n by the unit matrix I, and subtracts a value $\Delta g n I$ which is obtained by multiplying a value $\Delta g n$, obtained by multiplying the gain ratio $\Delta g$ by the average noise amount n, by the unit matrix I.

(4) The structures of the noise amount correction unit 230b and the noise amount correction unit 230c described in Embodiments 5 and 6 are not limited to the above-described structures, but may be any structure as far as the following can be executed.

That is to say, the noise amount correction unit, by referring to the noise amount information, estimates the noise amount of the noise included in the BB signals corresponding to the first control gain value during measuring of interference, and estimates the noise amount of the noise included in the BB signals corresponding to the second control gain value during reception of a desired signal. The noise amount correction unit further adds the amplitude correction covariance matrix $\Delta g R_{UU}$ input from the multiplication unit 223 and the matrix $\sigma_{2b}^2 I$ which is obtained by multiplying the unit matrix I by the estimation value $\sigma_{2b}^2$ of the estimated noise amount of noise during reception of the desired signal, and subtracts a value $\Delta g \sigma_{2a}^2 I$ which is obtained by multiplying the unit matrix I by a value $\Delta g \sigma_{2a}^2$ which is obtained by multiplying the gain ratio $\Delta g$ by the estimation value $\sigma_{2a}^2$ of the estimated noise amount of noise during measuring of interference.

(5) In Embodiment 8 described above, the unnecessary signal estimation unit 410 is a block composed of the interference noise estimation unit 210, the amplitude correction unit 220, and the noise amount correction unit 230 described in Embodiment 3. However, not limited to this, the unnecessary signal estimation unit 410 may have any structure as far as it can estimate the unnecessary signal covariance matrix to be used in the generation of the weight matrix W.

For example, the unnecessary signal estimation unit 410 may be achieved by a block that is equivalent with a block including the interference noise estimation unit 210 and the amplitude correction unit 220, or by a block that is equivalent with a block including the interference noise estimation unit 210, the amplitude correction unit 220, and the noise amount correction unit 230a explained in Embodiment 4.

Also, the unnecessary signal estimation unit 410 may be achieved by a block that is equivalent with a block including the interference noise estimation unit 210, the amplitude correction unit 220, and the noise amount correction unit 230b explained in Embodiment 5, or by a block that is equivalent with a block including the interference noise estimation unit 210, the amplitude correction unit 220, and the noise amount correction unit 230c explained in Embodiment 6.

Further, the unnecessary signal estimation unit 410 may be achieved by a block that is equivalent with a block including the interference noise estimation unit 210, the amplitude correction unit 220, and the noise amount correction unit 310 explained in Embodiment 7.

Note that in Embodiment 9 described above, the unnecessary signal estimation unit 410 may have any structure as far as it can estimate the subband unnecessary signal covariance matrix for each subband. Accordingly, the unnecessary signal estimation unit 410 in Embodiment 9 may be modified in the same manner as the unnecessary signal estimation unit 410 in Embodiment 8 described above.

(6) In Embodiment 8 described above, the error judgment unit 420 judges whether or not the unnecessary signal covariance matrix (noise amount correction covariance matrix) satisfies the error allowance condition (whether or not the value of determinant therein is 0 or more), and the weight generation unit 430 generates either the interference suppressing weight matrix or the maximum ratio combining weight matrix depending on the result of the judgment. However, not limited to this, the following are possible.

That is to say, the error judgment unit 420 may either judge whether or not a covariance matrix (for example, the covariance matrix created by the interference noise estimation unit 210) satisfies the error allowance condition (whether or not the value of determinant therein is 0 or more), or judge whether or not an amplitude correction covariance matrix (for example, the amplitude correction covariance matrix obtained by the amplitude correction unit 220 by conducting an amplitude correction onto a covariance matrix) satisfies the error allowance condition (whether or not the value of determinant therein is 0 or more). The weight generation unit 430 then generates either the interference suppressing weight matrix or the maximum ratio combining weight matrix depending on the result of the judgment.

Also, the error judgment unit 420 may judge whether or not a matrix $HH^H + R_{UU}$, which is obtained based on the channel matrix H and the unnecessary signal covariance matrix $R_{UU}$, satisfies the error allowance condition (whether or not the value of determinant therein is 0 or more). The weight generation unit 430 generates the interference suppressing weight matrix when the error judgment unit 420 judges that the matrix $HH^H + R_{UU}$ satisfies the error allowance condition, and generates the maximum ratio combining weight matrix when the error judgment unit 420 judges that the matrix $HH^H + R_{UU}$ does not satisfy the error allowance condition.

Note that the unnecessary signal estimation unit 410*d* in Embodiment 9 may be modified in the same manner as in Embodiment 8 described above.

(7) In Embodiment 8 described above, the error allowance condition is that the value of determinant in the unnecessary signal covariance matrix is 0 or more. However, not limited to this, it may be any condition as far as a calculation error in the unnecessary signal covariance matrix is small enough.

(8) In Embodiments 8 and 9 described above, the weight generation unit 430 and the weight generation unit 430*d* generates the maximum ratio combining weight matrix as a weight matrix which is different from the interference suppressing weight matrix. However, not limited to this, the weight generation unit 430 and the weight generation unit 430*d* may generate a weight matrix for another method such as the ZF method, as a weight matrix different from the interference suppressing weight matrix.

(9) In Embodiment 10 described above, the weighting calculation unit 520 may be replaced with the weighting calculation unit 620 explained in Embodiments 12 and 14.

(10) In Embodiments 11 and 12 described above, the estimation value $\sigma^2$ of noise amount estimated by the noise amount estimation unit 162 is used when the weight generation unit 610 generates the phase weight matrix and the amplitude correction value. However, not limited to this, any estimation value of noise amount of noise included in the BB signals output from the down converters 131 and 135 may be used when the weight generation unit 610 generates the phase weight matrix and the amplitude correction value. For example, the estimation value $\sigma_1^2$ of noise amount estimated by the noise amount estimation unit 162 in Embodiment 2 may be used.

(11) In Embodiments 13 and 14 described above, the unnecessary signal covariance matrix estimated by the unnecessary signal estimation unit 710 is used when the weight generation unit 720 generates the phase weight matrix and the amplitude correction value. However, not limited to this, the unnecessary signal matrix of unnecessary signal that is used when the weight generation unit 720 generates the phase weight matrix and the amplitude correction value may be any unnecessary signal covariance matrix of unnecessary signals included in the BB signals output from the down converters 131 and 135. For example, it may be the amplitude correction covariance matrix calculated by the interference noise estimation unit 210 and the amplitude correction unit 220, or it may be the noise amount correction covariance matrix calculated by the interference noise estimation unit 210, the amplitude correction unit 220, and the noise amount correction unit 230*a* explained in Embodiment 4. Furthermore, it may be the noise amount correction covariance matrix calculated by the interference noise estimation unit 210, the amplitude correction unit 220, and the noise amount, correction unit 230*b* explained in Embodiment 5, or the noise amount correction covariance matrix calculated by the interference noise estimation unit 210, the amplitude correction unit 220, and the noise amount correction unit 230*c* explained in Embodiment 6, or the noise amount correction covariance matrix calculated by the interference noise estimation unit 210, the amplitude correction unit 220, and the noise amount correction unit 310 explained in Embodiment 7.

(12) In Embodiments 10, 11 and 13 described above, the weighting calculation unit 520 performs the weighting calculation onto a plurality of BB signals output from the down converters 131 and 135, based on the phase weight matrix and the amplitude correction value generated by the weight generation unit 510, the weight generation unit 610, and the weight generation unit 720, respectively. However, not limited to this, the weighting calculation unit 520 can be applied to a weighting calculation to be performed onto the BB signals based on the phase weight matrix and the amplitude correction value that are generated by any weight generation unit such as the weight generation unit described in the modification (10) or (11) above.

Also, the weighting calculation unit 520 is applicable to Embodiments 8 and 9 in place of the weighting calculation unit 180 and the weighting, calculation unit 180*d*. In this case, the weight generation unit 430 and the weight generation unit 430*d* generate the phase weight matrix and the amplitude correction value as the weight matrix.

(13) In Embodiments 12 and 14, the weighting calculation unit 620 performs the weighting calculation onto a plurality of BB signals output from the down converters 131 and 135, based on the phase weight matrix and the amplitude correction value generated by the weight generation unit 610 and the weight generation unit 720, respectively. However, not limited to this, the weighting calculation unit 620 can be applied to a weighting calculation to be performed onto the BB signals based on the phase weight matrix and the amplitude correction value that are generated by any weight generation unit such as the weight generation unit described in the modification (10) or (11) above.

Also, the weighting calculation unit 620 is applicable to Embodiments 8 and 9 in place of the weighting calculation unit 180 and the weighting calculation unit 180d. In this case, the weight generation unit 430 and the weight generation unit 430d generate the phase weight matrix and the amplitude correction value as the weight matrix.

(14) In the above-described embodiments, the structural elements except for the antennas 111 and 115, the variable gain amplification units 121 and 125, and the down converters 131 and 135 process the signals in the baseband. However, not limited to the signal processing in the baseband, such structural elements of the present invention can be applied to other signal processing such as the signal processing in the Radio Frequency (RF) band or the signal processing in the Intermediate Frequency (IF) band.

(15) The radio communication devices explained in Embodiments 1-7 and 10-14 can be applied to the multicarrier method such as the OFDM method, by, for example, adding the subband separation units 451 and 455 explained in Embodiment 9.

(16) The radio communication devices explained in Embodiments 1-9 can be applied to the MIMO system of n×n (n is a natural number), and to the MIMO system of n×m (n and m are natural numbers, and m is equal to or larger than n).

The radio communication device explained in Embodiment 10 can be applied to the MIMO system of n×n (n is a natural number).

The radio communication devices explained in Embodiments 11-14 can be applied to the MIMO system of n×n (n is a natural number), and to the MIMO system of n×m (n and m are natural numbers, and m is equal to or larger than n).

(17) Embodiment 3-9, 13 and 14 are described on the presumption that two or more desired signals are uncorrelated with each other. However, when a plurality of desired signals have a predetermined correlation, the weight generation unit may generate the weight matrix by performing a calculation of the following Equation (14) using the channel matrix H, an unnecessary signal correction covariance matrix $R_{UUO}$, and a covariance matrix $R_{SS}$ indicating the correlation between transmission signals. Note that the covariance matrix $R_{SS}$, represents a covariance matrix of a transmission signal s, and can be known from the statistical property of the transmission signal.

[Equation 14]

$$W = R_{SS}H^H(HR_{SS}H^H + R_{UUO})^{-1} \quad (14)$$

Note that the unnecessary signal correction covariance matrix $R_{UUO}$ is, for example, the amplitude correction covariance matrix output from the amplitude correction unit 220, or the noise amount correction covariance matrix output from the noise amount correction units 230 through 230c and 310.

In the normal MIMO transmission, transmission signals are uncorrelated with each other because different data are modulated into a plurality of streams and then the streams are transmitted. In this case, the covariance matrix $R_{SS}$ becomes the unit matrix, and thus can be omitted in the Equation (14).

Also, in Embodiment 8, the error judgment unit 420 may judge whether or not a matrix $HR_{SS}H^H + R_{UUO}$ satisfies the error allowance condition (whether or not the value of determinant therein is 0 or more), and the weight generation unit 430 generates the interference suppressing weight matrix when the error judgment unit 420 judge that the matrix $HR_{SS}H^H + R_{UUO}$ satisfies the error allowance condition, and generates the maximum ratio combining weight, matrix when the error judgment unit 420 judge that the matrix $HR_{SS}H^H + R_{UUO}$ does not satisfy the error allowance condition.

Note that the unnecessary signal estimation unit 410d in Embodiment 9 may be modified in the same manner as in Embodiment 8 described above.

(18) Each radio communication device described in the embodiments above may be achieved, typically, in an LSI (Large Scale Integration) being an integrated circuit. Each circuit may be achieved separately as one chip. Alternatively, all or part of the circuits may be achieved as one chip. For example, a tuner unit 101 may be integrated into a same integrated circuit together with other circuit units, or may be integrated into a different integrated circuit in separation from the circuit units.

Note that, although the term LSI is used here, it may be called IC (Integrated Circuit), system LSI, super LSI, ultra LSI or the like, depending on the level of integration.

Also, the integrated circuit may not necessarily be achieved by the LSI, but may be achieved by the dedicated circuit or the general-purpose processor. It is also possible to use the FPGA (Field Programmable Gate Array), with which a programming is available after the LSI is manufactured, or the reconfigurable processor that can re-configure the connection or setting of the circuit cells within the LSI.

Furthermore, a technology for an integrated circuit that replaces the LSI may appear in the near future as the semiconductor technology improves or branches into other technologies. In that case, the new technology may be incorporated into the integration of the functional blocks constituting the present invention as described above. Such possible technologies include biotechnology.

Industrial Applicability

The present invention can be used as a radio communication device that estimates transmission signals by performing the weighting calculation onto reception signals received by a plurality of antennas.

The invention claimed is:

1. A receiver comprising:
a plurality of antennas;
a high-frequency unit operable to perform a predetermined process including amplification of reception signals received by the plurality of antennas;
a gain control unit operable to control a gain of the high-frequency unit so that a plurality of reception process signals output from the high-frequency unit satisfy a predetermined condition;
a channel characteristic estimation unit operable to estimate a channel characteristic for each channel, in accordance with pilot signals included in the plurality of reception process signals output from the high-frequency unit;
an interference noise estimation unit operable to estimate interference and noise amounts of a plurality of unnecessary signals with respect to interference and noise included in the plurality of reception process signals output from the high-frequency unit, in accordance with the plurality of reception process signals;
an amplitude correction unit operable to correct each of estimation values of interference and noise amounts of the unnecessary signals obtained by the estimation performed by the interference noise estimation unit, in accordance with a gain ratio that is a ratio of a second control gain value to a first control gain value, wherein the first control gain value is a gain value of the high-frequency unit during the estimation of interference and noise amounts of the unnecessary signals, and the second control gain value is a gain value of the high-frequency unit during reception of a desired signal;

a noise amount correction unit operable to correct noise amount with respect to noise among each amplitude correction interference and noise amount obtained by the correction performed by the amplitude correction unit, in accordance with the second control gain value;

a weight generation unit operable to generate weights for use in a weighting calculation to be performed on the plurality of reception process signals output from the high-frequency unit, in accordance with a result of the estimation performed by the channel characteristic estimation unit and a result of the correction performed by the noise amount correction unit; and a weighting calculation unit operable to perform a weighting calculation onto the plurality of reception process signals output from the high-frequency unit, in accordance with the weights generated by the weight generation unit.

2. The receiver of claim 1, wherein the noise amount correction unit includes:

a noise amount information storage unit storing noise amount information which indicates relationships between the gain value of the high-frequency unit and the noise amount of noise included in the reception process signals output from the high-frequency unit;

a noise amount estimation unit operable to estimate a noise amount of noise included in each of the reception process signals output from the high-frequency unit, in accordance with the second control gain value by referring to the noise amount information stored in the noise amount information storage unit; and an addition unit operable to add an estimation value of noise amount obtained by the estimation performed by the noise amount estimation unit, to each amplitude correction interference and noise amount obtained by the correction performed by the amplitude correction unit.

3. The receiver of claim 1, wherein the noise amount correction unit, in accordance with the first control gain value and the second control gain value, suppresses noise amount of noise among each amplitude correction interference and noise amount obtained by the correction performed by the amplitude correction unit, and adds a noise amount of noise determined by a predetermined method.

4. The receiver of claim 3, wherein the noise amount correction unit adds the noise amount of noise determined by the predetermined method to each amplitude correction interference and noise amount, and subtracts therefrom a value that is obtained by multiplying the gain ratio by the noise amount of noise.

5. The receiver of claim 4, wherein the noise amount correction unit includes:

a subtraction unit operable to subtract the gain ratio from constant 1;

a multiplication unit operable to multiply the noise amount of noise determined by the predetermined method, by a value obtained by the subtraction performed by the subtraction unit; and an addition unit operable to add a multiplication value obtained by the multiplication performed by the multiplication unit, to each amplitude correction interference and noise amount obtained by the correction performed by the amplitude correction unit.

6. The receiver of claim 3, wherein the noise amount of noise determined by the predetermined method is an average noise amount of noise that occurs in the high-frequency unit.

7. The receiver of claim 3, wherein the noise amount correction unit includes:

a noise amount information storage unit storing noise amount information which indicates relationships between the gain value of the high-frequency unit and the noise amount of noise included in the reception process signals output from the high-frequency unit;

a first correction unit operable to estimate a noise amount of noise included in each of the reception process signals output from the high-frequency unit during the estimation of interference and noise amounts of the unnecessary signals, in accordance with the first control gain value by referring to the noise amount information stored in the noise amount information storage unit, and correct an estimation value of noise amount obtained by the estimation in accordance with the gain ratio;

an estimation unit operable to estimate a noise amount of noise included in each of the reception process signals output from the high-frequency unit during reception of the desired signal, in accordance with the second control gain value by referring to the noise amount information stored in the noise amount information storage unit; and a second correction unit operable to subtract a correction noise amount obtained by the correction performed by the first correction unit, from each amplitude correction interference and noise amount obtained by the correction performed by the amplitude correction unit, and add an estimation value of noise amount obtained by the estimation performed by the estimation unit.

8. The receiver of claim 1, wherein the interference noise estimation unit, in addition to estimating the interference and noise amounts of the unnecessary signals included in the plurality of reception process signals output from the high-frequency unit, estimates a correlation amount between each of the plurality of reception process signals and each of other reception process signals among the plurality of reception process signals, the amplitude correction unit, in addition to correcting the estimation values of interference and noise amounts in accordance with the gain ratio, corrects each of estimation correlation amounts which are obtained by the estimation performed by the interference noise estimation unit, in accordance with the gain ratio, the receiver further includes an error judgment unit operable to judge whether or not (i) interference and noise amounts and correlation amounts which are obtained by the estimation performed by the interference noise estimation unit, or (ii) amplitude correction correlation amounts that are obtained by the correction of correlation amounts performed by the amplitude correction unit and noise correction interference and noise amount that is obtained by the correction performed by the noise amount correction unit, satisfy a predetermined error allowance condition, the weight generation unit generates the weights when the error judgment unit judges affirmatively, the weight generation unit generates other weights in accordance with a result of the estimation of the channel characteristic performed by the channel characteristic estimation unit, by a method that is different from a method for generating the weights, when the error judgment unit judges negatively, and the weighting calculation unit performs the weighting calculation on the plurality of reception process signals output from the high-frequency unit, in accordance with the weights or the other weights generated by the weight generation unit.

9. The receiver of claim 8, wherein
the error judgment unit performs the judgment in accordance with a determinant of a first matrix whose diagonal component is the interference and noise amount and whose non-diagonal component is the correlation amount, or in accordance with a determinant of a second matrix whose diagonal component is the noise correction interference and noise amount and whose non-diagonal component is the amplitude correction correlation amount.

10. The receiver of claim 9, wherein
the error allowance condition is that a value of the determinant of the first matrix or the second matrix is 0 or more.

11. The receiver of claim 8 further comprising
a subband separation unit operable to separate each of the plurality of reception process signals output from the high-frequency unit into a plurality of frequency bands.

12. The receiver of claim 1, wherein
the weight generation unit generates, as the weights, a phase weight for performing a phase weighting calculation with respect to phase in the weighting calculation, and an amplitude correction value for performing a calculation with respect to amplitude in the weighting calculation, and
the weighting calculation unit includes:
a bit detection unit operable to detect a most significant bit in a code sequence representing the amplitude correction value generated by the weight generation unit;
an amplitude correction value bit shift unit operable to, in accordance with the most significant bit detected by the bit detection unit, shifts bits of the amplitude correction value generated by the weight generation unit;
a phase weighting calculation unit operable to perform a phase weighting calculation with respect to phase in the reception process signals output from the high-frequency unit, in accordance with the phase weight generated by the weight generation unit;
a phase weighting signal bit shift unit operable to shift bits of a phase weighting signal, which is obtained by the phase weighting calculation performed by the phase weighting calculation unit, in accordance with the most significant bit detected by the bit detection unit; and
a signal amplitude correction unit operable to correct an effective phase weighting signal, which is obtained by the bit shift performed by the phase weighting signal bit shift unit, in accordance with an effective amplitude correction value obtained by the bit shift performed by the amplitude correction value bit shift unit.

13. The receiver of claim 1, wherein
the weight generation unit generates, as the weights, a phase weight for performing a phase weighting calculation with respect to phase in the weighting calculation, and an amplitude correction value for performing a calculation with respect to amplitude in the weighting calculation, and
the weighting calculation unit includes:
a bit detection unit operable to detect a most significant bit in a code sequence representing the amplitude correction value generated by the weight generation unit;
a phase weight bit shift unit operable to, in accordance with the most significant bit detected by the bit detection unit, shifts bits of the phase weight generated by the weight generation unit;
an amplitude correction value bit shift unit operable to, in accordance with the most significant bit detected by the bit detection unit, shifts bits of the amplitude correction value generated by the weight generation unit;
a weight amplitude correction unit operable to correct an effective phase weight, which is obtained by the bit shift performed by the phase weight bit shift unit, in accordance with an effective amplitude correction value which is obtained by the bit shift performed by the amplitude correction value bit shift unit; and
an effective weighting calculation unit operable to perform a weighting calculation onto a plurality of reception process signals output from the high-frequency unit, in accordance with an effective weight which is obtained by the correction performed by the weight amplitude correction unit.

14. A receiver comprising:
a plurality of antennas;
a channel characteristic estimation unit operable to estimate a channel characteristic for each channel, in accordance with a pilot signal included in a reception signal received by the plurality of antennas;
a weight generation unit operable to generate, as weights for use in a weighting calculation to be performed onto the reception signal received by the plurality of antennas, a phase weight for performing a phase weighting calculation with respect to phase in the weighting calculation, and an amplitude correction value for performing a calculation with respect to amplitude in the weighting calculation, in accordance with in accordance with estimated channel characteristics obtained by the estimation performed by the channel characteristic estimation unit;
a bit detection unit operable to detect a most significant bit in a code sequence representing the amplitude correction value generated by the weight generation unit;
an amplitude correction value bit shift unit operable to, in accordance with the most significant bit detected by the bit detection unit, shifts bits of the amplitude correction value generated by the weight generation unit;
a phase weighting calculation unit operable to perform a phase weighting calculation with respect to phase in the reception process signals output from the high-frequency unit, in accordance with the phase weight generated by the weight generation unit;
a phase weighting signal bit shift unit operable to shift bits of a phase weighting signal, which is obtained by the phase weighting calculation performed by the phase weighting calculation unit, in accordance with the most significant bit detected by the bit detection unit; and
a signal amplitude correction unit operable to correct an effective phase weighting signal, which is obtained by the bit shift performed by the phase weighting signal bit shift unit, in accordance with an effective amplitude correction value obtained by the bit shift performed by the amplitude correction value bit shift unit.

15. A receiver comprising:
a plurality of antennas;
a channel characteristic estimation unit operable to estimate a channel characteristic for each channel, in accordance with a pilot signal included in a reception signal received by the plurality of antennas;
a weight generation unit operable to generate, as weights for use in a weighting calculation to be performed onto the reception signal received by the plurality of antennas, a phase weight for performing a phase weighting calculation with respect to phase in the weighting calculation, and an amplitude correction value for performing a calculation with respect to amplitude in the weighting calculation, in accordance with in accordance with estimated channel characteristics obtained by the estimation performed by the channel characteristic estimation unit;

a bit detection unit operable to detect a most significant bit in a code sequence representing the amplitude correction value generated by the weight generation unit;

a phase weight bit shift unit operable to, in accordance with the most significant bit detected by the bit detection unit, shifts bits of the phase weight generated by the weight generation unit;

an amplitude correction value bit shift unit operable to, in accordance with the most significant bit detected by the bit detection unit, shifts bits of the amplitude correction value generated by the weight generation unit;

a weight amplitude correction unit operable to correct an effective phase weight, which is obtained by the bit shift performed by the phase weight bit shift unit, in accordance with an effective amplitude correction value which is obtained by the bit shift performed by the amplitude correction value bit shift unit; and an effective weighting calculation unit operable to perform a weighting calculation onto the reception signal received by the plurality of antennas, in accordance with an effective weight which is obtained by the correction performed by the weight amplitude correction unit.

16. A reception method for use in a receiver that includes a plurality of antennas, a high-frequency unit operable to perform a predetermined process including amplification of reception signals received by the plurality of antennas, and a gain control unit operable to control a gain of the high-frequency unit so that a plurality of reception process signals output from the high-frequency unit satisfy a predetermined condition, the reception method performing, in the receiver, a weighting calculation onto the plurality of reception process signals output from the high-frequency unit, in accordance with weights, the reception method comprising the steps of:

estimating a channel characteristic for each channel, in accordance with pilot signals included in the plurality of reception process signals output from the high-frequency unit;

estimating interference and noise amounts of a plurality of unnecessary signals with respect to interference and noise included in the plurality of reception process signals output from the high-frequency unit, in accordance with the plurality of reception process signals;

correcting each of estimation values of interference and noise amounts of the unnecessary signals obtained by the estimation performed by the interference noise estimation step, in accordance with a gain ratio that is a ratio of a second control gain value to a first control gain value, wherein the first control gain value is a gain value of the high-frequency unit during the estimation of interference and noise amounts of the unnecessary signals, and the second control gain value is a gain value of the high-frequency unit during reception of a desired signal;

correcting noise amount with respect to noise among each amplitude correction interference and noise amount obtained by the correction performed by the amplitude correction step, in accordance with the second control gain value;

generating weights for use in a weighting calculation to be performed on the plurality of reception process signals output from the high-frequency unit, in accordance with a result of the estimation performed by the channel characteristic estimation step and a result of the correction performed by the noise amount correction step; and performing a weighting calculation onto the plurality of reception process signals output from the high-frequency unit, in accordance with the weights generated by the weight generation step.

* * * * *